United States Patent
Crow et al.

(10) Patent No.: US 7,555,441 B2
(45) Date of Patent: Jun. 30, 2009

(54) CONCEPTUALIZATION OF JOB CANDIDATE INFORMATION

(75) Inventors: Daniel Nicholas Crow, San Francisco, CA (US); Visnu Ted Pitiyanuvath, San Francisco, CA (US)

(73) Assignee: Kronos Talent Management Inc., Beaverton, OR (US)

( * ) Notice: Subject to any disclaimer, the term of this patent is extended or adjusted under 35 U.S.C. 154(b) by 28 days.

(21) Appl. No.: 10/684,272

(22) Filed: Oct. 10, 2003

(65) Prior Publication Data

US 2005/0080656 A1    Apr. 14, 2005

(51) Int. Cl.
*G06F 9/46* (2006.01)
(52) U.S. Cl. .............................. 705/9; 705/7
(58) Field of Classification Search ............ 705/8, 705/9
See application file for complete search history.

(56) References Cited

U.S. PATENT DOCUMENTS

| | | | | |
|---|---|---|---|---|
| 5,164,897 | A | * | 11/1992 | Clark et al. ............ 705/1 |
| 5,197,004 | A | * | 3/1993 | Sobotka et al. .......... 705/8 |
| 5,371,807 | A | * | 12/1994 | Register et al. ......... 382/159 |
| 5,551,880 | A | * | 9/1996 | Bonnstetter et al. ..... 434/236 |
| 5,592,375 | A | * | 1/1997 | Salmon et al. .......... 705/7 |
| 5,608,899 | A | | 3/1997 | Li et al. |
| 5,794,178 | A | * | 8/1998 | Caid et al. ............. 704/9 |
| 5,887,120 | A | * | 3/1999 | Wical .................. 706/46 |
| 5,978,768 | A | * | 11/1999 | McGovern et al. ....... 705/1 |
| 6,061,675 | A | * | 5/2000 | Wical .................. 706/45 |
| 6,094,650 | A | | 7/2000 | Stoffel et al. |
| 6,115,718 | A | | 9/2000 | Huberman et al. |
| 6,144,964 | A | | 11/2000 | Breese et al. |
| 6,263,334 | B1 | * | 7/2001 | Fayyad et al. ........... 707/5 |
| 6,272,467 | B1 | | 8/2001 | Durand et al. |
| 6,289,340 | B1 | | 9/2001 | Puram et al. |
| 6,385,620 | B1 | * | 5/2002 | Kurzius et al. .......... 707/104.1 |
| 6,513,027 | B1 | * | 1/2003 | Powers et al. .......... 706/47 |
| 6,564,197 | B2 | * | 5/2003 | Sahami et al. .......... 706/55 |
| 6,598,047 | B1 | | 7/2003 | Russell et al. |
| 6,662,194 | B1 | * | 12/2003 | Joao ................. 707/104.1 |
| 6,711,585 | B1 | * | 3/2004 | Copperman et al. ..... 707/104.1 |
| 6,721,754 | B1 | * | 4/2004 | Hurst et al. .......... 707/102 |

(Continued)

FOREIGN PATENT DOCUMENTS

WO    WO 01/93102 A1    12/2001

OTHER PUBLICATIONS

Clyde et al, An Object-oriented Implementation of an Adaptive Classification of Job Openings, Utah State University, 1995 [Google].*

(Continued)

*Primary Examiner*—Romain Jeanty
(74) *Attorney, Agent, or Firm*—Klarquist Sparkman, LLP

(57) ABSTRACT

A variety of technologies are applied to conceptualization of job candidate information. For example, concepts can be extracted from a job candidate's resume via an ontology. Concepts can be arranged hierarchically within the ontology, and parent concepts can be extracted. Concepts relating to job skills, job title, management, and the like can be extracted. A set of concepts can be represented as a point in n-dimensional concept space. Thus, candidates and desired candidate criteria can be represented in the concept space. Those candidates closest to the desired candidate criteria in the concept space can be designated as matches for the desired candidate criteria.

22 Claims, 31 Drawing Sheets

U.S. PATENT DOCUMENTS

| | | | |
|---|---|---|---|
| 6,728,695 B1* | 4/2004 | Pathria et al. | 707/2 |
| 6,778,979 B2 | 8/2004 | Grefenstette et al. | |
| 6,778,995 B1* | 8/2004 | Gallivan | 707/102 |
| 6,847,966 B1 | 1/2005 | Sommer et al. | |
| 6,917,952 B1* | 7/2005 | Dailey et al. | 707/203 |
| 7,080,057 B2* | 7/2006 | Scarborough et al. | 706/60 |
| 7,200,563 B1* | 4/2007 | Hammitt et al. | 705/7 |
| 7,310,626 B2 | 12/2007 | Scarborough et al. | |
| 2001/0034630 A1* | 10/2001 | Mayer et al. | 705/7 |
| 2002/0042786 A1 | 4/2002 | Scarborough et al. | |
| 2002/0046199 A1 | 4/2002 | Scarborough et al. | |
| 2002/0055866 A1 | 5/2002 | Dewar | |
| 2002/0173971 A1 | 11/2002 | Stirpe et al. | |
| 2003/0101170 A1 | 5/2003 | Edelstein et al. | |
| 2003/0120630 A1* | 6/2003 | Tunkelang | 707/1 |
| 2003/0191680 A1 | 10/2003 | Dewar | |
| 2003/0195786 A1 | 10/2003 | Dewar | |
| 2003/0200136 A1 | 10/2003 | Dewar | |
| 2005/0080657 A1 | 4/2005 | Crow et al. | |
| 2005/0114279 A1 | 5/2005 | Scarborough et al. | |
| 2005/0246299 A1 | 11/2005 | Scarborough et al. | |
| 2006/0074836 A1* | 4/2006 | Gardner et al. | 706/60 |

OTHER PUBLICATIONS

Ziff Davis Smart Busines for the New Economy. "Beat the Competition Every Time" Mar. 1, 2002, p. 1-6.*

Overholt, Alison. "True of False: You're Hiring the Right People." Fast Company. Febraru, 2002, p. 110-114.*

"LensXRay" brochure, Burning Glass Technologies, 2 pages, www.burning-glass.com/Image%20Folder/LensXRay(5_1).PDF, visited May 30, 2003.

"Engenium Semetric", http://www.engenium.com/product_arch.html, 3 pages, visited Aug. 25, 2003.

"Engenium Intelligent Application Series: Automatic Categorization & Taxonomy Assignment", *Engenium Corporation*, Version 1.02, 4 pages, Aug. 25, 2003.

"Engenium Intelligent Application Series. Section 2: Approach to Automatic Categorization", *Engenium Corporation*, Version 1.02, 7 pages, Aug. 25, 2003.

Babcock, "Searching for a Better Match", http://www.zdnet.com/intweek/, 2 pages, visited on Aug. 7, 2000.

Cugini et al., "Document Clustering in Concept Space: The NIST Information Retrieval Visualization Engine (NIRVE)", http://www.itl.nist.gov/iaui/vvrg/cugini/uicd/short-cc-paper.html, 5 pages, visited on Aug. 27, 2003.

Everett et al., "Making Ontologies Work for Resolving Redundancies Across Documents", *Communications of the ACM*, vol. 45, No. 2, pp. 55-60, Feb. 2002.

Freitag et al., "Boosted Wrapper Induction", *American Association for Artificial Intelligence*, pp. 577-583, 2000.

Gruber, "What is an Ontology?", http://www-ksl.stanford.edu/kst/what-is-an-ontology.html, 2 pages, visited on Aug. 26, 2003.

Gruninger et al., "Ontology: Applications and Design", *Communications of the ACM*, vol. 45, No. 2, pp. 39-41, Feb. 2002.

Guarino, "Formal Ontology and Information Systems", IOS Press, *Proceedings of the 1st International Conference*, Trento, Italy, 1998.

Guarino et al., "Evaluating Ontological Decisions with Ontoclean", *Communications of the ACM*, vol. 45, No. 2, pp. 61-65, Feb. 2002.

Holsapple et al., "A Collaborative Approach to Ontology Design", *Communications of the ACM*, vol. 45, No. 2, pp. 42-47, Feb. 2002.

Kim, "Predicting How Ontologies for the Semantic Web Will Evolve", *Communications of the ACM*, vol. 45, No. 2, pp. 48-54, Feb. 2002.

Maedche et al., "An Infrastructure for Searching, Reusing and Evolving Distributed Ontologies", WWW2003, The Twelfth International World Wide Web Conference, Budapest, Hungary, pp. 439-448, May 20-24, 2003.

Widyantoro et al., "A Fuzzy Ontology-Based Abstract Search Engine and Its User Studies", *Proceedings of the 10th IEEE International Conference on Fuzzy Systems*, vol. 2, pp. 1291-1294, Dec. 2-5, 2001.

U.S. Appl. No. 60/211,044, filed Jun. 12, 2000, Dewar.

Grosso, et al., "Knowledge Modeling at the Millennium (The Design and Evolution of Protégé-2000)," Proceedings of the $12^{th}$ International Workshop on Knowledge Acquisition, Modeling and Management (KAW '99), 36 pages, Banff, Canada, Oct. 1999.

Hayes, "Intelligent High-Volume Text Processing Using Shallow, Domain Specific Techniques," in *Text-Based Intelligent Systems: Current Research and Practice in Information Extraction and Retrieval*, by Paul Schafran Jacobs (Editor), pp. 227-241, Lawrence Erlbaum Assoc., 1992.

Iwanska, et al., "Fully Automatic Acquisition of Taxonomic Knowledge from Large Corpora of Texts," in *Natural Language Processing and Knowledge Representation: Language for Knowledge and Knowledge for Language*, by Lucja M. Iwanska and Stuart C. Shapiro (Editor), pp. 335-345, AAAI Press, $1^{st}$ Edition, 2000.

Jacquemin, *Spotting and Discovering Terms through Natural Language Processing*, The MIT Press, pp. i-378, 2001.

Moore, et al., "Indexing by MeSH titles of Natural Language Pathology Phrases Identified on First Encounter Using the Barrier Word Method," in *Computerized Natural Medical Language Processing for Knowledge Representation*, pp. 29-39, North-Holland, 1989.

Salton, *Automatic Text Processing: The Transformation, Analysis, and Retrieval of Information by Computer*, Addison-Wesley, pp. i-530, 1989.

"Written Opinion of the International Searching Authority," from PCT Application No. PCT/US2004/033233, filed Oct. 8, 2004, 7 pages, Written Opinion dated May 19, 2005.

Schweyer et al., Engenium—Concept Based Resume Searching, Sep. 2002, 7 pages.

"1999 StoreWorks! Conference and Exhibition," Decision Point Data, Inc. (predecessor company of Unicru, Inc.), 13 pages, May 1999.

"Building a Competitive Advantage with a Hiring Management System," Unicru Professional Series, White Paper, Unicru, Inc., Jan. 16, 2002, 11 pages.

Chambless et al., "Information-Theoretic Feature Selection for a Neural Behavioral Model," Proceedings of the International Joint Conference on Neural Networks, Jul. 15-19, 2001, pp. 1443-1448, 6 pages.

Clainos, "Tools & Technology," International Mass Retail Association, 1999 Store Operations & Human Resources Conference, Decision Point Data, Inc. (predecessor company of Unicru, Inc.), 28 pages, Feb. 2, 1999.

Scarborough, "An Evaluation of Backpropagation Neural Network Modeling as an Alternative Methodology for Criterion Validation of Employee Selection Testing," Doctoral Dissertation (UMI Dissertation Services), University of Texas, 180 pages, 1995.

Scarborough, "Decision Point Systems," Presentation to potential customer, 38 pages, ten of fewer copies left with potential customer, Wilsonville, Oregon, before Jun. 2000.

Scarborough, "DPDNeurotech™," Power Point Presentation given to prospective employer Decision Point Data (predecessor company of Unicru, Inc.) 32 pages, electronic copy provided to Decision Point Data., Dec. 1998.

Scarborough, "Tutorial on the Use of Neural Network Models for Personal Selection," Decision Sciences Institute Southwest Region Theory and Applications Proceedings 27th Annual Conference, pp. 151-153, Mar. 6-9, 1996.

Scarborough, "Welcome, Portland State University," Presentation to about 15 people, Portland, Oregon, 20 pages, before May 2000.

"Unicru—History," http://www.unicru.com/about/history.aspx, 3 pages, website visited on Sep. 23, 2005, 3 pages, recounting events from 1987-2005.

"Unicru Launches Smart Assessment Technology that Offers Unprecedented Accuracy for Predicting Behavior of Hourly Workforce," Business Wire, Jan. 15, 2001, 2 pages.

* cited by examiner

COLOR KEY:
　　EXCELLENT　GOOD　FAIR (1-10 CANDIDATES DISPLAYED; 30 TOTAL)
SEE ALL MATCHING CANDIDATES

| ADD TO PROSPECTS | REFINE MATCH CRITERIA |

CANDIDATE NAME　　　　TYPE
☐　JOHN SMITH　　　　　APPLICANT
☐　VALENTINA ROMA　　APPLICANT
☐　RIZWAN HESS　　　　EMPLOYEE
...　　　　　　　　　　　...
☐　CATHY DOWNES　　　APPLICANT

CONCEPTUALIZATION OF JOB CANDIDATE INFORMATION

CROSS-REFERENCE TO RELATED APPLICATIONS

U.S. patent application Ser. No. 10/684,345 to Crow et al., filed Oct. 10, 2003, entitled "MATCHING JOB CANDIDATE INFORMATION" is hereby incorporated by reference herein.

TECHNICAL FIELD

The technical field relates to automated job candidate selection via computer software.

BACKGROUND

Despite advances in technology, the process of finding and hiring employees is still time consuming and expensive. Because so much time and effort is involved, businesses find themselves devoting a considerable portion of their resources to the task of hiring. Some companies have entire departments devoted to finding new hires, and most have at least one person, such as a recruiter or hiring manager, who coordinates hiring efforts. However, even a skilled recruiter with ample available resources may find the challenge of finding suitable employees daunting.

To hire employees, businesses typically begin by collecting a pool of applicant resumes. Based on the resumes, some of applicants are chosen for interviews; based on the interviews, offers are extended to a select few. Resumes can be collected in a variety of ways. With recent advances in computer technology, it is commonplace to collect resumes over the Internet via email or the World Wide Web. The Internet allows an applicant from anywhere in the world to send a resume in electronic form. Thus, the recruiter now has an incredibly large pool from which to choose applicants.

However, having so many choices can make it even more difficult to choose from among the applicants. A recruiter may be presented with hundreds of resumes in response to a single job posting. Sifting through so many resumes to find those appropriate applicants for further investigation is not an easy task and cannot be easily delegated to someone with no knowledge in the field. Finding the ideal applicant can be like finding the proverbial needle in a haystack.

One way of winnowing down the number of applicants is to enter resumes into an electronic database. The database can then be searched to find desired applicants.

The database approach can be useful, but it suffers from various drawbacks. Such databases typically allow a keyword search, but keyword searches may be over- or under-inclusive. For example, a keyword search for "software engineer" will not return candidates who list themselves as "computer programmers," even though these two titles are understood by those in the software field to be equivalent.

Another approach is to use statistical correlation. For example, after a review of many resumes, it may be determined that 85% of those resumes with the word "Java" also include the word "programmer." Thus, it can be assumed that an applicant specifying "Java" should be returned in a search for "programmer." However, some such statistical correlations may be misleading, leading to nonsensical results. For example, a person working in a coffee shop may include the word "Java" in a resume, but those with experience in coffee are not expected to be provided in a search for programmers.

SUMMARY

Thus, there remains significant room for improvement in the applicant search process.

Various technologies described herein relate to conceptualization of job candidate data. Conceptualization can include a process of converting a document (e.g., a resume) into an abstract representation that desirably accurately reflects the intended meaning of the author, without regard to the specific terminology used in the document. For example, job candidate data can be conceptualized via a conceptualizer. Subsequently, desired criteria for a job candidate can be matched to job candidates whose data has been conceptualized.

The conceptualizer can include an ontology, which can represent knowledge about the field of human resources, including knowledge about how candidates describe themselves in their resumes. The ontology can include one or more taxonomies, which can be hierarchically arranged, specifying roles, skills, and the like. For concepts arranged in a hierarchical fashion, parent concepts can be extracted based on the presence of child concepts.

The extracted concepts can be associated with a concept score. Such a concept score can, for example, generally indicate the candidate's level of experience with respect to the associated concept.

Via the concept scores, conceptualized job candidate data can be represented by a point in n-dimensional space, sometimes called the "concept space." Similarly, desired criteria can be represented in the same concept space. A match engine can then easily find the m closest job candidates, such as by employing a distance calculation or other match technique. Such an approach can be efficient, even with a large job candidate pool.

In addition to ontology extractors, various other technologies can be employed. For example, ontology-independent heuristic extractors can be used. Such extractors can include extractors extracting a management concept, concepts in a skills list, or concepts in a job title. Such extractors can extract concepts not found in an ontology. Extractors can be designated as trusted or speculative.

After determining the matches, further job candidate analytics can be provided, such as a management score, a job hopper score, and a career trajectory score.

A learning system can be used to assist in ontology updating. The learning system can propose terms for inclusion in the ontology and also suggest a position at which the proposed term should be included within the ontology.

Additional features and advantages of the various embodiments will be made apparent from the following detailed description of illustrated embodiments, which proceeds with reference to the accompanying drawings.

The technologies include the novel and nonobvious features, method steps, and acts alone and in various combinations and sub-combinations with one another as set forth in the claims below. The present invention is not limited to a particular combination or sub-combination thereof. Technology from one or more of any of the examples can be incorporated into any of the other examples.

BRIEF DESCRIPTION OF THE DRAWINGS

FIG. 30 shows a screen shot of an exemplary user interface for presenting a list of matching candidates.

DETAILED DESCRIPTION OF EXEMPLARY EMBODIMENTS

Exemplary Overview of Exemplary Conceptualization System

Figure 1:
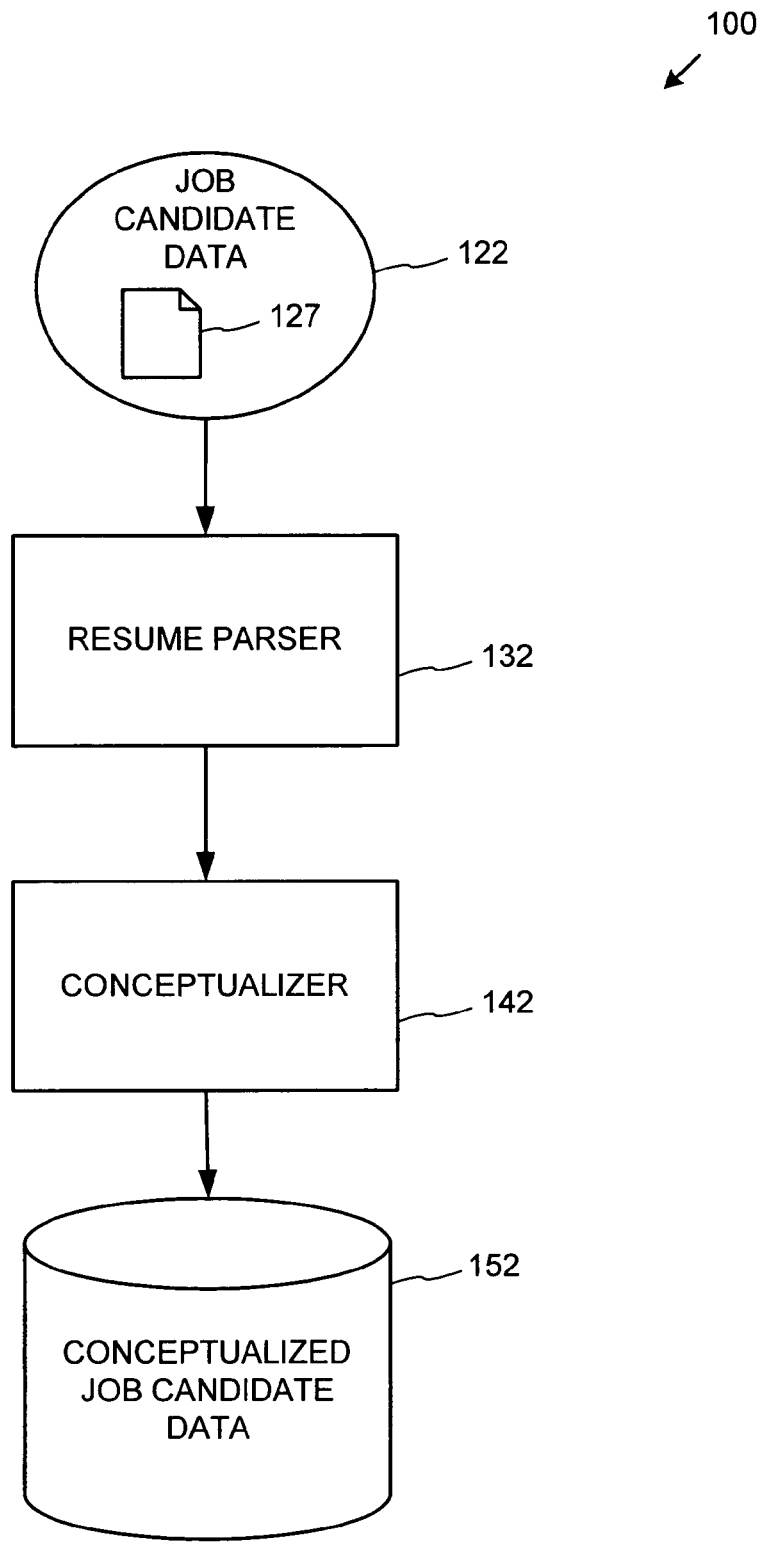
FIG. 1 is a block diagram showing an exemplary system for conceptualizing job candidate data.

FIG. 1 is a block diagram showing an exemplary system 100 for conceptualizing job candidate data. In the example, the job candidate data 122 is represented in electronic form (e.g., a digital representation in one or more computer readable media) and can include an electronic representation 127 of the candidate's resume or a portion thereof.

A resume parser 132 can convert the unstructured job candidate data into a structured representation (e.g., organized into a uniform format) of the data. The resume may be in suitable form such that a parser is not needed.

A conceptualizer 142 analyzes the structured job candidate data 122 to generate conceptualized job candidate data 152. The conceptualized job candidate data 152 includes one or more concepts extracted (e.g., identified) via analysis of the job candidate data 122. The same concept can be extracted from the job candidate data 122 in a variety of ways. For example, because two candidates may describe the same concept using different language, the same concept may be extracted from two different resumes even though the same language does not appear in the resumes. For example, the concept can be extracted if language somehow denoted as related to a concept is found. For instance, a resume describing a candidate as a "VOIP Engineer" and another resume describing another candidate as a "PBX Engineer" can be represented in software by the same concept.

Exemplary Overview of Conceptualization Method

Figure 2:
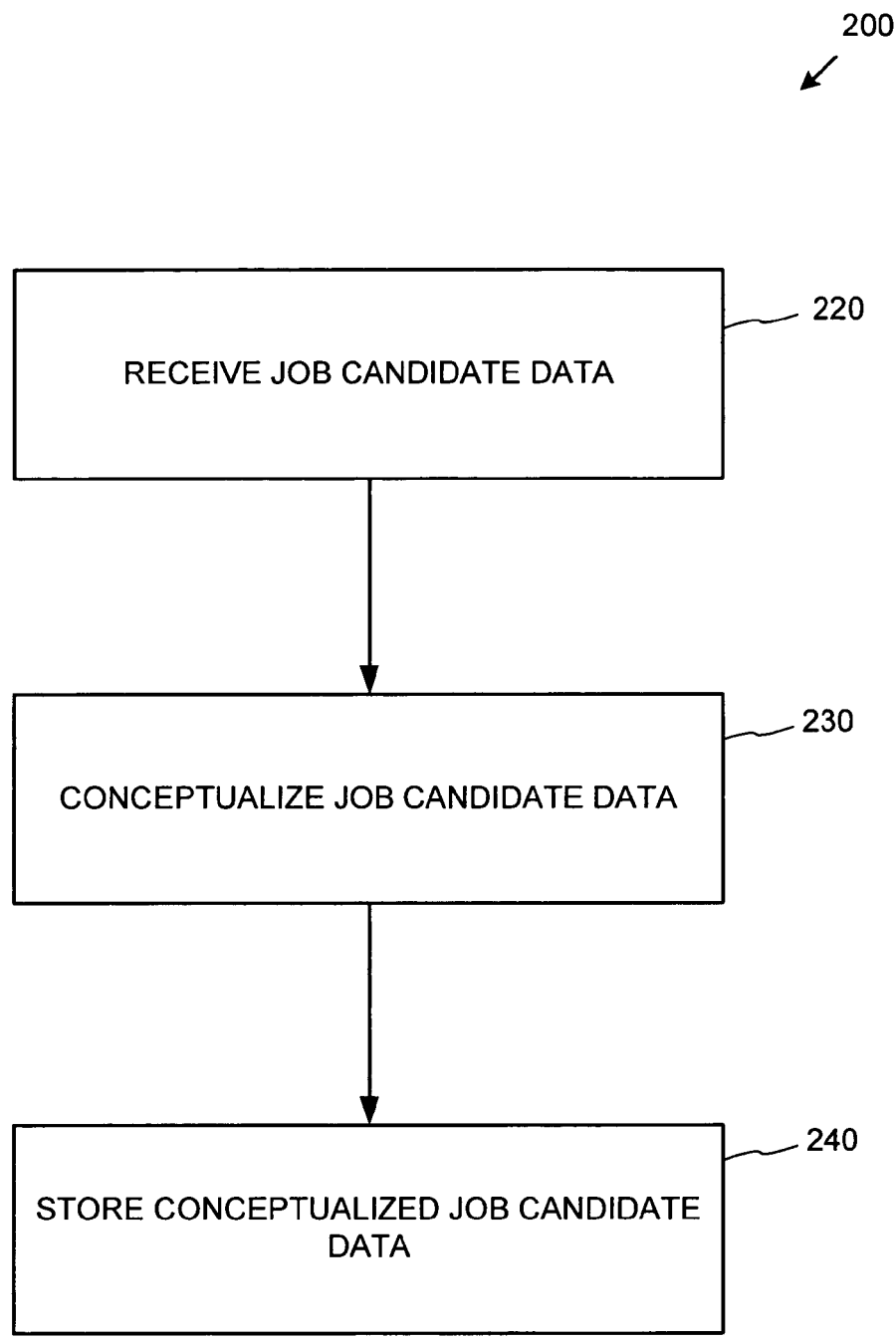
FIG. 2 is a flowchart showing an exemplary method for conceptualizing job candidate data.

FIG. 2 is a flowchart showing an exemplary method 200 for conceptualizing job candidate data (e.g., the job candidate data 122 of FIG. 1). Although not required, the job candidate data can be structured. Consequently, the data is identified as structured job candidate data in some cases below. At 220, the job structured candidate data is received. At 230, the structured job candidate data is conceptualized (e.g., via a conceptualizer such as the conceptualizer 142 of FIG. 1) to generate conceptualized job candidate data. Then, at 240, the conceptualized job candidate data is stored (e.g., for later matching to desired job candidate criteria). The conceptualized job candidate data can be pooled with data from other candidates to provide a pool of candidates which can be searched to find desirable candidates.

Conceptualized job candidate data can be stored as a point in n-dimensional space. For example, the conceptualizer can extract a series of concepts from the job candidate data and assign a score for the respective concepts. The respective concepts can be taken to be dimensions in the space, and the score can be the position at which the job candidate appears on the respective dimension. For example, the three scored concepts were extracted for a particular job candidate were "Java 25," "Sales 47", and "Management 23" then the job candidate would be stored at the co-ordinate (25, 47, 23) in the 3-dimensional space whose dimensions are labeled "Java," "Sales," and "Management."

Exemplary Overview of Matching System

Figure 3:
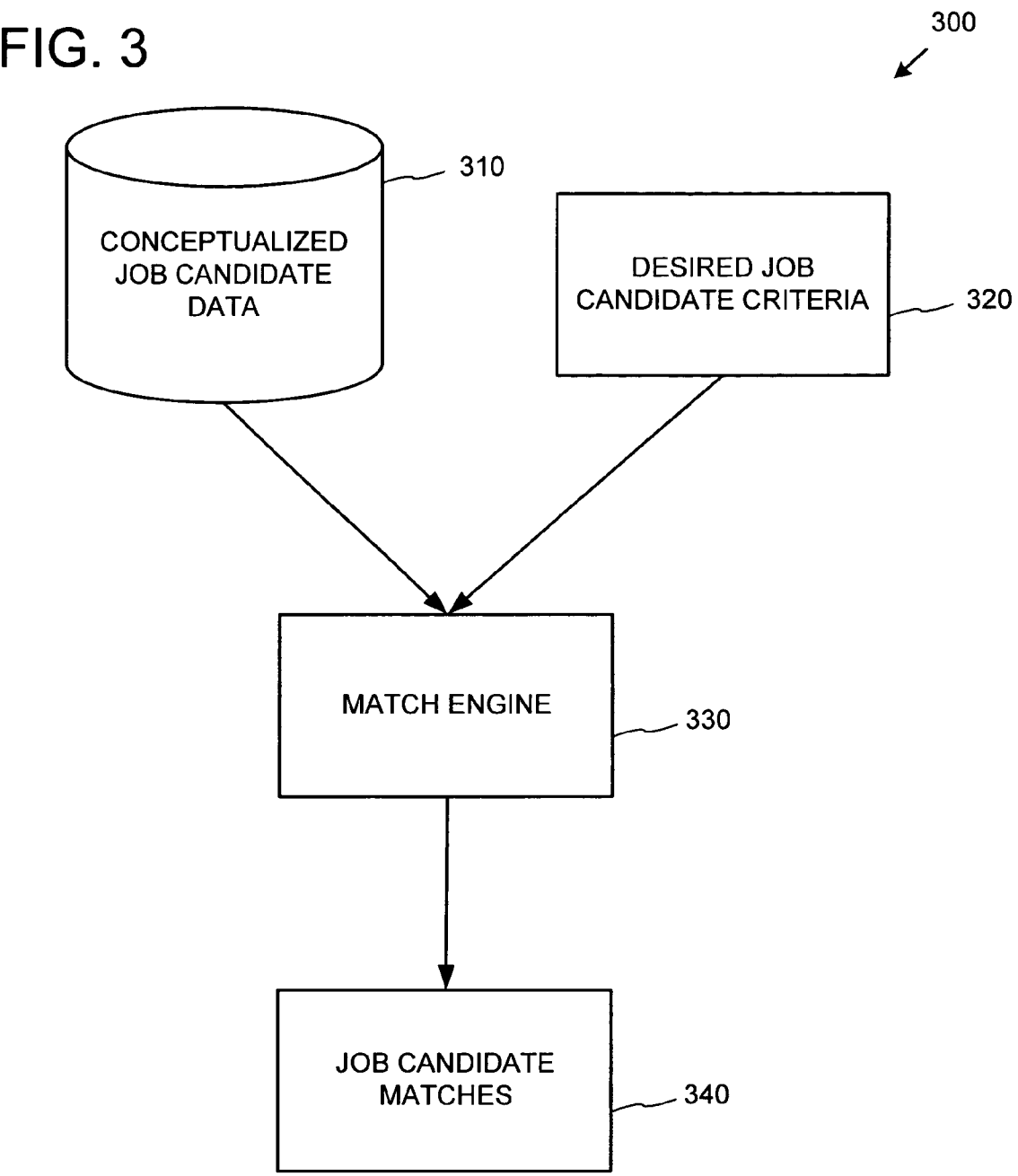
FIG. 3 is a block diagram showing an exemplary system for finding job candidate matches via conceptualized job candidate data.

FIG. 3 is a block diagram showing an exemplary system 300 for finding job candidate matches via conceptualized job candidate data. In the example, the conceptualized job candidate data 310 can comprise conceptualized job candidate data (e.g., the conceptualized job candidate data 152 of FIG. 1) for a plurality of job candidates (e.g., including the data 152 based on the job candidate data 122 of FIG. 1). The desired job candidate criteria 320 specify qualities desired to fill a job. For example, a job requisition can be converted to desired job candidate criteria (e.g., via conceptualization of the job requisition).

The match engine 330 can analyze the conceptualized job candidate data 310 and the desired job candidate criteria 320 to find the one or more job candidate matches 340, if any, matching the desired job candidate criteria. A "match" can be defined in a variety of ways. For example, in a system using scoring, the m closest matches can be returned, or some other system can be used. Certain job candidates can be excluded from the match via specification of range or other designated requirements. In such an arrangement, those candidates not meeting the designated requirements are not returned as a match.

If desired, the system 300 can be combined with the system 100 of FIG. 1 to form a system that can both conceptualize and match job candidates.

Exemplary Matching Method

Figure 4:
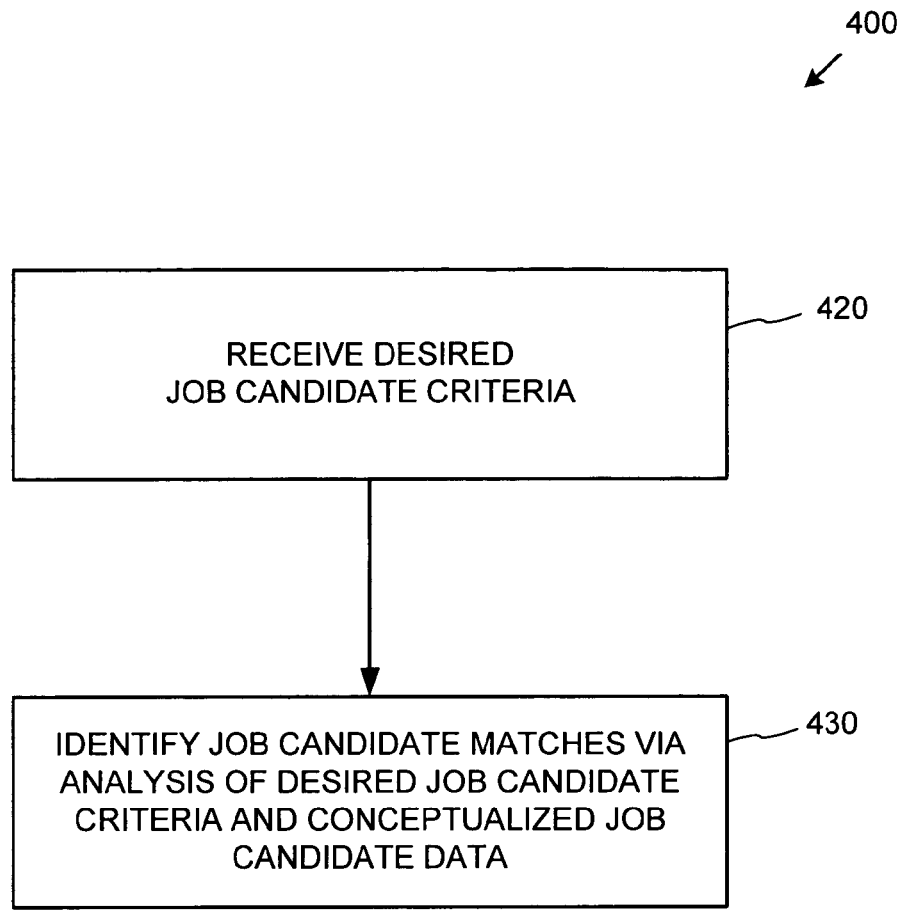
FIG. 4 is a flowchart showing an exemplary method for matching desired job candidate criteria to conceptualized job candidate data.

FIG. 4 shows an exemplary method 400 for matching desired job candidate criteria to job candidate data. At 420, desired job candidate criteria (e.g., the desired job candidate criteria 320 of FIG. 3) are received. At 430, one or more job candidate matches are identified via analysis of the desired job candidate criteria and conceptualized job candidate data (e.g., the conceptualized job candidate data 310 of FIG. 3). As described earlier, a "match" can be defined in a variety of ways.

Exemplary Conceptualizer

Figure 5:
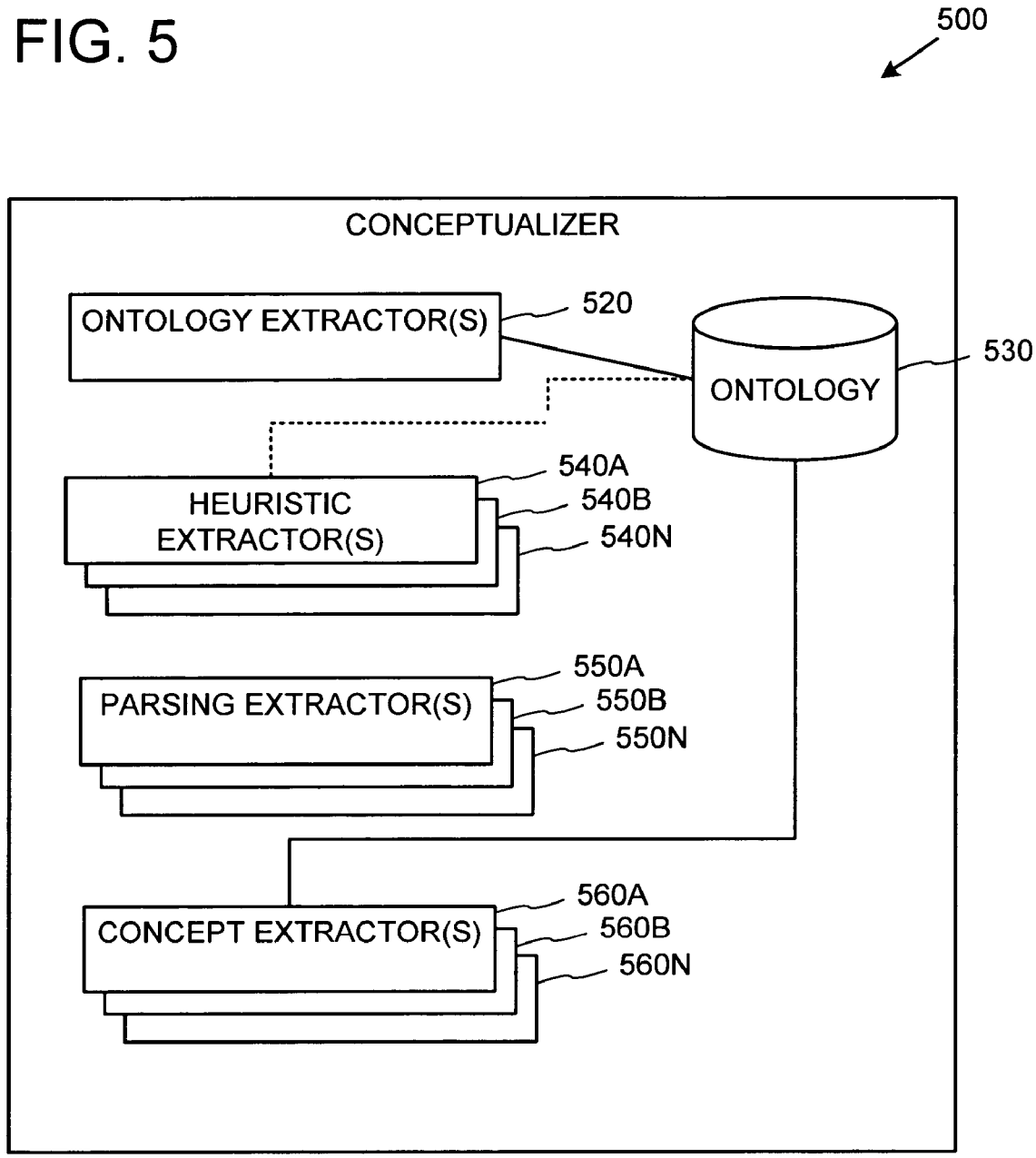
FIG. 5 is a block diagram showing an exemplary conceptualizer.

FIG. 5 shows an exemplary conceptualizer 500. The conceptualizer 500 can include expert knowledge embedded therein. Such a conceptualizer can be used in any of the examples described herein.

In the example, the conceptualizer 500 can include one or more ontology extractors 520 and associated one or more ontologies 530. One or more ontology-independent heuristic extractors 540 can also be included. The ontology-independent heuristic extractors 540 can work in conjunction with or independently of the ontology extractors 520. One or more ontology-independent parsing extractors 550 can also be included. The ontology-independent parsing extractors 550 can work in conjunction with or independently of the ontology extractors 520.

The conceptualizer 500 can also include one or more concept scorers 560. The concept scorers 560 can work in conjunction with or independently of the other components of the conceptualizer 500.

The ontology extractors 520, the heuristic extractors 540, and the concept extractors 560 can rely on knowledge embedded therein that is specific to the domain of human resources (e.g., roles, skills, and other qualities of job candidates). In the example, the parsing extractors 550 need not use embedded knowledge that is specific to the field of human resources. Such domain-specific knowledge can be accessed by the extractors in the form of various rules, relationships, and other data stored in or accessible to the conceptualizer 500. The exemplary conceptualizer can include functionality for parsing job candidate data. The conceptualizer can serve to extract concepts (e.g., roles, etc.), normalize the language found in the job candidate data, score the concepts extracted, or any combination thereof.

In any of the examples herein, the term "extract" can include scenarios in which a concept is extracted, even though the concept name itself (e.g., in haec verba) does not appear in the job candidate data.

Exemplary Concepts

In any of the examples herein, any number of concepts can be represented by the system. For example, any of a variety of concepts related to (e.g., in the domain of) human resources (e.g., job titles, job skills, etc.) can be represented and extracted from job candidate data. Desirably, new concepts can be added after deployment of the system.

Although some of the examples herein show a small number of concepts, it is possible to represent many more (e.g., 100 or more concepts; 1,000 or more concepts; 10,000 or more concepts; 100,000 or more concepts; 1,000,000 or more concepts; or 3,000,000 or more concepts, etc.).

Exemplary Ontology

Figure 6:
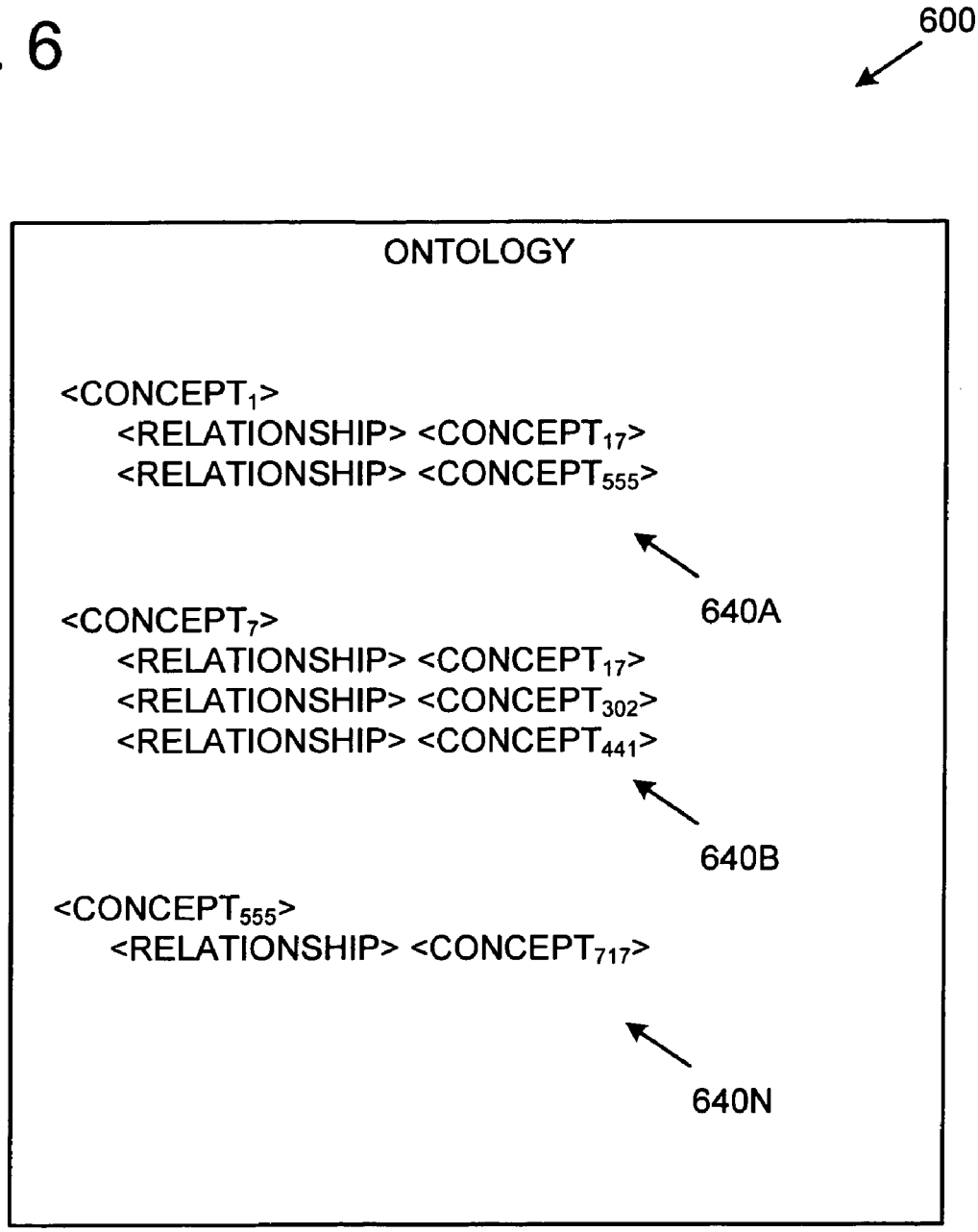
FIG. 6 is a block diagram showing an exemplary ontology.

FIG. 6 shows an exemplary ontology 600. In the example, a plurality of concept entries 640A, 640B, and 640N provide information about how to extract (e.g., identify) concepts in job applicant data and how concepts are related to each other. The ontology can be used by an ontology extractor (e.g., the ontology extractor 520 of FIG. 5) to extract concepts in job applicant data. In any of the examples described herein, an ontology can be represented via a variety of data structures. For example, a database can be used to indicate relationships between entries in the ontology.

Concept entries can be organized via taxonomies. A taxonomy can include a plurality of concept entries related to a particular family of concepts (e.g., job roles, job skills, and the like). A hierarchical arrangement within the taxonomy can further organize the concepts via parent-child relationships. In some cases, such relationships can be advantageous in further extracting concepts within job applicant data (e.g., via identification of language related to sibling concepts). However, relationships can cross taxonomy boundaries. For example, a role can be associated with one or more skills or one or more other roles. Similarly, a skill may be associated with one or more roles or one or more other skills.

Before being included in the ontology, entries, and the relationships between them can be reviewed by a human reviewer (e.g., a trained ontologist). For example, it may be desirable to limit the ontology to only those entries and relationships approved by a human reviewer. Such an approach can significantly increase quality and relevance of the knowledge stored in the ontology.

Exemplary Method for Extracting Concepts via an Ontology

Figure 7:
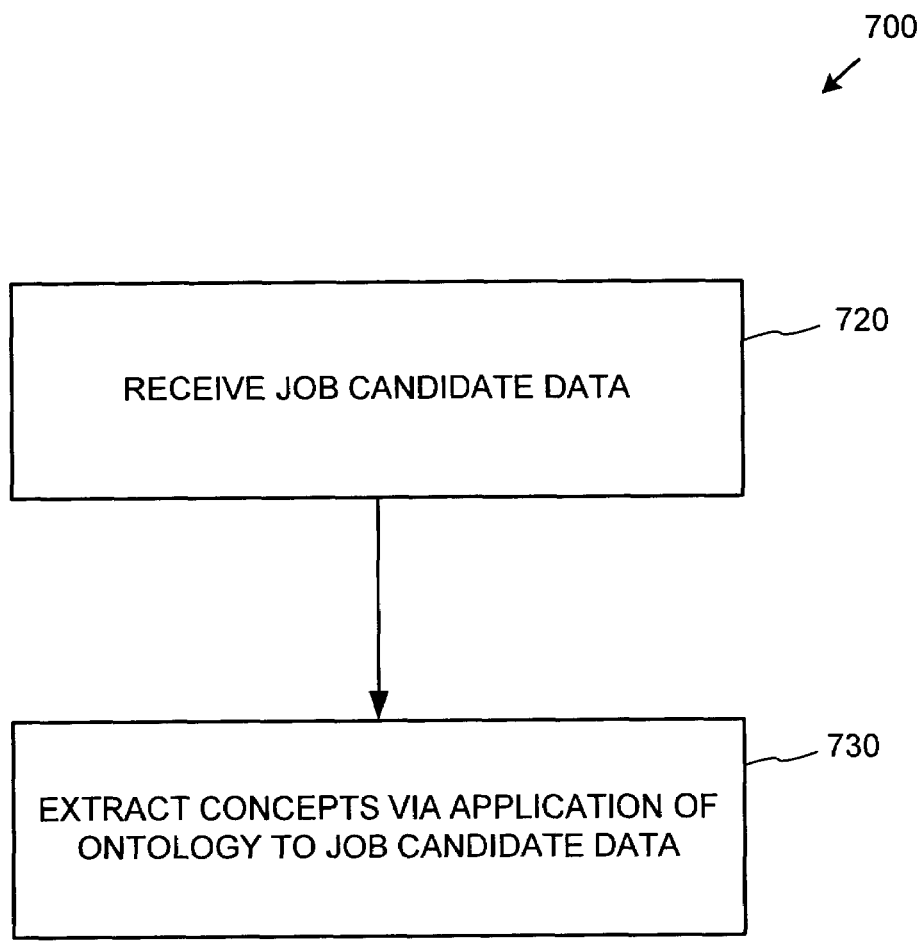
FIG. 7 is a flowchart showing an exemplary method for extracting concepts in job candidate information via an ontology.

The software can use the ontology to locate phrases in job candidate information (e.g., including a resume) that represent concepts. FIG. 7 shows an exemplary method 700 for extracting concepts in job candidate information via an ontology. At 720, job candidate information (e.g., the job candidate data 120 of FIG. 1) is received. At 730, concepts are extracted via application of one or more ontologies (e.g., the ontology 600 of FIG. 6) to the job candidate data.

The extraction of concepts via the ontologies can be performed by one or more ontology extractors (e.g., the ontology extractors 520 of FIG. 5). In addition to the ontology extractors, heuristic extractors (e.g., the ontology-independent heuristic extractors 540 of FIG. 5) and parsing extractors (e.g., the ontology-independent parsing extractors 550 of FIG. 5) can participate in the extraction of concepts in the job candidate data.

Exemplary Ontology Extractor

An exemplary ontology extractor can use one or more ontology objects stored in the ontology to extract concepts from job candidate data (e.g., the job candidate data 120 of FIG. 1). A method by which the ontology extractor operates can include actions for extracting concepts from job candidate data. For example, job candidate data can be received, and one or more concepts can be extracted by matching examples of an ontology object to job candidate data.

Exemplary Ontology-Independent Heuristic Extractor and Method

Figure 8:
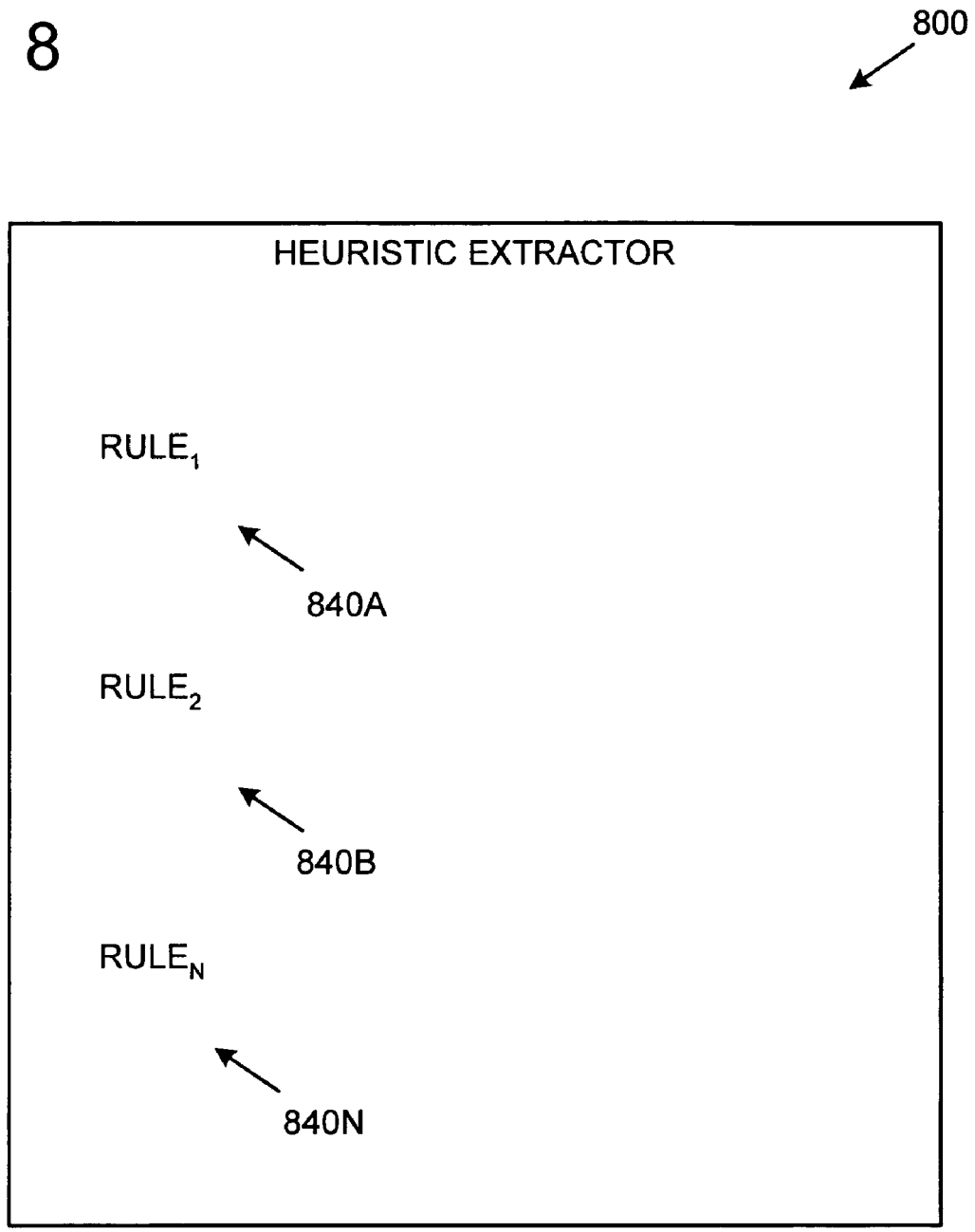
FIG. 8 is a block diagram showing an exemplary heuristic extractor, such as that shown in FIG. 5.

FIG. 8 shows an exemplary ontology-independent heuristic extractor 800, such as that for use in the system of FIG. 5. In the example, the ontology-independent heuristic extractor 800 includes one or more rules 840A, 840B, and 840N for extracting concepts from job candidate data (e.g., the job candidate data 120 of FIG. 1). The extractor 800 can also include parsing logic for assisting in applying the rules to the job candidate data.

Figure 9:
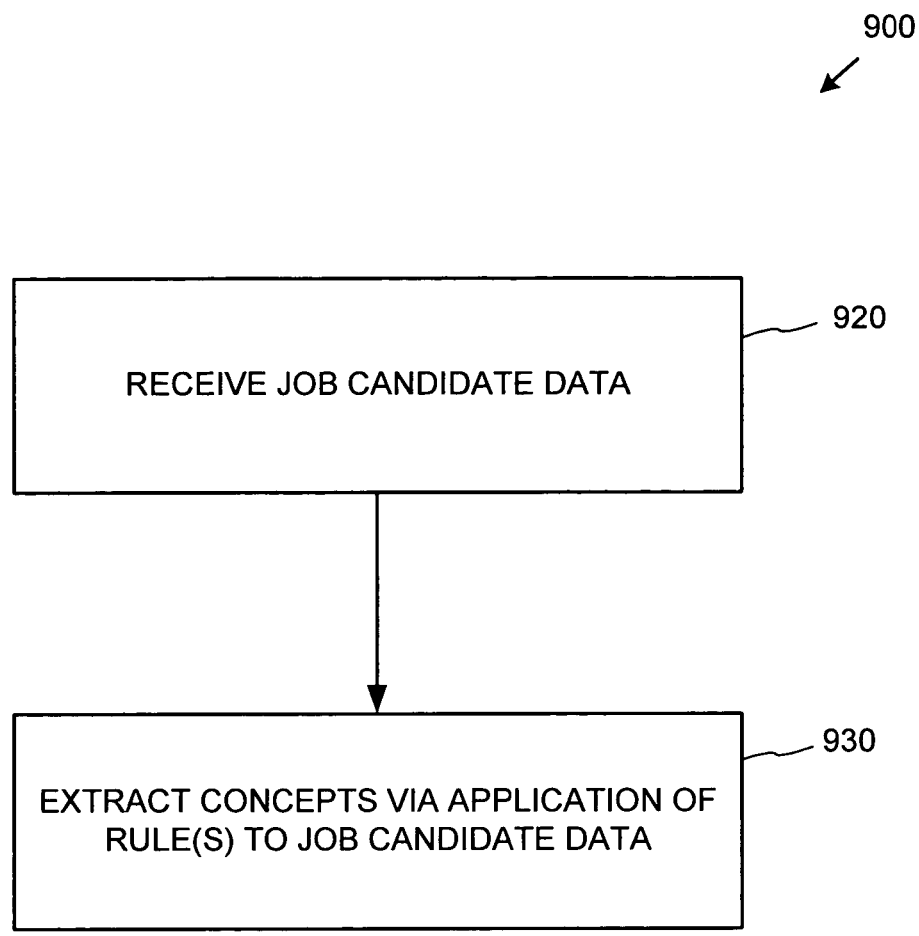
FIG. 9 is a flowchart showing an exemplary method for extracting concepts via a heuristic extractor, such as that shown in FIG. 8.

FIG. 9 shows an exemplary method 900 by which an exemplary ontology-independent heuristic extractor (e.g., the heuristic extractor 800 of FIG. 8) extracts concepts from job candidate data. At 920, job candidate data is received. At 930, one or more concepts are extracted by applying the rules to the job candidate data.

Exemplary Concept Scoring

Any of the methods and systems (e.g., the concept scorers 560 of FIG. 5) described as extracting concepts herein can also provide a concept score associated with the concept. Such a score can indicate the level of experience (e.g., expertise) a job candidate has for the associated concept and can be based on the job candidate data. The score can take a number of factors into account (e.g., length of time associated with the concept in the job candidate's history, recency of the concept in the job candidate's history, and the like).

Figure 10:
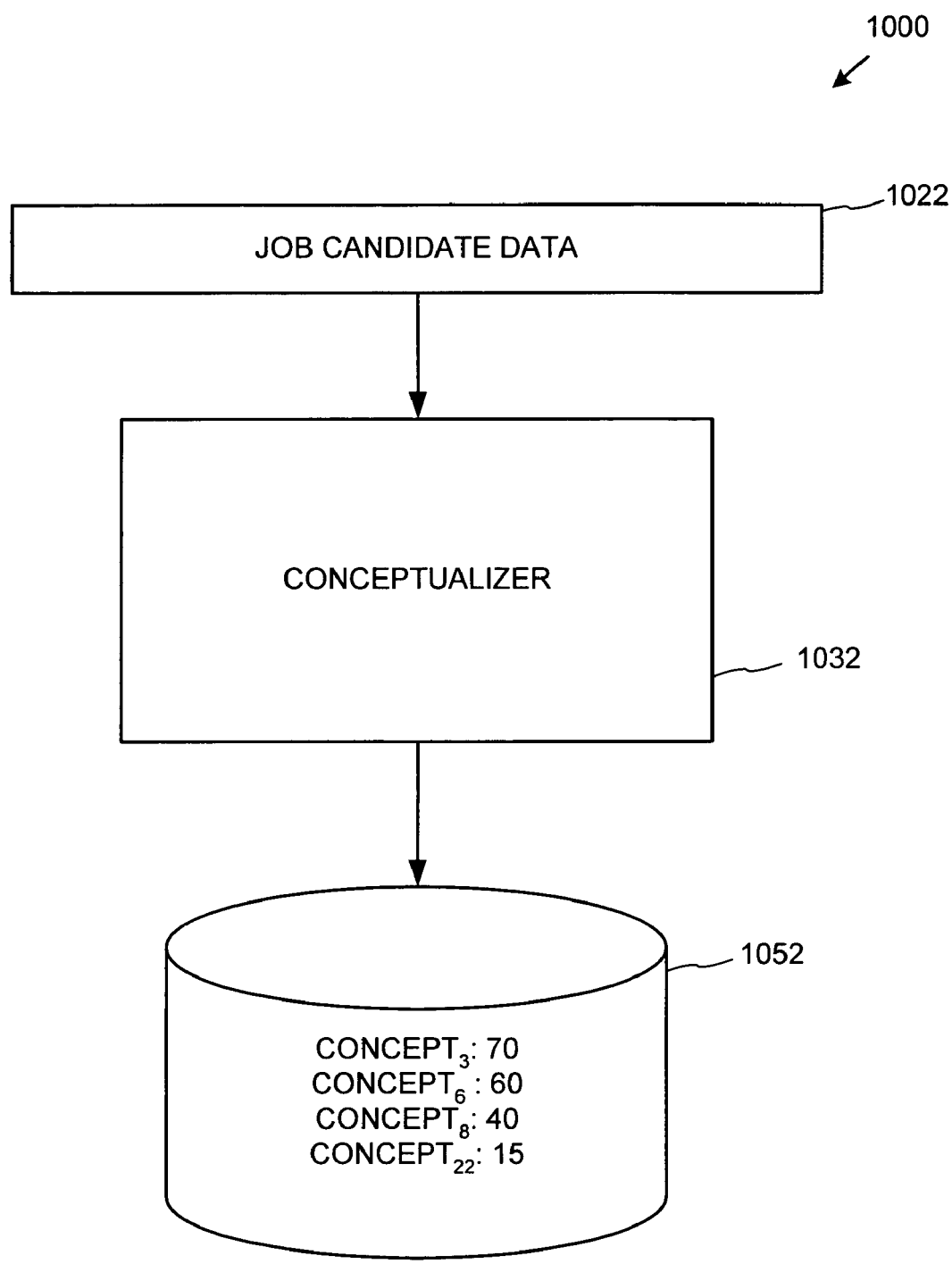
FIG. 10 is a block diagram showing an exemplary system for generating concept scores.

FIG. 10 shows an exemplary system 1000 for generating concept scores from job candidate data. Such a system can be integrated into the system 100 of FIG. 1. The job candidate data 1022 (e.g., the job candidate data 122 of FIG. 1) is analyzed by a conceptualizer 1032 (e.g., the conceptualizer 132 of FIG. 1) to generate scored conceptualized job candidate data 1052. Although numerical scores are shown, the scores can take other forms (e.g., specialized formats suitable for special-purpose concepts)

Figure 11:
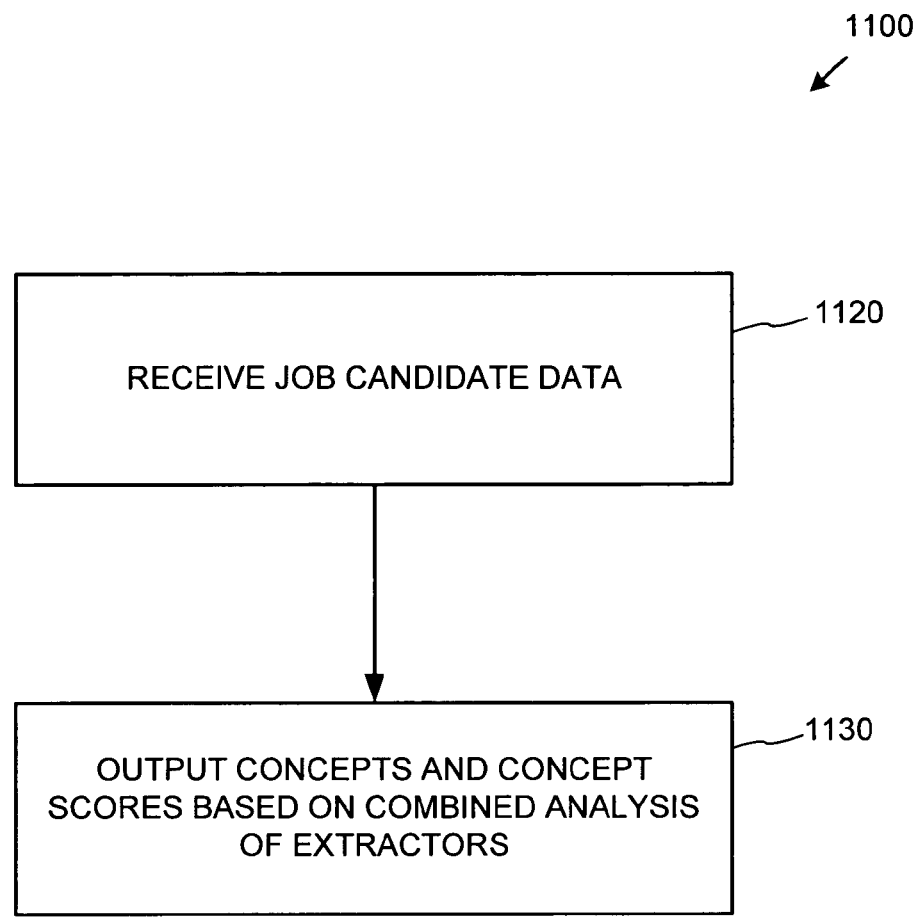
FIG. 11 is a flowchart showing an exemplary method for generating concept scores via one or more extractors.

FIG. 11 shows an exemplary method 1100 for generating concept scores from job candidate data. At 1120, job candidate data (e.g., the job candidate data 122 of FIG. 1) is received. At 1130, concepts and their associated scores are output based on analysis by the conceptualizer (e.g., the combined analysis of the extractors 520 and 540 of FIG. 5).

Exemplary System for Matching via N-Dimensional Space

Figure 12:
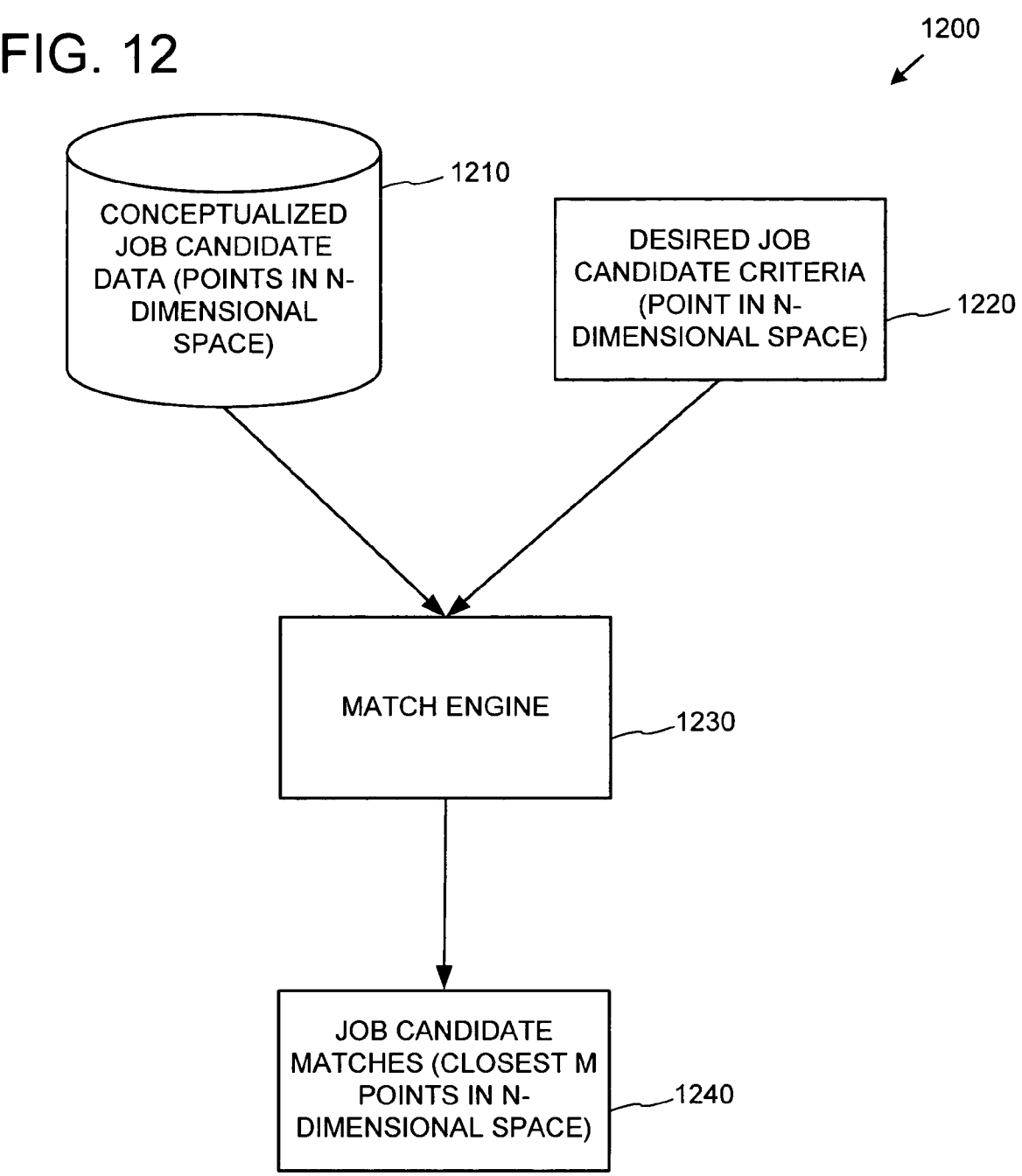
FIG. 12 is a block diagram showing an exemplary system for finding matches via the concept space.

A technique involving an n-dimensional concept space can be used to match candidates to desired job criteria. FIG. 12 shows an exemplary system 1200 for matching job candidates to desired job candidate criteria. The system includes conceptualized job candidate data 1210 which represents candidates as points in an n-dimensional concept space. For example, the job candidate data 122 of FIG. 1 can take the form of concepts and related concept scores.

Any set of concept scores can be represented as a point in an n-dimensional space (e.g., n dimensions for n concepts). A candidate can thus be represented by a point, the point defined in an n-dimensional space, axes of the space being defined for the concepts (e.g., n=the number of concepts), and the concept score indicating where on the axis the point falls.

Similarly, the desired job candidate criteria 1220 can take the form of a point in the same n-dimensional concept space. The match engine 1230 can then easily determine the closeness of the match points using one or more criteria. For example, the match engine may determine the distance in the n-dimensional space between the point 1220 representing the desired job candidate criteria and the points 1210 representing the respective job candidates. The result is job candidate matches 1240 (e.g., the closest m points in the n-dimensional concept space).

For example, consider the extract from a job candidate resume shown in Table 1 (ABC, Inc. is a fictitious company in the example). From this information, a conceptualizer might extract the concepts and their associated scores shown in Table 2.

TABLE 1

Extract of a job candidate resume

ABC, Inc.
1999-present
Corporate Loss Director
Conducted internal and external investigations-
Reviewed exception reports - Conducted new
Store risks assessments - Coordinated installation
of EAS and CCTV systems - Supervised 11
district managers in loss prevention/security
functions - Audited distribution and supply chain
systems - Coordinated integrity testing and
internal shopping services

TABLE 2

Concepts Extracted from the Resume Shown in Table 1

| Concept | Score |
|---|---|
| Company__ABC, Inc. | 75 |
| Industry__Drug Stores | 65 |
| Industry__Retail Stores | 55 |
| Most Recent | 100 |
| Role__Loss Prevention Director | 78 |
| Electronic Article Surveillance Systems | 64 |
| CCTV Equipment | 64 |
| Security Tools | 51 |
| Property Protection | 38 |
| Management | 57 |

This would resolve the job candidate to the point (75, 65, 55, 100, 78, 64, 64, 51, 38, 57) in a 10-dimensional concept space $Cand_{10}$.

Given the following job requisition: "An experience loss prevention director who has worked for a drug store. Property protection experience is required," the conceptualizer might translate the job requisition into the concepts shown in Table 3.

TABLE 3

Concepts Extracted from the Exemplary Job Requisition

| Concept | Score |
|---|---|
| Industry__Drug Stores | 70 |
| Role__Loss Prevention Director | 60 |
| Property Protection | 50 |

The extracted concepts of Table 3 define a point at co-ordinates (70,60,50) in a 3-dimensional space $Req_3$. The 3-dimensional space $Req_3$ is a strict sub-space of $Cand_{10}$. (i.e., the three dimensions of $Req_3$ appear in the space of $Cand_{10}$). This means that the three dimensions Industry_Drug Stores, Role_Loss Prevention Director, and Property Protection can be extracted from $Cand_{10}$ to form a 3-dimensional sub-space $Cand_3$. Because $Cand_3$ has the same dimensions as $Req_3$, the two points representing the requisition and the candidate can now be placed in a single sub-space and compared. If desired the two points can be depicted graphically in 3-dimensional space.

The distance between the requisition and the candidate can now be calculated using a simple geometric equation as one exemplary way of determining a match. For a 3-dimensional space, the following equation can be used:

$$distance = \sqrt[3]{dx^3 + dy^3 + dz^3}$$

In the example, the distance calculation proceeds as follows:

$$\begin{aligned} distance &= \sqrt[3]{(|70-65|)^3 + (|60-78|)^3 + (|50-38|)^3} \\ &= \sqrt[3]{15^3 + 18^3 + 12^3} \\ &= \sqrt[3]{3375 + 5832 + 1728} \\ &= \sqrt[3]{10935} \\ &= 22.196 \end{aligned}$$

The distance value from the requisition to all candidates that can be represented in the $Req_3$ sub-space is calculated and used to rank order the candidates. The lower the distance value, in the example, the more well matched the candidate is to the requisition and therefore the higher the candidate appears in the rank ordering. In an optional approach, a threshold or other requirements can be designated with the system ignoring candidates who do not at least meet the threshold.

Although the described distance function is a Euclidean distance function, other (e.g., non-Euclidean) distance functions can be used. For example, a hyperbolic or elliptical distance function can be employed, or a non-geometric semantic distance function can be defined and used.

Exemplary Closest Matches

Figure 13:
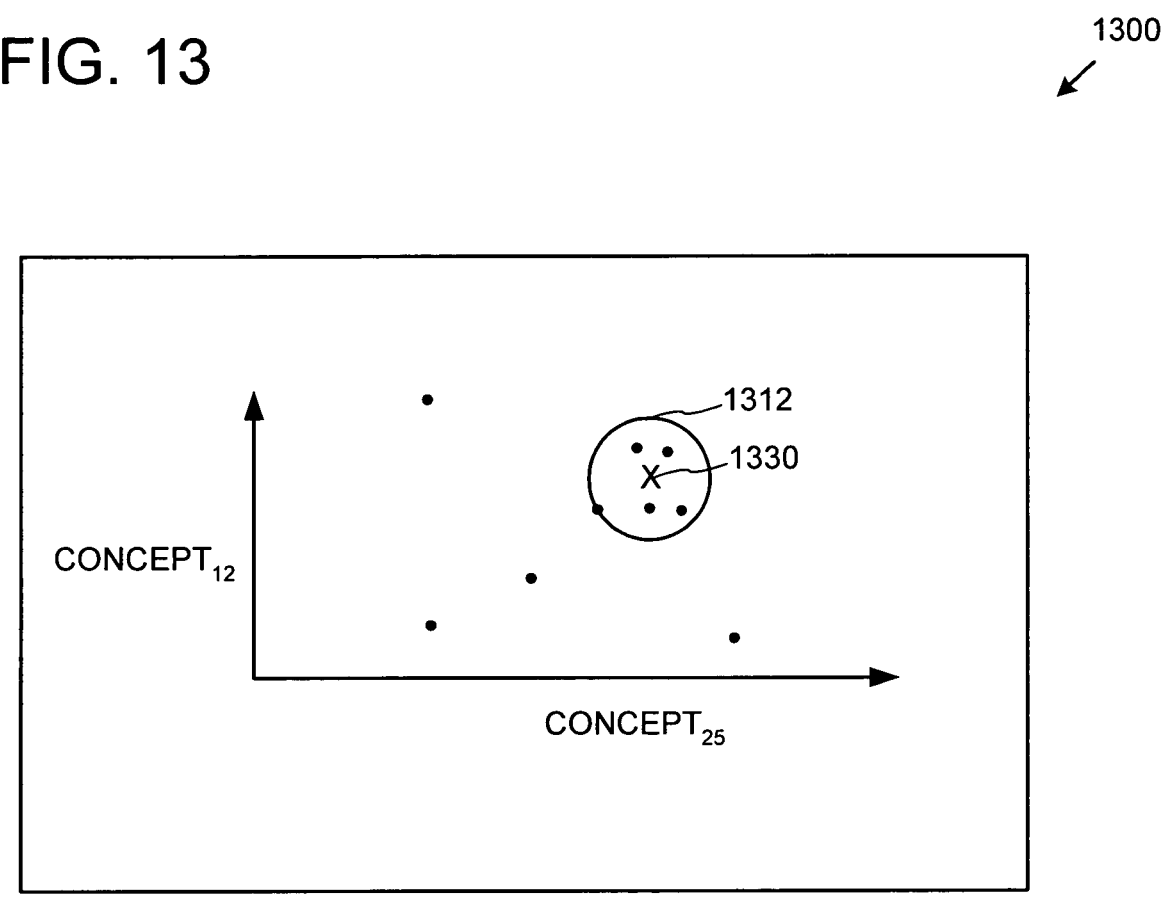
FIG. 13 is a diagram showing the m closest matches in concept space for exemplary desired job candidate criteria.

FIG. 13 is a diagram 1300 showing exemplary closest matches 1312 to the desired job candidate criteria 1330. For the purposes of illustration, only two dimensions are shown in the diagram 1300; however, in practice, any number of dimensions (e.g., n) can be used.

In the example, the desired job candidate criteria is represented as a point 1330 according to two concept scores for the two concepts shown. The various other points in the diagram in the example are points in the n-dimensional space representing candidates having associated job candidate data from which the same two concepts have been extracted and scored. The illustrated points are defined by the concept scores associated with the respective candidates.

The closest m points (e.g., five points in the example) 1312 can thus be found. The respective job candidates can be designated as those candidates closest to the desired criteria represented by the point 1330 (e.g., the five closest matches). The designated candidates can be stored for further consideration or presented to a user (e.g., a decision maker) for further review.

Although the example shows concepts represented in a linear manner, other arrangements are possible, such as for the special purpose concepts described herein.

Exemplary Concept Scoring Calculation

An exemplary formula for calculating one suitable concept score is as follows:

Concept Score=length of service * recency factor+related skills In the example, the concept score can range from 1-100, where 1 indicates the candidate has no or marginal experience with a concept, and 100 indicates the candidate is an expert. Other ranges can be used as desired.

Length of service can take the form of the number of months that the job lasted in which the concept was used. Recency factor weighs the recency of the experience. It can be calculated from the end date of the related job. So, for example, jobs ending in the last month may have a recency factor of 1.0, which the factor dropping asymptotically over time (e.g., according to the formula 1/(number of years)). Any number of other arrangements are possible for recency (e.g., using any other constant k instead of 1 or another mathematical relationship).

Related skills can add to the score depending, for example, on the related skills the candidate used in the same job. The total score of the related skills are added to the score of the concept, and may be weighted by a factor based on closeness in the ontology. For example, a sibling skill can have a factor of 0.5.

For example, if a candidate's most recent position was as an industrial designer at a software company, where she worked for the last three years, ignoring related skills, an exemplary score for the "industrial design" concept would be:

$$\begin{aligned} Score &= length\ of\ service * recency\ factor \\ &= 36 * 1.0 \\ &= 36 \end{aligned}$$

By contrast, a sales manager who worked for twelve months five years ago would score:

$$\begin{aligned} Score &= length\ of\ service * recency\ factor \\ &= 12 * (1/5) \\ &= 12 * 0.2 \\ &= 2 \end{aligned}$$

Scores can be accumulated across jobs within a resume. To avoid "gaming" the system by simply repeating a term within a resume, each additional occurrence of a concept beyond the second may be given less weight. For example, after the fourth occurrence of a term, little or no further score can be gained.

Factoring in related skills can improve the accuracy of the concept score. The factor used to add to the score for a skill can depend on the relationship between the skills. Table 4 shows some of the possible factors.

TABLE 4

Bonus Scores for Related Skills

| Relationship | Factor |
| --- | --- |
| Sibling | 0.5 |
| Parent | 0.6 |

TABLE 4-continued

Bonus Scores for Related Skills

| Relationship | Factor |
| --- | --- |
| Child | 0.4 |
| Related-To | 0.3 |

A developer for the Java programming language might have the following skill scores: Java programming, 45; C++ programming, 35; UML, 30. Assuming the "Java" skill and the "C++" skills are siblings (e.g., both are children of the "Object Oriented Programming Language" skill), and UML is related to Java programming but not to C++, the Java programming score can be adjusted as follows:

Java programming=45+0.5*35+0.3*30=71.5

Similarly, the C++ programming score becomes as follows:

C++ programming=35+0.5*45=57.5

Related skills scores can be applied before the skill's own related skills score is calculated. Other arrangements are possible, for example, a subset of the features or additional features can be implemented in the scoring technologies.

Other factors can be taken into account when calculating a concept score. For example, the frequency of occurrences of a concept or related words in a resume can contribute to the overall score of the concept.

Special Organizations

In some cases, it may be desirable to increase a concept score based on the organization for which the applicant worked. For example, the reputation of an organization can result in an increased concept score. A nexus between the organization's reputation and the concept may indicate more valuable experience. For example, an applicant who has worked at a reputable software development film doing software development can be given extra score, but an applicant who worked at a lesser known firm or who happened to be doing software development at another business (e.g., a bank) might not be awarded the extra score.

A list of noted organizations and their areas of expertise can be stored (e.g., in the ontology) and consulted by the software. The list can be updated, for example, by a human reviewer.

Exemplary Trusted and Speculative Concept Extractors

Any of the concept extractors described herein can be defined as either trusted or speculative. Concepts determined by a trusted concept extractor are accepted as true by the software, whereas speculative concept extractors can vote on whether a concept should be accepted as extracted or not.

Any number of voting arrangements can be supported. For example, voting can be set up so that if n (e.g., 2) or more speculative concept extractors extract the same concept, it is accepted. Or, a rating (e.g., percentage system) can be used. For example, trusted extractors can indicate a concept at 100%, where the speculative extractors can indicate something less than 100%. If the sum of the percentages of the speculative extractors for a particular concept reaches or exceeds 100%, the concept is accepted.

For instance, in any of the examples described herein, extractors related to an ontology can be designated as trusted, while other extractors can be designated as speculative.

Related to the technology of trusted extractors is the practice of reviewing information relied upon by the extractors. For example, ontology entries can be limited to those entries and relationships approved by a human reviewer. Any of the extractors described herein can be so limited and may be thus designated as a trusted extractor.

Another possible noting arrangement is to take the maximum score of any of the speculative extractors. Such an approach approximates the OR Boolean operator.

Exemplary Taxonomy

In any of the examples described herein, a taxonomy can take a variety of forms to represent knowledge. For examples, an entry in a taxonomy can be defined as a concept having synonyms, sibling concepts, and linked items (e.g., entries in the same or a different taxonomy). The taxonomy typically has a hierarchical structure (e.g., higher level entries are related to one or more lower level entries). However, a strict hierarchical arrangement is not necessary.

Taxonomies can cover roles, skills, and the like, and they can be inter-realted.

Exemplary Taxonomy Arrangement: Roles

One of the possible taxonomies (e.g., a primary taxonomy) in an ontology is a role taxonomy, which can store knowledge about the roles that candidates can fulfill. A role can be defined as a generalized job type, for example, "Engineering Lead" is a role describing a person who leads a team of software or other engineers. The name of the role may also be a specific job title that a candidate holds and there may be other job titles that are synonyms for the role. For example, "Lead Programmer" may be a synonymous job title for the role "Engineering Lead."

Roles can have a set of skills related to them. These are the skills that a person in the role typically has. For example, the skills for "Engineering Lead" can include: Java, C++, Oracle, RDBMS, XML, SQL, UML and Rational Rose. Few, if any, candidates would have all of the skills listed for the Engineering Lead, but they typically would have some subset of them. The skills can be represented as an object, such as a data structure within the ontology, such as within a skill taxonomy of the ontology.

Roles can also have a number of other pieces of knowledge associated with them, including related roles (for example, "Engineering Lead" may be related to "System Architect") and competency models (e.g., the set of basic psychological competencies typically associated with the role).

Exemplary Ontology Entry: "Voice Engineer" Role

An exemplary ontology may include a role called "Voice Engineer." An excerpt from an entry representing the role is shown in Table 5. The Other System Mapping can map the entry to a related category in another system (e.g., the RecruitUSA[SM] system).

TABLE 5

Ontology Entry (e.g., in Role Taxonomy) for Role "Voice Engineer"

| Type | Contents | Relationship |
| --- | --- | --- |
| Synonyms | Voice Convergence Engineer<br>VOIP Engineer<br>PBX Engineer | Contained |
| Other System Mapping | 1500080 | Contained |
| Sibling Roles | Broadband Engineer<br>Verification Test Engineer<br>Telecom Test Engineer<br>Optical Engineer | Linked |

TABLE 5-continued

Ontology Entry (e.g., in Role Taxonomy) for Role "Voice Engineer"

| Type | Contents | Relationship |
|---|---|---|
| Role classes | Telecom Engineering Technology | Linked |
| Description | Implements and administers converged voice/data applications, including PBX, voice messaging, and call center and wireless technologies. Develops testing methods to report metrics and change management. | Contained |
| Skills | OC-12 OC-3 OC-48 LAN WAN Microsoft SQL Server (Admin) Microsoft SQL Server (Development) Oracle RDBMS ATM (Asynchronous Transfer Mode) Ethernet Frame Relay Gigabit Ethernet QoS ADC/Pairgain DSL SONET Multiplexer RMON C++ CDMA DWDM ATPG . . . VOIP (Voice Over IP) Management Information Base | Linked |

Exemplary Extraction Techniques via Ontology

The basic process of ontology concept extraction can take text from the job candidate information and locate phrases that are stored in the ontology. The recognized phrases can be the name of an entry in the ontology or one of its synonyms. The result of the process is a "term," which can be a word or phrase that is the name of the ontology entry that was recognized.

For example, the software may encounter the excerpt shown in Table 6 in a job candidate's resume.

TABLE 6

Exemplary Resume Excerpt

WORK EXPERIENCE
Southern Bell Telecom    Nashville, TN    2001-Present
VOIP Engineer With reference to the "Voice Engineer" entry described above, the software can recognize the term "VOIP Engineer" and extract the concept (e.g., term) "Voice Engineer." The concept can then be scored and used to represent the job candidate data in an n-dimensional concept space (e.g., along with other scored concepts).

Further, the software can recognize that the concept is a role concept and extract a concept "Role_Voice Engineer." Because the "Role_" prefix in the concept name "Role_Voice Engineer" explicitly identifies the concept as a role, the match engine can subsequently correctly answer queries for candidates who have been employed as "Voice Engineers." Such queries can be translated into a search for job candidates having the concept "Role-Voice Engineer."

Thus, significant advantages to the software's approach of using an ontology are realized. First, because the exemplary ontology is limited to expert knowledge, it provides high quality results. The software indicates an expert-identified role of "Voice Engineer" and can be confident that "VOIP Engineer" is an expert-identified synonym of it.

Second, the ontology allows normalization of the language that job candidates use to express themselves. Whether the candidate's resume states "Voice Engineer," "VOIP Engineer," or "PBX Engineer," the software can recognize that all three are alternative ways of expressing the same concepts "Voice Engineer." By extracting the same concept "Role_Voice Engineer" regardless of the term used, the system reliably identifies Voice Engineers, even if they do not use the phrase "Voice Engineer" in their resume.

Exemplary Ontology Extractors

In any of the examples described herein, an ontology extractor can extract various concepts from job candidate data via the ontology. For example, an ontology extractor can locate phrases in a candidate's resume that represent concepts (e.g., roles, skills, and the like) or extract a concept by detecting a synonym. An ontology extractor can also extract parent terms extracted by another (e.g., primary) ontology extractor.

Exemplary Parent Ontology Extractor

In any of the examples described herein, the concepts may be related to one or more other concepts via hierarchical (e.g., parent/child) relationships. In such an arrangement, a parent concept may be extracted based on job candidate data indicating concepts lower in the hierarchy (e.g., a parent concept may be indicated by data indicating child concepts). Those parent concepts being distant in the hierarchy from child concepts can be given less weight or probability (e.g., in the form of a confidence score).

Figure 14:
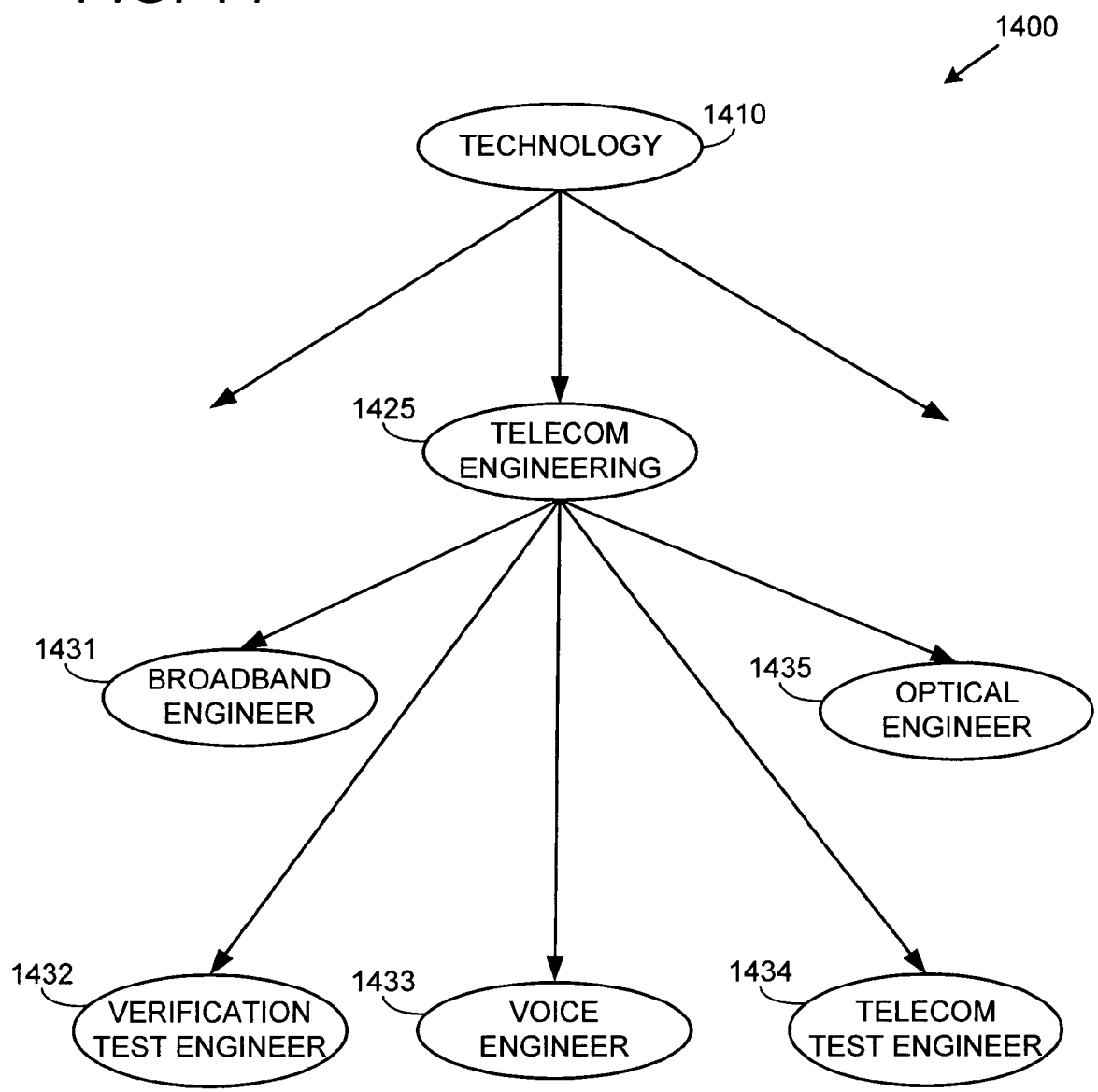
FIG. 14 shows an exemplary excerpt of a roles taxonomy in an ontology.

For example, an exemplary excerpt 1400 of a roles taxonomy of an exemplary ontology is shown in FIG. 14. In the example, the roles are hierarchically arranged.

At the top of the excerpt 1400 is the "Technology" role 1410. Underneath is the role "Telecom Engineering" 1425 and possibly other roles (not shown). Underneath "Telecom Engineering" 1425 are five sibling roles, "Broadband Engineer" 1431, "Verification Test Engineer" 1432, "Voice Engineer" 1433, Telecom Test Engineer" 1434, and "Optical Engineer" 1435. The taxonomy has been constructed by experts familiar with the technology areas depicted so that the roles represent hierarchical categories accepted as valid by those working in the field.

Figure 15:
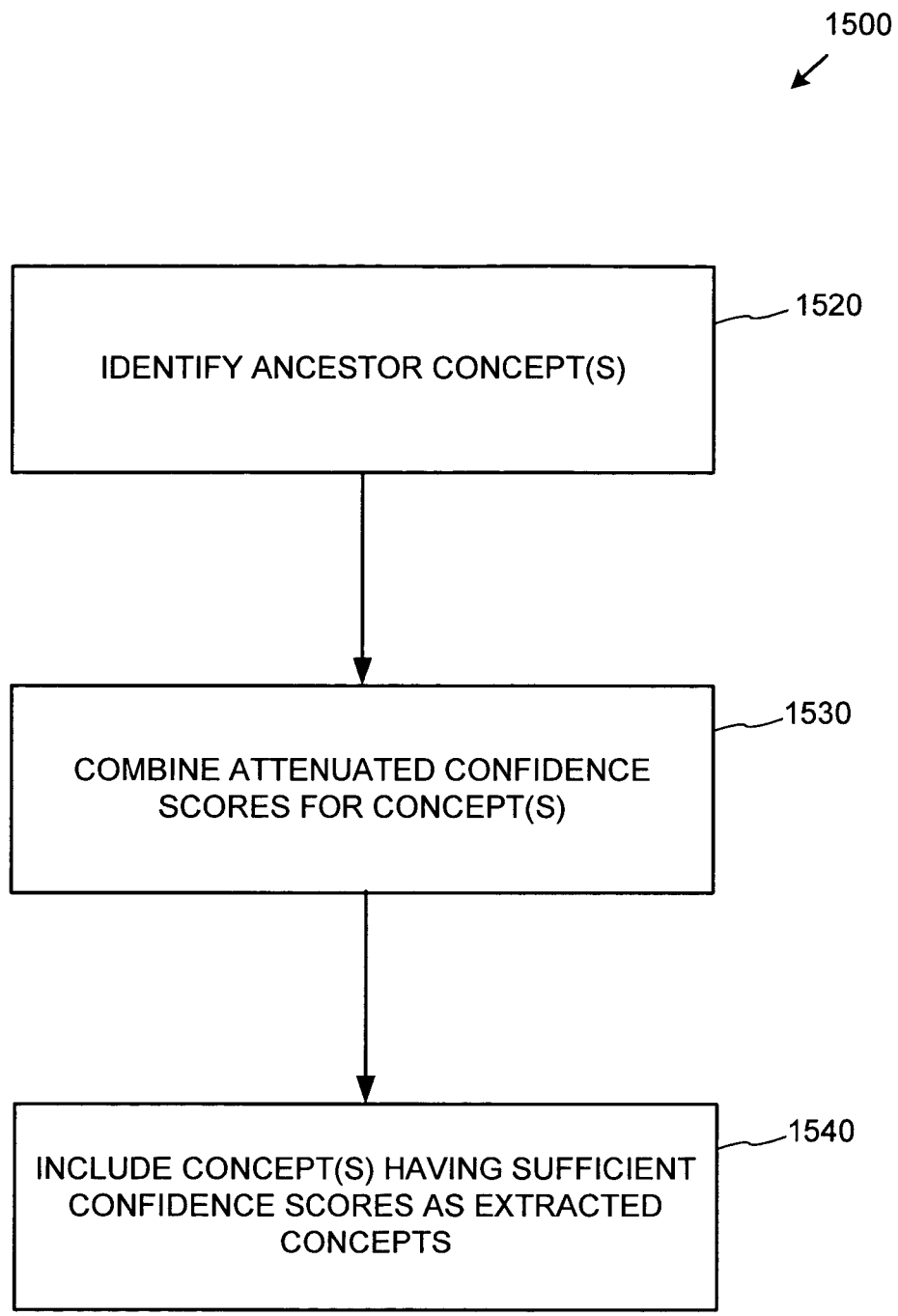
FIG. 15 is a flowchart showing an exemplary method for extracting parent concepts.

FIG. 15 shows an exemplary method 1500 for extracting parent concepts (e.g., via the ontology shown in FIG. 14). Given a set of primary concepts (e.g., extracted via a roles or primary ontology), appropriate parent (e.g., any ancestor) concepts for concepts in the set can be identified at 1520. At 1530, attenuated confidence scores (e.g., attenuated as described in Example 23) for the parent concepts can be combined. For example, one approach is to attenuate confidence scores for concepts based on how remote the concepts are from the primary concepts in the hierarchy. At 1540, those concepts, if any, having sufficient confidence scores are included as concepts for the job candidate data. Confidence scores for different children can be accumulated so that the combination of children distant in the hierarchy may be sufficient for extraction of a parent concept.

Exemplary Execution of Parent Ontology Extractor

The parent ontology extractor described in Example 22 can be used in an arrangement in which confidence scores meeting a threshold (e.g., 75) are sufficient to be included as concepts for the job candidate data, and attenuation decreases scores (e.g., starting with 100) based on how distant the parent concept is from the primary concept extracted from the resume.

For example, given the hierarchy shown in FIG. 14, if the concept (e.g., role) "Voice Engineer" 1433 has been identified as a primary concept and is considered valid (i.e., is included as an extracted concept), it can be given a confidence score of 100%. Its parent concepts "Telecom Engineering" 1425 and "Technology" 1410 can be identified and given attenuated confidence scores as shown in Table 7.

TABLE 7

Confidence Scores generated by Ontology Parent Extractor

| Term | Confidence Score |
|---|---|
| Voice Engineer | 100 |
| Telecom Engineering | 75 |
| Technology | 50 |

If a threshold of 75 is used, then "Voice Engineer" and "Telecom Engineering" are included, but "Technology" is not.

However, confidence scores can be cumulative across sibling roles. So, if the job candidate has "PBX Engineer" (i.e., a synonym of concept "Voice Engineer" 1433) and "Verification Test Engineer" (i.e., the concept "Verification Test Engineer" 1432) on a resume, the confidence scores will increase based on parents of both "Voice Engineer" 1433 and "Verification Test Engineer" 1432 as shown in Table 8.

TABLE 8

Confidence Scores with Multiple Siblings

| Term | Confidence Score |
|---|---|
| Voice Engineer | 100 |
| Verification Test Engineer | 100 |
| Telecom Engineering | 75 + 75 = 150 |
| Technology | 50 + 50 = 100 |

Accordingly, both of the parent concepts "Telecom Engineering" and "Technology" will be included in addition to the "Voice Engineering" and "Verification Test Engineer" because the parent concepts have scores meeting the threshold.

Any number of other confidence scoring arrangements are possible.

Exemplary Skills Taxonomy

Figure 16:
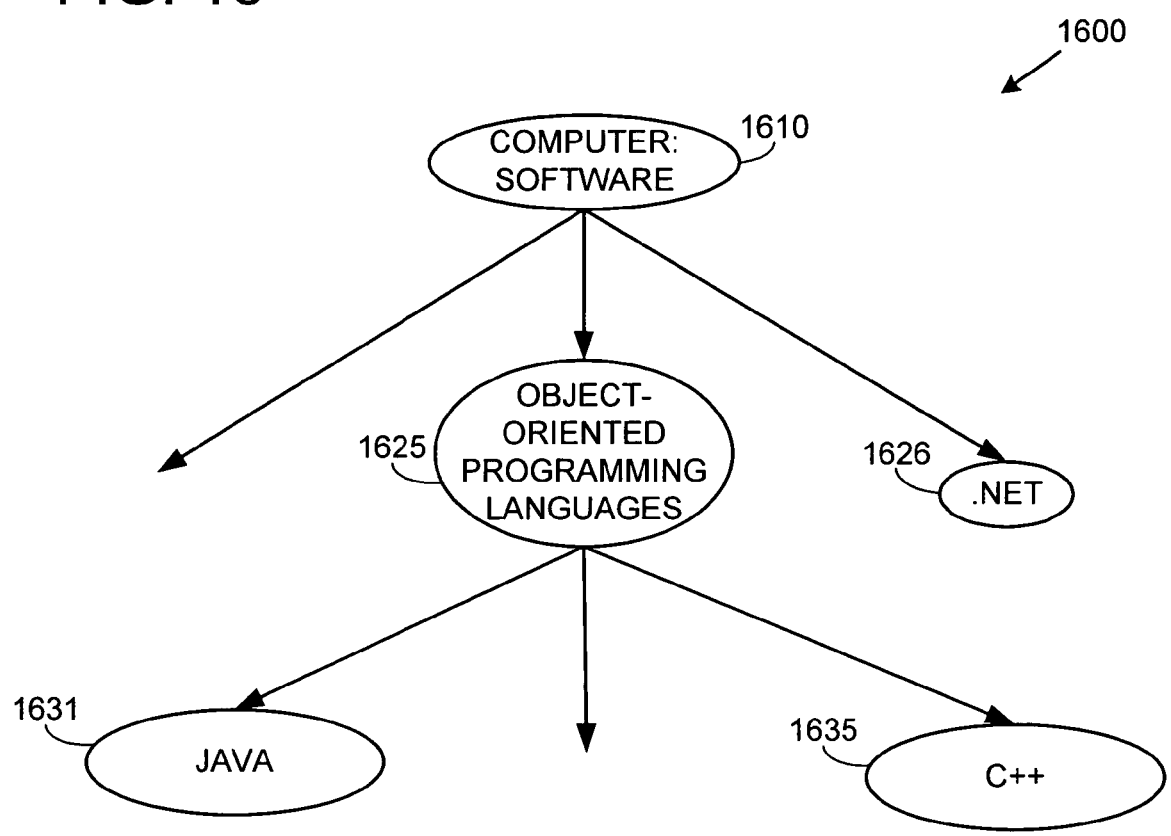
FIG. 16 shows an exemplary excerpt of a skills taxonomy in an ontology.

FIG. 16 shows an exemplary excerpt 1600 of an exemplary taxonomy of an ontology (e.g., the ontology 530 of FIG. 5). In the example, although not required, the skills 1610, 1625, 1626, 1631, and 1635 are desirably arranged in a hierarchical relationship. The taxonomy can be constructed by experts familiar with the technology areas depicted so that the skills represent hierarchical categories accepted as valid by those working in the field.

Learning System

Constructing a comprehensive ontology can be challenging. Further, because the terminology and skills in some fields (e.g., high technology fields) are constantly evolving, limiting the ontologies to those rules reviewed by a human reviewer can place substantial responsibility on such reviewers to constantly update the ontology to reflect the current state of the field.

To assist in building and revising the ontology, a learning system can suggest concepts for addition to the ontology. Further, based on context, the learning system can suggest where within the ontology a concept should be added. Such a learning system can be included, for example, as part of any system having a conceptualizer (e.g., the system 100 of FIG. 1).

Figure 17:
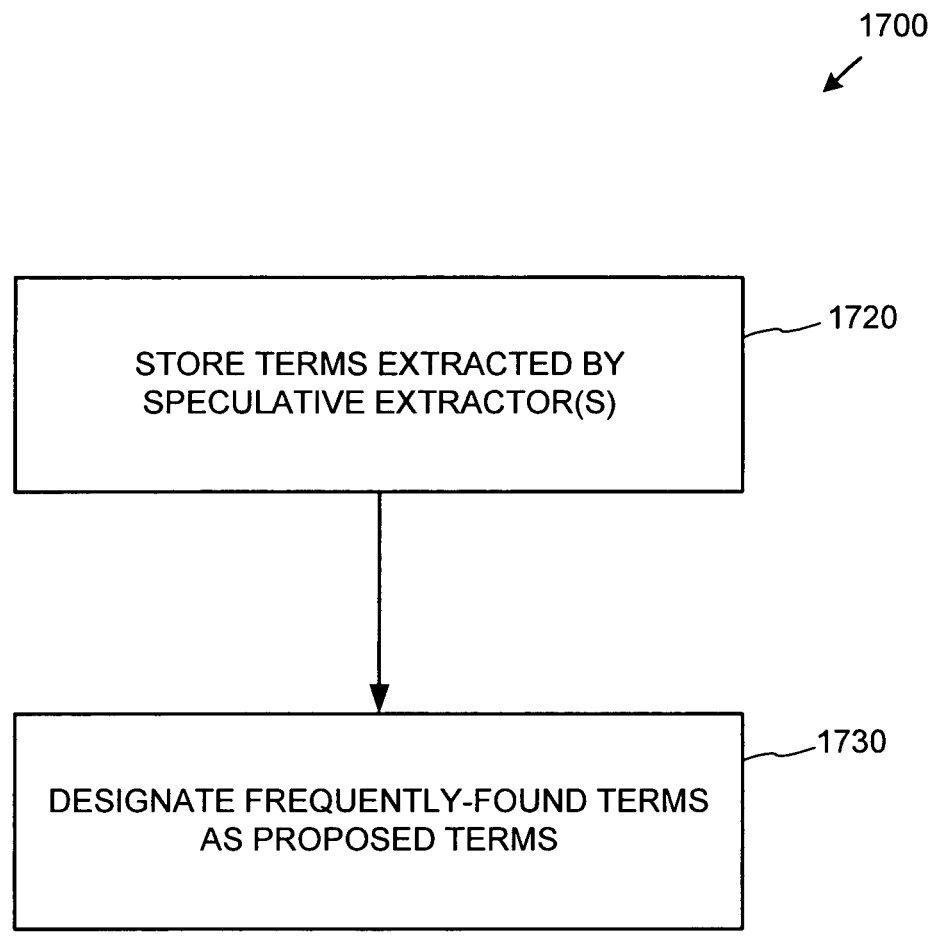
FIG. 17 shows an exemplary method for proposing terms for inclusion in an ontology.

FIG. 17 shows an exemplary method 1700 used in a learning system for proposing terms for inclusion in an ontology. The method can draw from terms identified by speculative or ontology-independent extractor(s) (e.g., the heuristic extractors 540 or the parsing extractors 550 of FIG. 5) to propose those terms for inclusion in the ontology as concepts. At 1720, terms extracted by the speculative or ontology-independent extractor(s) are stored. Such an action can be repeated for a plurality of job candidates (e.g., drawing from a plurality of resumes).

At 1730, those terms found frequently (e.g., meeting a threshold number or percentage of occurrences) are designated as proposed terms. Such terms can be reviewed by a human reviewer (e.g., a trained ontologist) to determine whether they should be included in an ontology, or further processed by the learning system.

Figure 18:
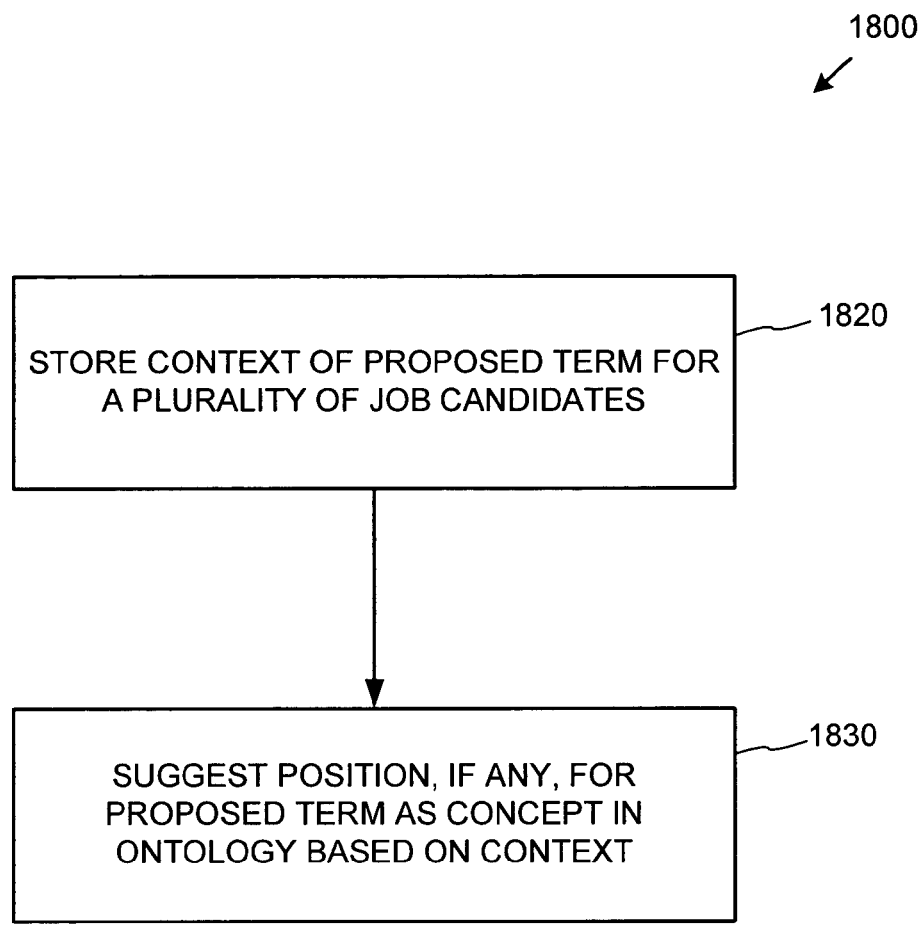
FIG. 18 shows an exemplary method for suggesting a position in an ontology for a proposed term.

For example, FIG. 18 shows an exemplary method 1800 for processing the terms designated as proposed terms by the above method 1700. At 1820, the context of proposed term(s) is stored for a plurality of job candidates (e.g., while storing the terms at 1720). For example, context can be represented by storing those terms occurring in proximity (e.g., within x words of or otherwise related to) to the proposed term.

At 1830, a position in the ontology, if any, is suggested for the proposed term for representation as a concept.

If adopted, the concept can be added in a number of ways. For example, the term can be added to the ontology with a special flag to indicate that it is not yet active. Upon acceptance by a human reviewer, the disabling flag can be removed, and the concept activated. In this way, the learning system can assist in building and revising the ontology.

Exemplary Execution of Learning System

A co-occurrence technique can be used with the learning system of Example 25 to decide whether to add a term to an ontology and to suggest a position.

For example, the following excerpt may appear in job candidate data (e.g., in a resume):

I have experience with the programming languages Java, C++, C#, C, Pascal, Snobol and Icon If the term "C#" has been identified by a speculative extractor as a concept, context for the term "C#" can also be stored. For example, the six nearest recognized terms (e.g., terms already in the ontology) to the term can be stored (i.e., "programming languages, "Java," "C++", "Pascal," and "Icon").

For other occurrences of the term in data for other job candidates (e.g., in other resumes), a context can also be stored. A set of these contexts can then be compared to analyze relationships between the terms. For example, the set of contexts might appear as shown in Table 9.

TABLE 9

Exemplary Contexts for C#

Context

[programming languages, Java, C++, C, Pascal, Icon]
[Java, C++, programming, JDK, .NET]
[.NET, WebServices, C++, Microsoft Visual C++, Object-Oriented Programming, IDE]

A co-occurrence analysis technique determines when the terms of the context co-occur with the proposed term. For example, Table 10 shows an example of co-occurrence.

TABLE 10

Term Co-occurrences for C# in the Learning System

| Paired Term | Positive Count | Negative Count |
| --- | --- | --- |
| Programming languages | 1 | 2 |
| Java | 2 | 1 |
| C++ | 3 | 0 |
| C | 2 | 1 |
| Pascal | 1 | 2 |
| Icon | 2 | 2 |
| Programming | 1 | 2 |
| JDK | 1 | 2 |
| .NET | 2 | 1 |
| WebServices | 1 | 2 |
| Microsoft Visual C++ | 1 | 2 |
| Object-Oriented Programming | 1 | 2 |
| IDE | 1 | 2 |

The positive count shows the number of times the term is found with the paired term in its context. The negative count shows the number of time the term occurs without the paired term in its context. In the example, the term has a stronger correlation with Java, C, .NET, and especially C++.

When the positive-negative count reaches a particular state (e.g., after a threshold number of observations, the positive divided by negative meets a threshold), the related terms can be used to suggest a position at which the proposed term can be included in the ontology.

For example, given that many (e.g., all) of the terms having a strong correlation are skills in the skills taxonomy (e.g., the taxonomy 1600), the term can be proposed for inclusion in the skills taxonomy of the ontology. Further, given that many (e.g., all) of the terms are in the "Computer:Software" subclass of the skills taxonomy, the term's suggested position can be narrowed down to somewhere underneath "Computer: Software" in a hierarchy.

Still further, many (e.g., half) of the terms having a strong correlation are under "Object-Oriented Programming Languages" in the exemplary skills taxonomy. Accordingly, the learning system can suggest that the proposed term "C#" be positioned as a sibling of "Java" and "C++" under "Object-Oriented Programming Languages."

Thus, the term is established not only as a meaningful term (e.g., not a junk term that has been misidentified by the speculative extractor), but a suggestion can be made to place the term at a meaningful position within the ontology.

Exemplary Ontology-Independent Heuristic Extractors

The conceptualizer can include ontology-independent heuristic extractors to extract concepts from job candidate information (e.g., a resume). An ontology-independent heuristic term extractor can include, for example, rules that encode expert knowledge about Human Resources.

The ontology-independent heuristic extractors can be independent of any ontology in that, although they may draw from the ontology for assistance in extracting concepts, they can extract concepts even in cases where an ontology has no entry for the concept. For example, a term not classified or encountered before by the system can still be extracted as a concept. Or, a specialized concept not appearing in any ontology as a concept per se can be extracted (e.g., the management concept described below).

Exemplary Ontology-Independent Heuristic Extractor: Skills List Extractor

Figure 19:
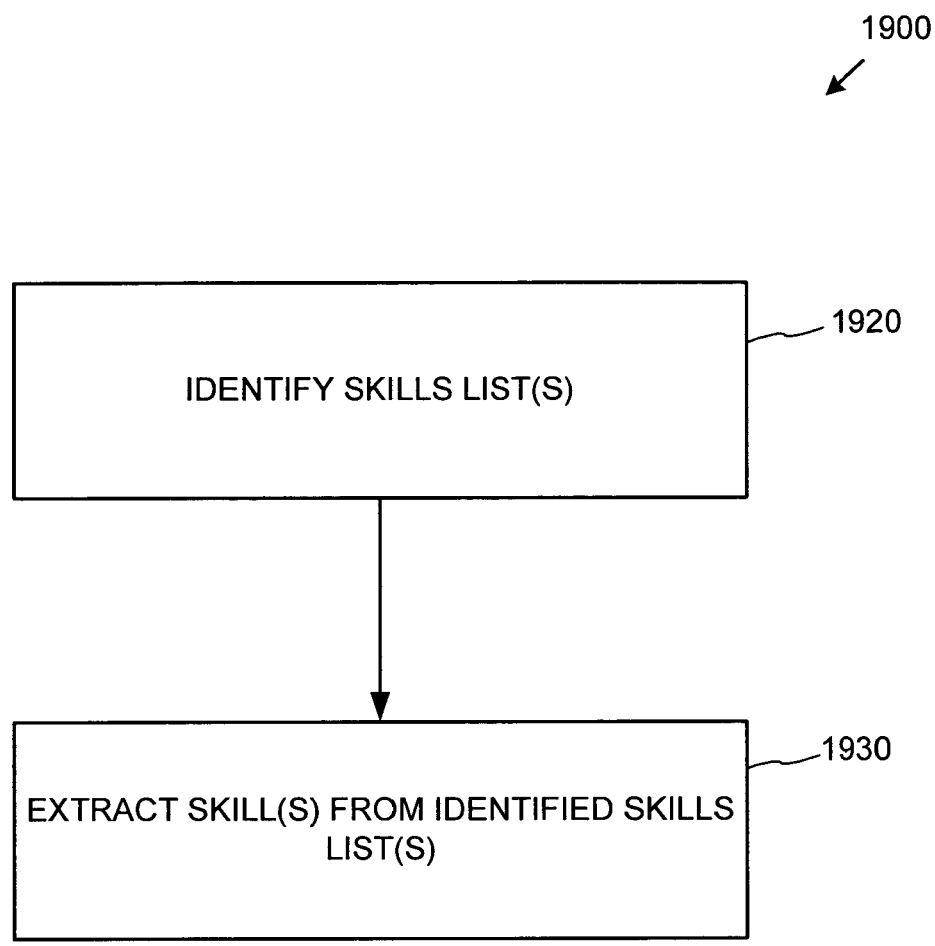
FIG. 19 shows an exemplary method for extracting a skills list via a heuristic term extractor.

FIG. 19 shows an exemplary method 1900 for extracting a skills list via a heuristic term extractor. The method can be used to identify and extract skills from job candidate data (e.g., the job candidate data 122 of FIG. 1). At 1920, skills lists are identified, and at 1930, skills are extracted from the identified skills lists. The skills so extracted may then be added, for example, as skills with a confidence score. The confidence score can be compared with the confidence scores of the same concepts extracted by the other speculative extractors such as the other heuristic extractors or the parsing extractors. The confidence score for a particular concept can be added to the concept space responsive to determining that the confidence score reaches or exceeds the set threshold.

The actions of the method 1900 can be achieved in numerous ways. For example, a resume can be examined one sentence at a time and processed, such as via the method 2000 shown in FIG. 20, as a possible skills list. Skills lists identified via the method 2000 can then be processed for skill extraction, such as via the method 2100 shown in FIG. 21.

Figure 20:
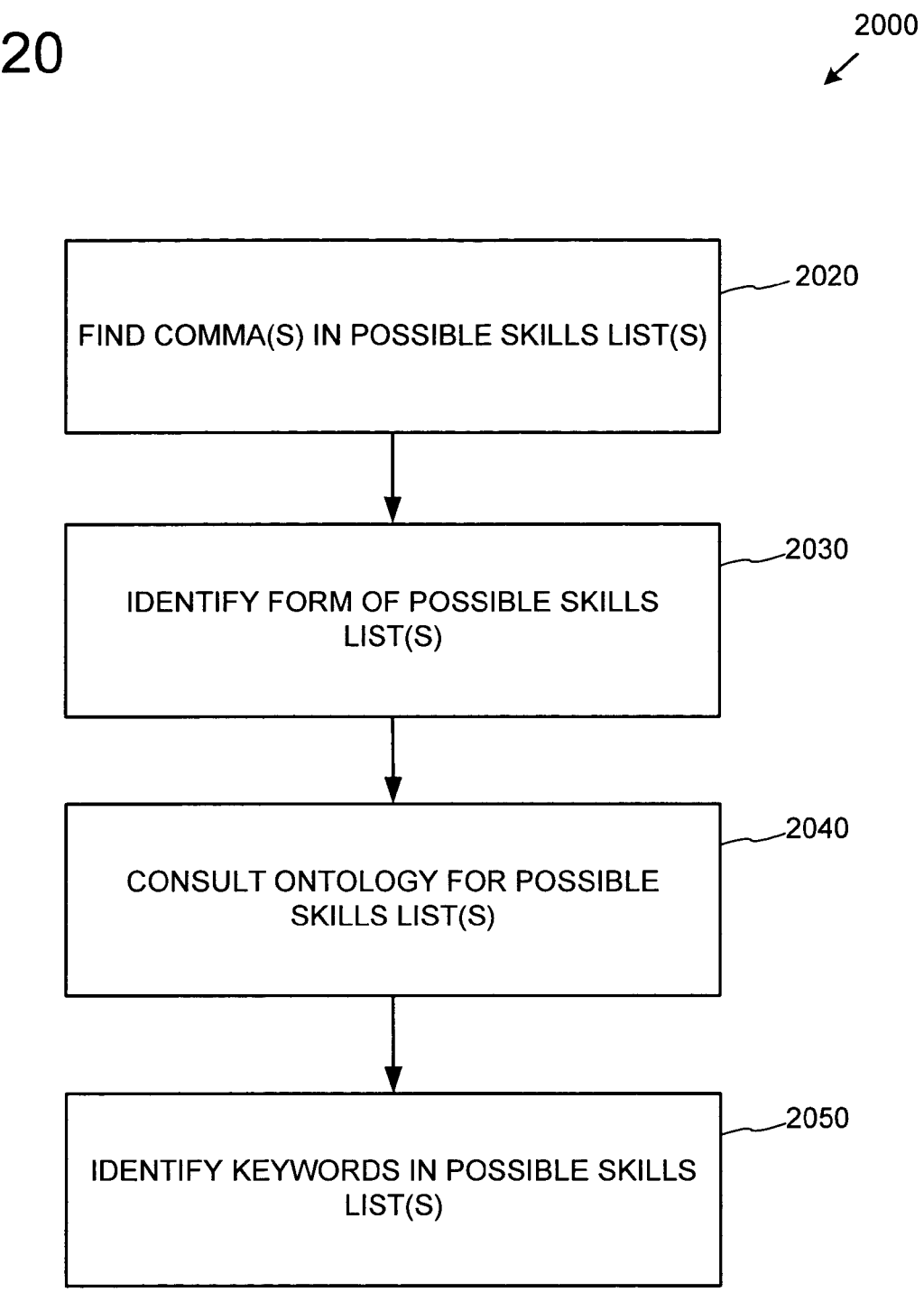
FIG. 20 shows an exemplary method for determining whether a possible skills list is a skills list.

FIG. 20 shows an exemplary method for identifying skills lists within job candidate data (e.g., the job candidate data 122 of FIG. 1). At 2020 the possible skills list is examined to see if it contains any separators such as punctuation, with commas being an example. If not, processing can terminate. Otherwise, confidence scoring can begin (e.g., a confidence score is set to 0). At 2030, the form of the possible skills list is examined. For example, if the skills list is in sub-skill form or parenthesis form, the confidence score can be adjusted upward.

At 2040, the possible skills list is checked to see if phrases therein occur in an ontology (e.g., a skills taxonomy of an ontology). If so, the confidence score can be adjusted upward.

At 2050, the possible skills list is checked to see if it contains skills list keywords (e.g., "skills," "proficient in," "proficient with," "using," "experience in," "experience with," "including," and the like). Identified keywords can result in an upward adjustment of the confidence score.

Further adjustments to the confidence score can be made. For example, if the previous sentence analyzed has been identified as a skills list, the confidence score can be adjusted upward. If the resulting confidence score meets a particular threshold, the possible skills list can be denoted as a skills list, and further processing (e.g., extraction of the skills from the list as shown in FIG. 21) can take place.

Figure 21:
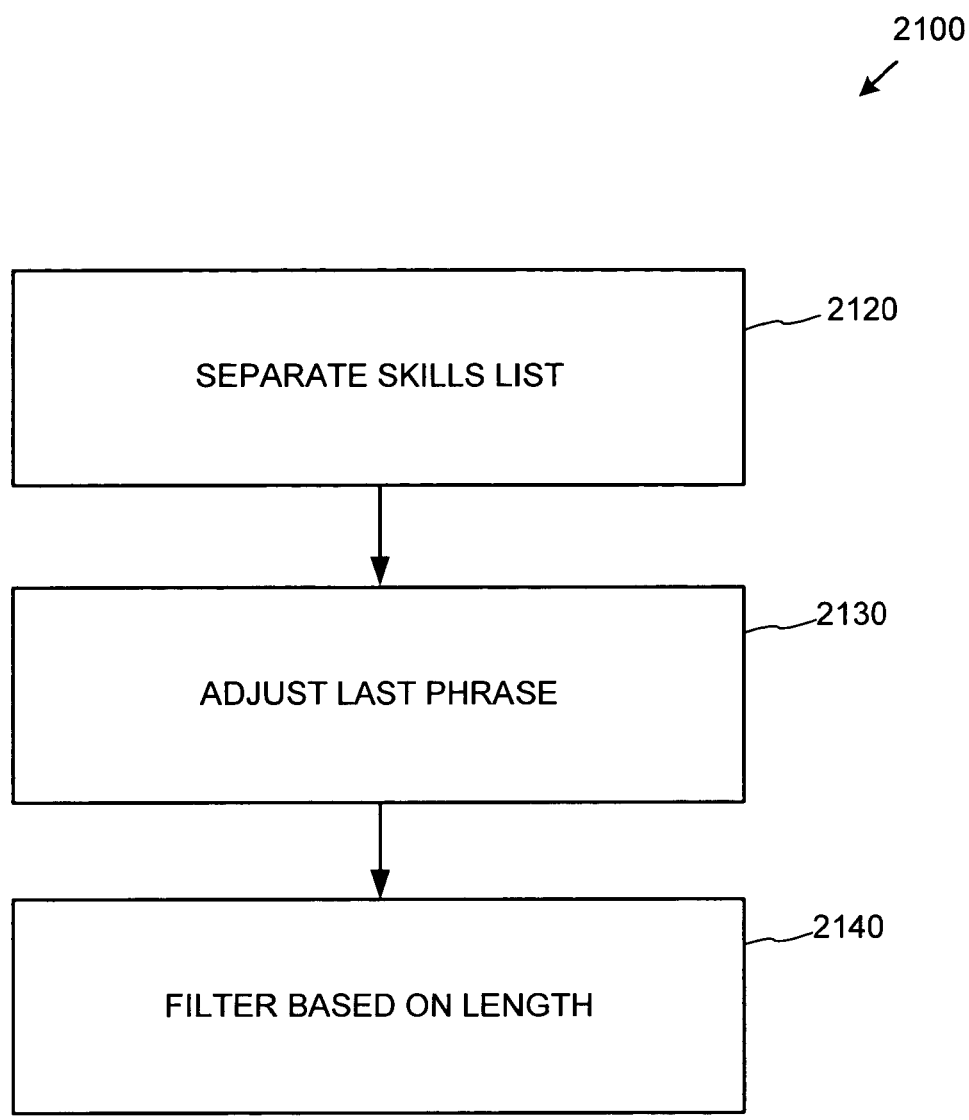
FIG. 21 shows an exemplary method for extracting skills from a skills list, such as that identified via the method of FIG. 20.

FIG. 21 shows an exemplary method 2100 for extracting skills from a skills list. At 2120, the skills list is separated. For example, a sentence can be separated into divided phrases, such as punctuation-separated, with comma-separated phrases being a specific example. At 2130, the last phrase of the list is adjusted. For example, if an "and" or "&" is present, the last phrase can be split into two separate phrases. Also, if the last phrase ends in "etc," the "etc" can be removed from the phrase.

At 2140, the phrases can be filtered based on length. For example, those phases having more than a certain length of words (e.g., more than two) can be discarded. Those remaining phrases can be indicated as skills by the method (e.g., by the skills list heuristic extractor).

Exemplary Ontology-Independent Heuristic Extractor Skills List Heuristic Extractor Execution The above methods can be applied by the skills list heuristic extractor to a candidate's resume to extract a list of skills therefrom. Table 11 shows an exemplary resume excerpt from which skills can be extracted by an exemplary skills list heuristic extractor.

TABLE 11

Exemplary Resume Excerpt

PROFESSIONAL TRAINING

Boston University Jan 2000-Mar 2000
Web Application Developer Certification Program (1-year), 4.0 GPA.
   Emphasis on web technologies, both Microsoft (ASP, COM) and
   J2EE technologies to develop flexible, scalable web applications.
   Designed a web-based stock brokerage simulation application using
   EJB's, Javaserver pages and Allaire JRun application server.
   Application processed trades online.
BEA Systems - San Jose, CA Jan 2001
   Developing Enterprise Applications with BEA Weblogic Server
   J2EE-based development, configuration and deployment on
   Weblogic server.
EDUCATION University of Massachusetts Jul 1994-Jun 1999
Bachelor of Science in Biology, Minor in Computer Science.
TECHNICAL SKILLS Languages: Java, XML, XSL/XSLT, XML Schema, C++/C, SQL, Perl,
Javascript, Visual Basic, HTML, VBScript.
Server-Side: J2EE, EJB, JMS, Servlets, Javamail, RMI, JNDI, JDBC,
ADO, ODBC.
Client-Side: Apache/Jakarta Struts, JSP, ASP, Javabeans, Java Applets,
DHTML.
Database: Oracle 9i/8i/8.0/7.x, IBM DB2, Sybase ASE, SQL Server
7.0/6.5, MySQL.
Middleware/Servers: BEA Weblogic 6.1/5.1, IBM Websphere, Apache
Web Server, JBOSS, IIS, Allaire JRun.
Tools: JDK1.1/1.2.*/1.3, JBuilder 6.0-3.0, Visual Café 4.0, XML Spy,
MS Visual Studio/InterDev, ANT, TOAD, Rational Clearcase/Clearquest,
CVS, StarTeam, Rational Rose.
Platforms: UNIX, Windows NT 4.0/XP/2000/98/95.

To locate skills lists, the following technique can be applied as a particular exemplary implementation of the method 2000 of FIG. 20:

1. The resume is examined one sentence at a time.
2. To implement 2020, the sentence can be checked to see if it contains at least one comma. If it does not, disregard the sentence (e.g., return to 1)
3. Set the confidence score to 0. This value will be incremented based on the evidence indicating that the sentence is a skills list.
4. To implement 2030, if the sentence contains at least one comma, check if it is in "sub-skill" form, which is indicated by a phrase, followed by a colon or dash, followed by a comma-separated list of phrases For example, in the line "Database: Oracle 9i/8i/8.0/7.x, IBM DB2, Sybase ASE . . . ," the sub-skill phrase is "Database," which is followed by a colon and a comma-separated list of skills. If the sentence is in sub-skill form, add 35 to the confidence score. The sentence is reduced to the list of skills that follow the initial phrase. In the example, the list of skills are "Oracle 9i/8i/8.0/7.x, IBM DB2, Sybase ASE, SQL Server 7.0/6.5, MySQL."
5. To further implement 2030, if the sentence is not in "sub-skill" form, check for the alternative "parenthesis form," which is indicated by a phrase followed by an opening parenthesis, a comma-separated list of skills and a closing parenthesis. An example of parenthesis form is "Proficient in Computerized accounting (ACCPAC, MIP, MYOB and Oracle)." If the sentence is in parenthesis form, add 25 to the confidence score. The sentence is reduced to the list of skills that follow the initial phrase (e.g., "ACCPAC, MIP, MYOB and Oracle").
6. To implement 2040, the sentence is then checked for phrases that occur in the ontology. 15 points are added to the confidence score for each phrase occurring in the ontology. So, based on 5, above, if "Oracle" and "MYOB" are skills recognized in the ontology, 30 is added to the confidence score. If the list contains phrases known to represent valid skills, then it is more likely that the other unknown phrases are also valid skills.
7. To implement 2050, the sentence is checked for certain specific "skills list keywords" (e.g., commonly used words or phrases that indicate the sentence that contains them may be a skills list, such as those associated with the discussion of 2050, above).
8. If the previous sentence of the resume was a skills list, then 10 is added to the confidence score. Candidates often provide several consecutive skills lists in their resumes. The section of the resume quoted above in Table 11 is an example.
9. Finally, if the accumulated confidence score is greater than or equal to 70, the sentence is declared to be a skills list sentence.

Those sentences declared to be a skills list are then processed to extract skills therefrom. To extract the skills, the following technique can be applied as a particular exemplary implementation of the method 2100 of FIG. 21:

1. In an implementation of 2120, the sentence is separated into comma-separated phrases. For example, the skills list "ACCPAC, MIP, MYOB and Oracle etc." is split into three phrases: "ACCPAC," "MIP," and "MYOB and Oracle etc."
2. In an implementation of 2130, the last phrase is then checked to see if it contains "and" or "&." If so, the last phrase is split into two separate phrases. The example from 1 becomes four phrases "ACCPAC," "MIP", "MYOB," "Oracle etc."
3. In a further implementation of 2130, if the last phrase ends in "etc." or "etc," the "etc." or "etc," is removed. The example list thus becomes "ACCPAC," "MIP", "MYOB," "Oracle".
4. Finally, the number of words in each remaining phrase is counted. If it contains fewer than three words, it is added as a skill for the candidate. If it contains three or more words, then it is not added. Phrases containing several words are likely to be grammatically complex descriptive phrases rather than simple names of skills and so are discarded by the extractor.

Exemplary Ontology-Independent Heuristic Extractor: Title Heuristic Extractor

Figure 22:
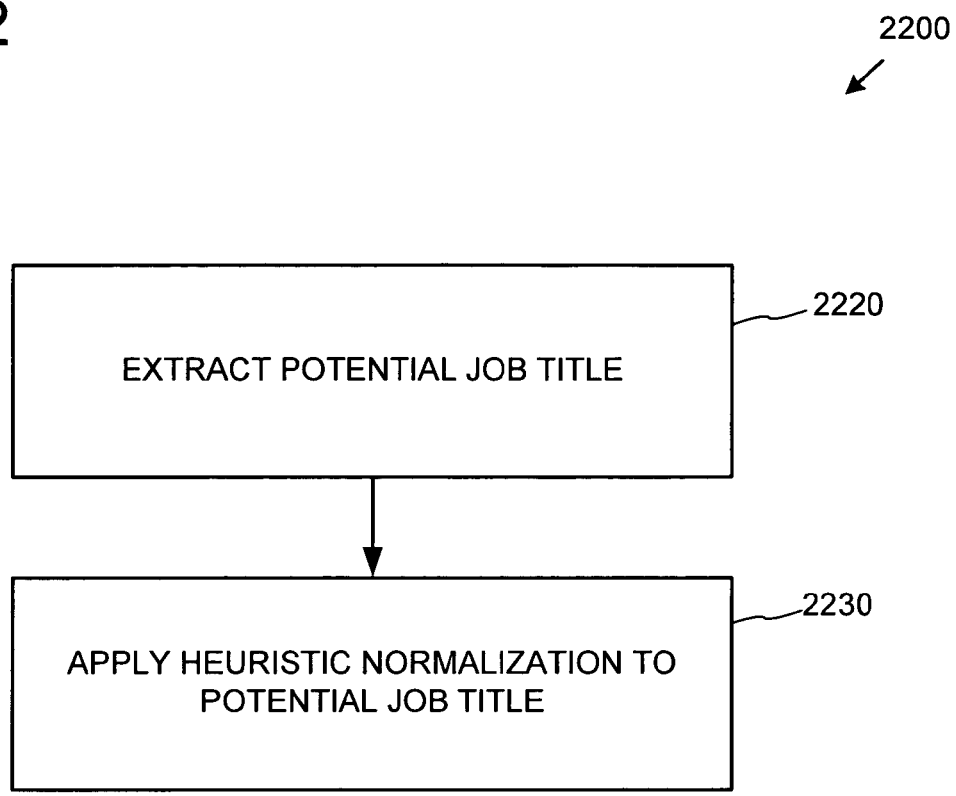
FIG. 22 shows an exemplary method for a title heuristic extractor.

For matching candidates in the domain of Human Resources, the extraction of job title data can be particularly useful. Job titles that a candidate has held can be particularly descriptive of the previous work experience of the candidate. Job titles that are identified by the resume parser but not extracted by the ontology extractor can be processed by a title heuristic extractor. FIG. 22 shows an exemplary method 2200 that can be employed by a title heuristic extractor. At 2220, a potential job title is extracted from the original title. For example, extraction can be accomplished by removing known title stopwords from the original title. At 2230, heuristic normalization is applied to the potential job title to generate an extracted title.

2220 can be accomplished, for example, by breaking the job title into its component words and then comparing the words against a list of stop words, removing the words that are on the list. For example, the original job title "senior sales representative" can be split into the three words "senior," "sales," and "representative." The three words are then checked against a stop word list (e.g., "manager, supervisor, senior, junior, officer, chief, vp, vice president, of, the, specialist, group, director, coordinator, independent, member"). Because the word "senior" appears on the stopword list, it is removed, and the potential job title term that is generated is "sales representative."

2230 can be accomplished, for example, by applying the following actions:

1. If the term contains a comma, remove everything following the first comma. For example, "VP of Sales, Marketing and Support: becomes "VP of Sales".

2. Remove any trailing punctuation character from the term. For example, "Music Editor," becomes "Music Editor".

3. Replace common parsing artifacts. For example, "Project & Product Manager" becomes "Project and Product Manager".

4. Expand common job title-related abbreviations. For example, "Jr. Software Engineer" becomes "Junior Software Engineer".

5. Correct misspellings. For example, "Jurnalist" becomes "Journalist".

6. Expand common job title-related synonyms and acronyms. For example, "CEO" becomes "Chief Executive Officer".

7. If the job title is now reduced one of the known common low value job titles, then delete it. For example, titles such as "too many to list" or "resume available" are deleted.

Other approaches for extracting job titles may be used.

Exemplary Ontology-Independent Heuristic Extractor: Exemplary Management Heuristic Extractor Because it is often desirable to find job candidates with management experience, a management heuristic extractor can look for evidence in the job candidate data indicating that the candidate has management experience.

Figure 23:
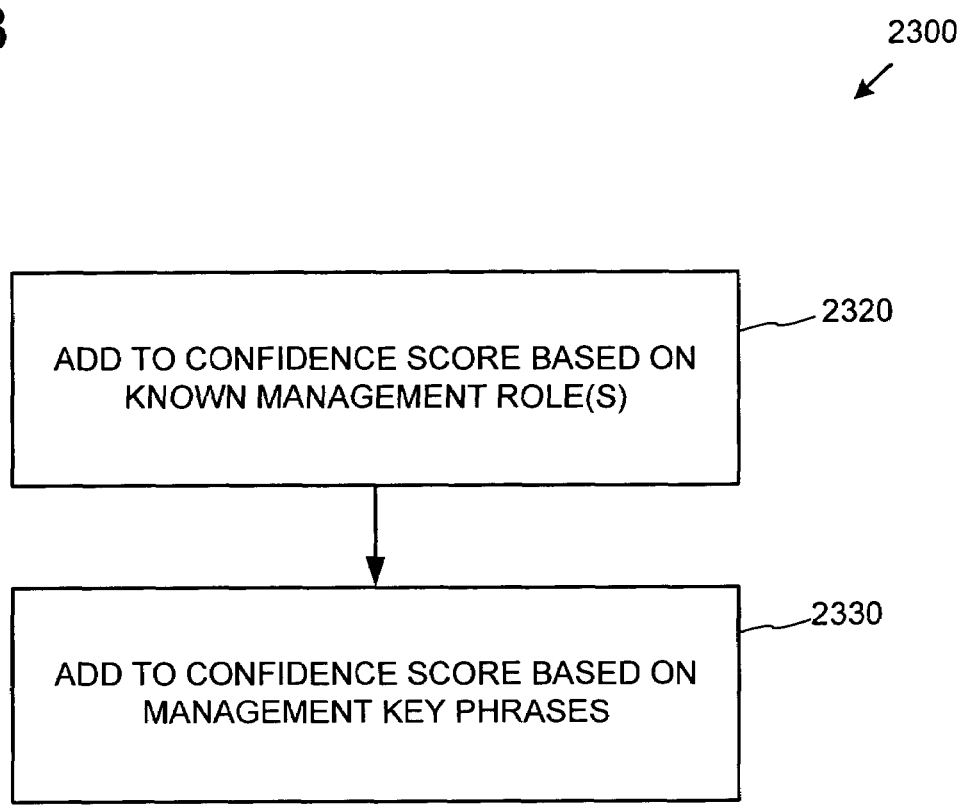
FIG. 23 shows an exemplary method for a management heuristic extractor.

FIG. 23 shows an exemplary method 2300 that can be employed by a management heuristic extractor. The method 2300 can use a confidence score to decide whether to include a "Management" concept for the job candidate.

At 2320, the confidence score is increased if it is determined that the candidate has a job title (e.g., as extracted by an ontology and/or by a title heuristic extractor) that is in the list of jobs designated as management roles. At 2330, the confidence score is increased if any of certain key phrases indicating the candidate has managed people are present in the job candidate's resume (e.g., increased for each key phrase found).

If the total confidence score exceeds the threshold, the concept "Management" is added to the concept space.

Execution of Exemplary Management Heuristic Extractor

An implementation of the method 2300 can, for example, set a confidence score to 50 if the candidate has at least one of the job titles designated as management related (e.g., as part of 2320). Points can be added for each key phrase found (e.g., as part of 2330). For example, 10 points can be added for each such phrase. If the total confidence score is over a threshold (e.g., 55), a special-purpose concept "Management" can be added to the candidate.

Exemplary job titles designated as management related can include Creative Project Management, Creative Project Manager, Creative Management, Creative Director, Creative Executive, Editorial Management, Editorial Executive, Controller, Branch/Retail Banker, Business Development Manager Business, Development Executive, Customer Service Manager, Financial Executive, General Management, CEO, Chief Procurement Officer, Real-Time/Embedded Systems Development, Chief Operating Officer, Division President, Chief Quality Officer, Human Resources Manager, Human Resources Executive, Compensation Manager, Organizational Development Manager, Chief Counsel, Marketing Manager, Marketing Executive, Marketing Communications Manager, Media Manager, Direct Marketing Manager, Web Marketing Manager, Sales Executive, Business Manager, Configuration Manager, Information Systems Management, Information Systems Manager, Product Management Director, Technology Management, Technology Manager, Technology Director, and Technology Executive.

Exemplary key phrases indicating management can include "oversaw, "led", "direct", "manag", "supervis" followed by: "person", "peopl", "direct", "employe", "individu", "team", "technician", "staff", "student", "engin", "intern", "member", "repres", "programm", "sysadmin", "personnel", and "consult." The sentences of each job description on the candidate's resume can be checked for key phrases. The occurrences of the key phrases within a sentence can be counted. For example the sentence "I managed a team of employees" has an evidence score of 3 based on the matching italicized terms; so a confidence score of 3×20=60 is added to the overall management confidence score for the job candidate. The above lists are not exhaustive and may be modified by adding and/or deleting items.

Exemplary Special Purpose Concepts

In addition to considering concepts extracted from resumes, it is also possible to extend the notion of a concept so that it includes various special purpose concepts when finding matches. Such special purpose concepts can take special formats going beyond mere linear values and need not be related to a skill of the candidate. For example, a postal code (e.g., zip code) can be transcoded into latitude and longitude and stored as a single concept value to indicate geographical location. When matching, desired job candidate criteria specifying such a special purpose concept will match those candidates geographically closer to the specified special purpose concept.

Exemplary Integrated Assessment Analysis

In addition to extracting information from resumes, the job candidate data can include the results of various assessments (e.g., questionnaires, tests, or job applications). The assessment results can be included as a concept when representing the candidate in the n-dimensional concept space.

For example, the results of various assessments can be represented as one or more special purpose concepts. In one example, a multiple-choice format questionnaire can be used to extract ten basic attributes for the candidate; the attributes can be represented as special-purpose concepts. A percentage match between the candidate and the job requisition characteristics can be generated by the match engine. The percentage match can be used as part of the overall match score and displayed as part of an overview of the candidate.

Candidate Analytics

In addition to the concepts described above, additional analysis can be done of the job candidate information by various analytics to generate other information useful for making hiring decisions. The information generated by the analytics need not be used for filtering, and may be presented for consideration by someone reviewing the candidate match results (e.g., a hiring decision maker).

Exemplary Analytic: Frequent Job Moves

An exemplary of an analytic is a heuristic that measures the number of jobs a candidate has held and over what time period. Such information can be used to determine whether the candidate should be indicated as frequently changing jobs.

For example, a candidate who has a held position with five or more different companies within any five year period can be designated as a (e.g., assigned the concept) "frequent mover." Such designation need not be included to rank candidates or to exclude them from being returned as a result, but it can be included when displaying information about a candidate. An interviewer can then be presented with the information and ask follow up questions if desired.

Exemplary Analytic: Career Trajectory Match

By analyzing a large number of resumes, career trajectory information can be computed. For example, job titles for a set resumes can be normalized and extracted (e.g., via a conceptualizer). The job titles can then be placed in chronological order and transitions between jobs are recorded. The data can be aggregated across many (e.g., hundreds of thousands) candidates to provide a statistically meaningful analysis of typical career trajectories.

For example, the career trajectory data might indicate the data shown in Table 12 for the job title "Software Engineer." The data indicates the average tenure before transition and the likelihood of transition.

TABLE 12

Exemplary Career Trajectory Data for "Software Engineer"

| Next Title | Average tenure before transition | Likelihood of transition |
| --- | --- | --- |
| Software Engineer | 3 years | 39% |
| Engineering Lead | 5 year | 28% |
| QA Manager | 1.5 years | 15% |
| QA Lead | 2 years | 9% |
| Software Executive | 7 years | 5% |
| Junior Software Engineer | 1 years | 2% |
| Others | 3.5 years | 2% |

When analyzing a candidate to measure suitability for a particular position, a suitability score can be computed. For example, a software engineer who has been in a previous job for only six months may need more experience before moving into an Engineering Lead position, and they may be unsuited to a Sales Management position because such a transition is uncommon.

The career trajectory information need not be used to filter out candidates, but it can be used to flag potentially unsuited candidates (e.g., to a decision maker) when presenting information about the candidate.

Exemplary Matching Functionality

Various match technologies can be applied to any of the examples described herein. For example, after job candidate data is conceptualized, it can be included in a collection of other job candidate data for matching against job requisitions, which themselves can be generated via conceptualization.

During use of a software system incorporating the technologies described herein, a query (e.g., based on a job requisition) may not return the expect number of results. For example, in extreme examples, a query may return no candidates or thousands of candidates. Such results are typically not helpful. Accordingly, various tools can assist the user in obtaining a useful number of results by proposing query modifications or by automatically modifying a query.

Exemplary System for Generation of Proposed Query Modifications to Control Number of Results Returned by Query To assist in returning a desired number of results, proposed query modifications can be generated to control the number of results returned by a query. For example, in a system supporting matching of job candidates, a desired range of the number of job candidates desired in response to a query can be specified (e.g., in the software or by a user). For example, a user can specify an upper and lower bound for the range (e.g., "between 5 and 20 job candidates"). In any of the examples, instead of specifying an upper and lower bound, a single number (e.g., a target number with some assumed possible deviation) or some other mechanism (e.g., a target number and an acceptable percentage deviation) can be used for a range.

Figure 24:
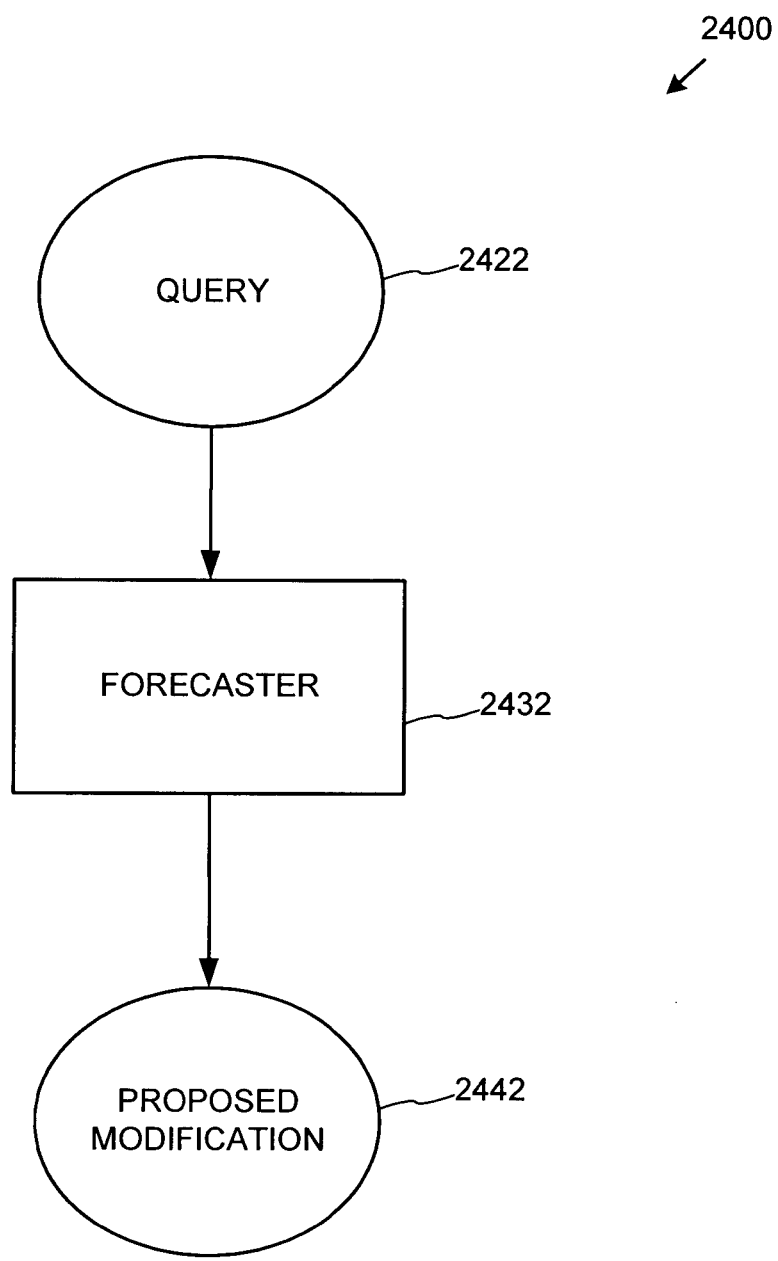
FIG. 24 shows an exemplary system for proposing query modifications to control the number of results returned by a query.

FIG. 24 shows an exemplary system 2400 for proposing query modifications to control the number of results returned by a query. The system accepts an original query 2422. Based on the original query 2422, a forecaster 2432 can generate a proposed modification 2442. As described in some of the examples, the proposed modification 2442 can be used to modify the original query 2422 to produce a modified query, which can then be used for the original query 2422 in an iterative process.

If desired, certain concepts or actions can be excluded from the forecaster 2432. Such functionality can be used to prevent repetitive forecasts during iterative operation. Such an arrangement can also be useful for excluding those possibilities not available to a user to prevent confusion.

Figure 25:
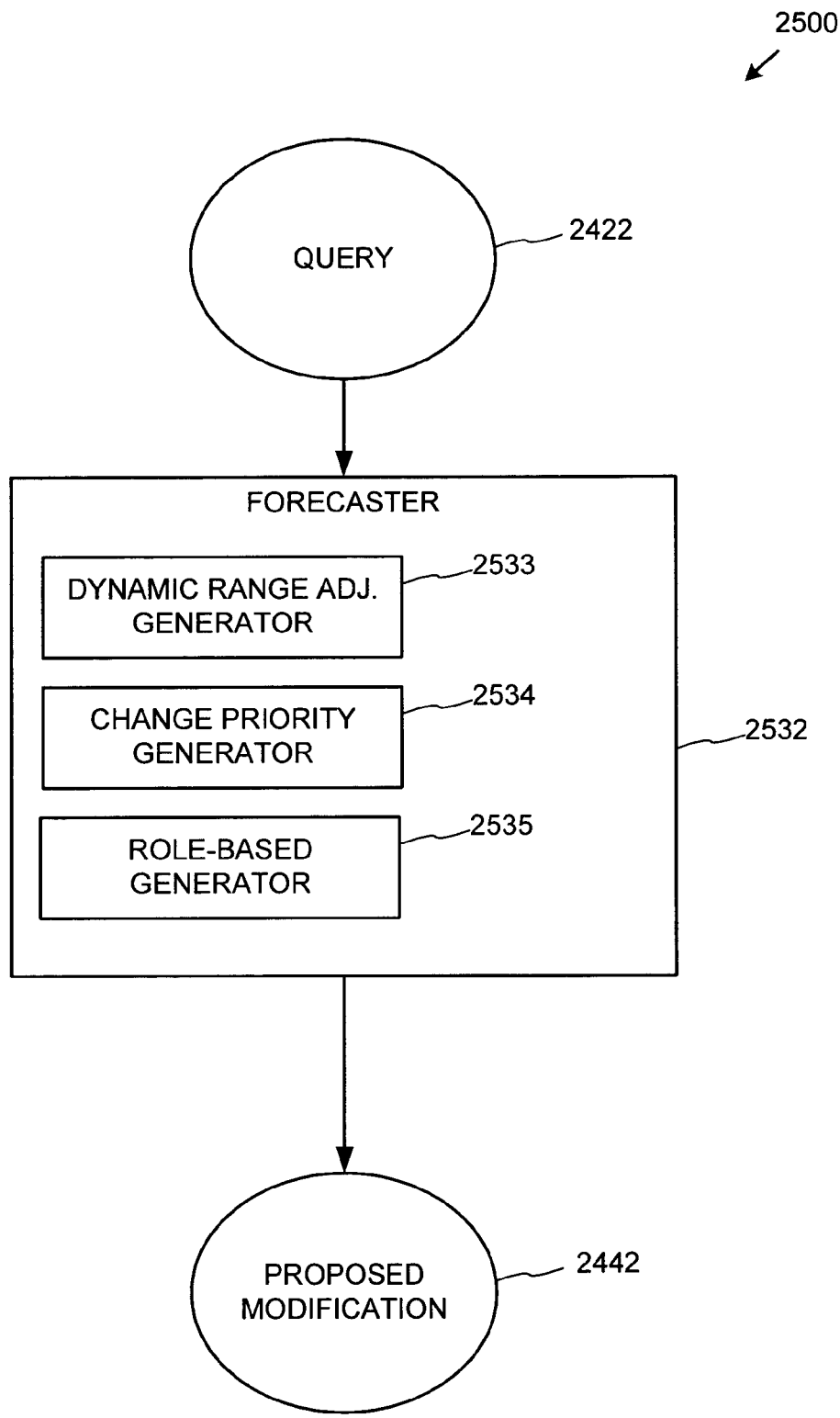
FIG. 25 shows an exemplary system, including sub-systems, for proposing query modifications.

Exemplary Sub-Systems for Generation of Proposed Query Modifications to Control Number of Results Returned by Query FIG. 25 shows an exemplary system 2500 for proposing query modifications to control the number of results returned by a query. The system can function similarly to the system 2400 of FIG. 24. However, in the example, the forecaster 2532 includes subsystems for proposing dynamic range adjustment 2533, proposing changes to priority 2534, and proposing role-based modifications 2335 to the query 2422. Exemplary implementations of the subsystems are described below.

Figure 26:
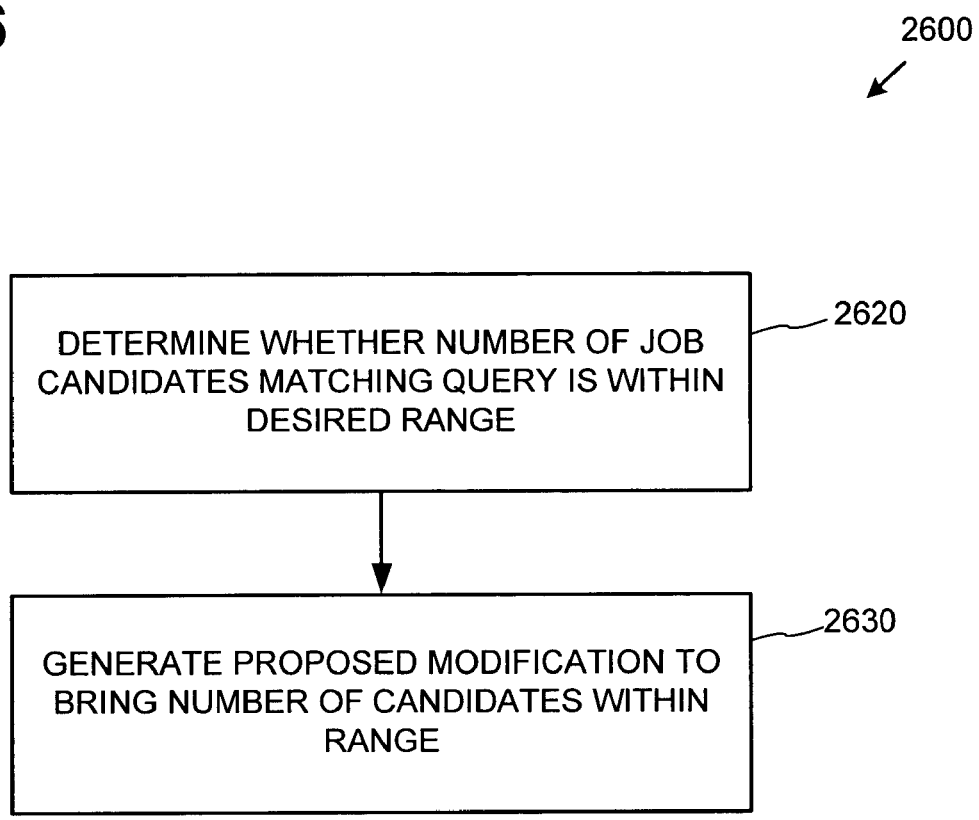
FIG. 26 is a flowchart showing an exemplary method for proposing query modifications to control the number of results returned by a query.

Exemplary Method for Generation of Proposed Query Modifications to Control Number of Results Returned by Query FIG. 26 shows an exemplary method 2600 (e.g., to be performed by the system 2400 or the system 2500) for proposing query modifications to control the number of results returned by a query.

At 2620, it is determined whether the number of job candidates matching a query is within the desired range. For example, a query based on a job requisition can be matched against job candidates to return a number of job candidates. Based on how many job candidates are returned, it can be determined whether the number is within the upper and lower bounds of a specified range.

At 2630, responsive to determining the number of job candidates is outside the given range, one or more proposed modifications to the query can be generated to bring the number of candidates within or closer to the range. The proposed modifications are predicted to bring the number of job candidates within (or closer to) the desired range.

Figure 27:
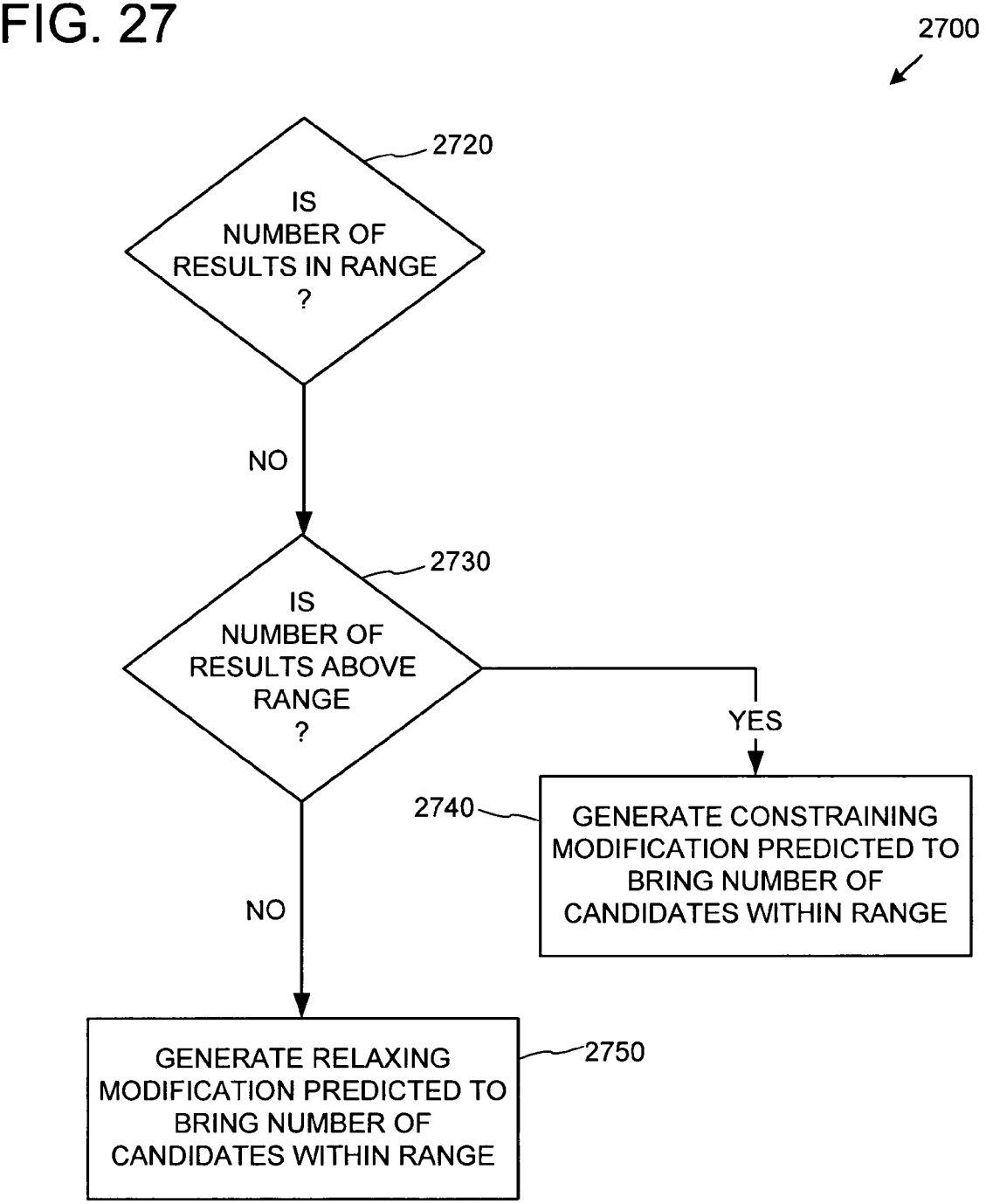
FIG. 27 is a flowchart showing an exemplary method for proposing a constraining or relaxing query modification.

FIG. 27 shows an alternative description of a method 2700 that can be used separately from or in conjunction with the method 2600 of FIG. 26. In the example, a constraining or relaxing modification can be generated.

At 2720 it is determined whether the number of results (e.g., the number of job candidates returned by the query) is within the desired range. If not, at 2730, it is determined whether the number of results is above the range. If so, at 2740, a constraining modification predicted to bring the number of candidates within (or closer to) the range is generated. If not, at 2750, a relaxing modification predicted to bring the number of candidates within (or closer to) the range is generated.

Exemplary Implementation of Sub-Systems to Generate Hints

In an exemplary arrangement, generating a proposed modification to the query can be achieved by using subsystems (e.g., the exemplary subsystems 2533, 2534, and 2535 of FIG. 25). For example, the subsystems can be called in a defined order, and the first one to provide a proposed modification (or "hint") can be used. The sub-systems can be called in the order shown below.

Dynamic Range Adjustment Proposed Modification Generator

The dynamic range adjustment proposed modification generator can operate by searching for a component of a query (e.g., associated with a job requisition) to find one or more components having ranges that can be changed. For example, if the proposed modification generator is attempting to generate a constraining hint, it can identify a component having a range that is set fully open (e.g., 0-100) and generate a hint that the range should be reduced.

On the other hand, if the proposed modification generator is attempting to generate a relaxing hint, it can identify a component having a range that is narrower than fully open (e.g., not 0-100) and generate a hint that the range be opened up.

If both cases, the generator can search through components in an order according to a ranking scheme (e.g., via the RankSkills mechanism described herein).

Change Priority Proposed Modification Generator

The change priority proposed modification generator can operate by generating a proposed modification concerning whether or not a component is required. For example, if the generator is generating a constraining hint, it can identify a component not appearing as required but associated with the candidates being returned (e.g., 25% of the highest number of candidates). The generator can then generate a hint that the identified component should be changed to be required.

On the other hand, if the generator is generating a relaxing hint, it can identify a component that has the lowest number of candidates associated with it that is currently required and suggest that the identified component be changed to not required.

Role-Based Proposed Modification Generator

In the example, the role-based proposed modification generator can generate only constraining hints. It can identify the primary role of a job requisition and determine the skills associated with the role in an ontology. The generator can then rank the skills and generate a hint proposing that the highest skill not currently in the query be added to it.

Exemplary Automated Application of Proposed Query Modifications

If desired, a method can be applied whereby the proposed modification technologies are automatically applied (e.g., iteratively) so that a query returns the desired number of results. For example, the forecaster can be called repeatedly, and the generated proposed modifications can be applied to the query. The process can stop when the query is forecast to return a number of results that is within the range. The altered query can then be returned.

The number of iterations can be limited (e.g., at 5 iterations). If the limit is reached, the intermediate version of the query returning the number of results closest to the range is returned.

Exemplary Cloning

The desired job candidate criteria can be generated by feeding the conceptualizer job candidate data (e.g., comprising a resume) for a job candidate having desired characteristics and using the extracted concepts (e.g., and associated concept scores) as criteria for additional candidates. Such an approach is sometimes called "cloning." For example, the job candidate having desired characteristics might be an employee who has worked out very well in a particular position, and more candidates resembling the employee are desired.

Exemplary Cloning Techniques

Figure 28:
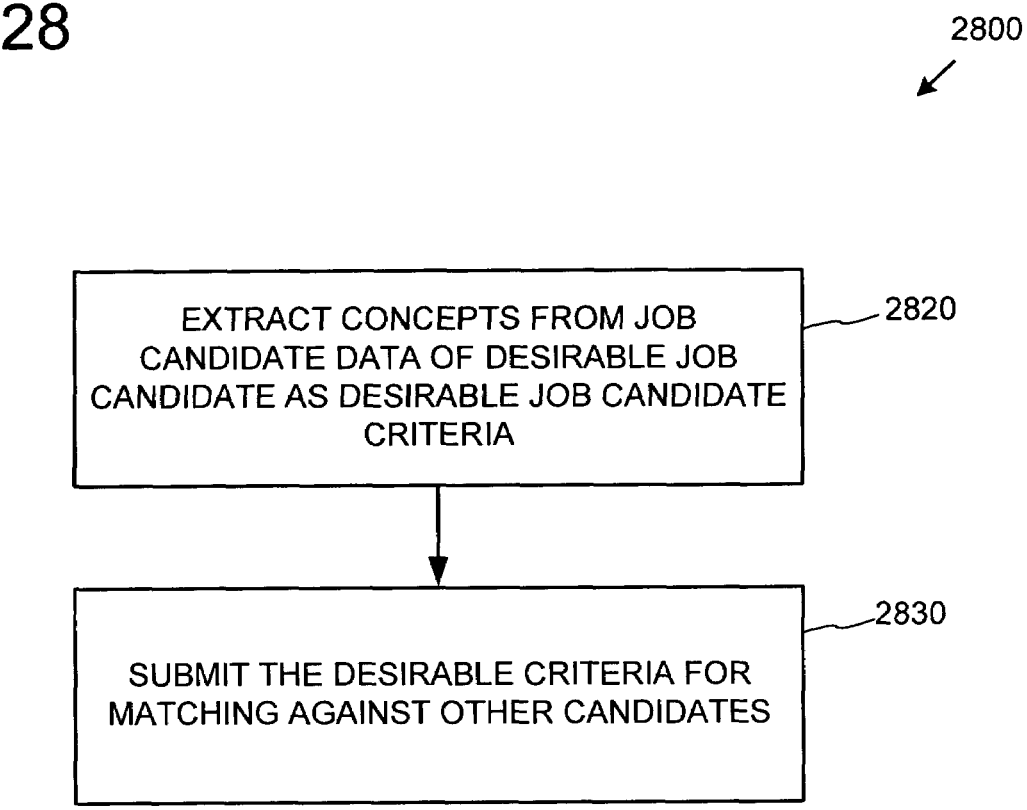
FIG. 28 is a flowchart showing an exemplary method for achieving cloning.

FIG. 28 shows an exemplary method 2800 for achieving cloning. In the example, at 2820, concepts are extracted from the job candidate data of a desirable job candidate (e.g., an employee or other job candidate who has desirable characteristics) as desirable job candidate criteria.

At 2830, the desirable criteria are submitted for matching against other candidates (e.g., via any of the match technologies described herein).

In some implementations, a two-phase approach can be taken: selecting concepts and then prioritizing the concepts. For concept selection, the incoming candidate (e.g., the desirable job candidate) can be passed to specific criteria-generating software components, which can independently analyze the job candidate data and add selected concepts to the criteria. For concept prioritization, the resulting concepts can be prioritized and winnowed down to a set that produces the desired number of matches.

Concept selection can be done by a set of five specialized software components (e.g., "cloners" or cloner objects). Each is given the incoming candidate and selects from concepts to add to the job requisition being constructed. The relative importance of the cloners is configurable. The five cloners can include a role cloner, a skill cloner, a company cloner, an industry cloner, and an education cloner.

Role Cloner

The role cloner can add the desirable candidate's most recent role to the requisition. Candidates can have more than one most recent role, for example if the resume parser cannot distinguish between jobs, or a candidate held more than one title in a most recent job. In this case the role cloner picks the most recent role with the highest score. The role added is flagged as a Most Recent and Required in the requisition.

Skill Cloner

The skill cloner can select the skill concepts from the candidate and rank them using a ranking scheme (e.g., via the RankSkills mechanism described herein). It can select the highest scoring skill concepts (e.g., the h highest concepts) and add them to the requisition.

Company Cloner

The company cloner can add the companies in the candidate's most recent experience. It can also add the company that is mentioned most often in the candidate's resume. By default company concepts are not designated as required.

Industry Cloner

The industry cloner can add the industries in the candidate's most recent experience. It can also add the industry that is mentioned most often in the candidate's resume. By default industry concepts are not designated as required.

Education Cloner

The education cloner picks the candidate's highest education level and adds to the requisition. By default education concepts are not designated as required.

Exemplary Architecture for Achieving Matching Functionality

Figure 29:
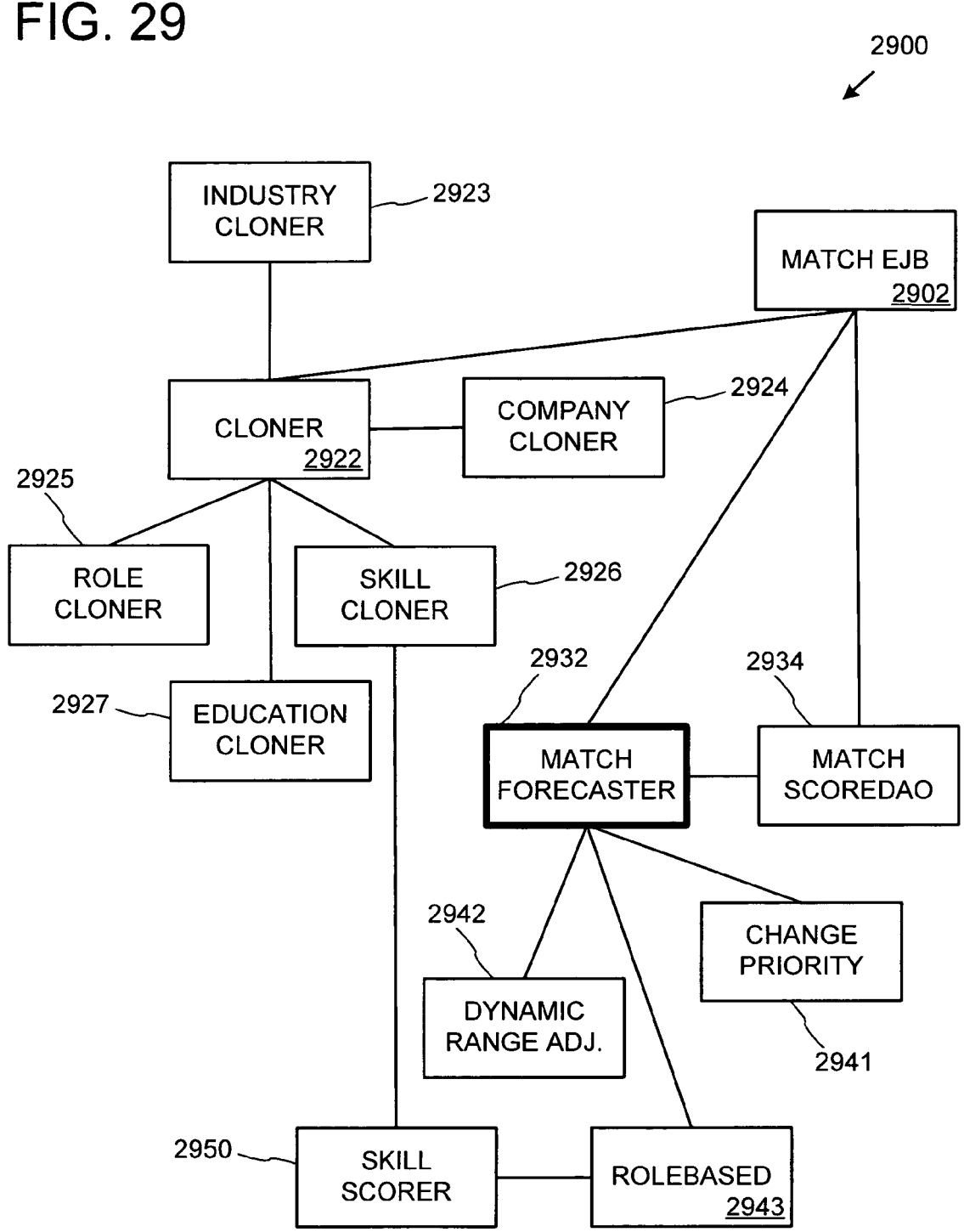
FIG. 29 is a block diagram showing an exemplary architecture of a system implementing match technologies.

Any number of architectures can be used to implemented the matching functionality described herein. An object-oriented approach can use the architecture 2900 shown in FIG. 29. In the example, there are various classes for implementing match functionality, including cloning. A class is a programmer-defined type from which objects can be instantiated.

The MatchEJB class 2902 can be used as a front end to provide access to various functionality. For example, the Cloner class 2922 can access other classes as desired, such as the Industry Cloner class 2923, the Company Cloner class 2924, the Role Cloner class 2925, the Skill Cloner class 2926, and the Education Cloner class 2927. The MatchForecaster 2932 can further access functionality in the MatchScoreDAO class 2934, the Change Priority class 2941, the Dynamic Range Adjustment class 2942, and the RoleBased class 2943. The Skill Scorer class 2950 can be accessed by various other classes as desired.

The connections are shown for exemplary purposes only. Although particular connections are shown between the classes to show that certain methods of some classes call methods of other classes, there can be more or fewer connections. Further, there can be more or fewer classes employing more or fewer methods.

Exemplary Data Structures for Achieving Matching Functionality

Although any of a number of data structures can be used to implement the matching functionality, the following describes an exemplary implementation using exemplary data structures. These data structures can be used to facilitate a Matching Service API in combination with the other examples described herein.

Exemplary Job Requisition Object

A job requisition object (e.g., called "JobRequisitionVO") can be the basic query specifier. The JobRequisitionVO ("JRVO") can be a data structure that carries a standardized description of a job requisition (e.g., a query with desired criteria). The JRVO can be passed to several match service API methods such as match, and matchforecast. THE JRVO can have the fields shown in Table 13. In addition, the JRVO can have additional fields, such as a desired score for a job candidate assessment.

TABLE 13

Exemplary Data Fields for a Job Requisition

| Field Name | Description |
| --- | --- |
| Name | The name of the requisition this JRVO represents |
| Description | The job description associated with the requisition |
| CustomerName | The name of the customer for whom this requisition has been opened |
| Status | The current status of the requisition. This field contains a String that can contain one of: "Open", "Closed", "Pending" or any other customer-defined value |
| EmploymentType | The type of employment offered by the requisition. This is usually one of "Permanent", "Contract", "Temporary" although it may be any customer-defined value. |
| Management-Experience | A flag indicating whether this requisition requires (e.g., is designated as requiring) a candidate who has experience managing people |
| Freshness | The maximum Freshness value to search for. This is a numeric value and its meaning is described in the section Freshness below. |
| Role | The primary job role associated with this requisition. A job role is a generalized version of the job title that this requisition will fill. |
| Compensation | The minimum and maximum salary offered by this requisition. |
| DateOpened | The date on which the requisition was opened. |
| Skills | A list of the skills that are specified for a candidate to meet the requisition. |
| Education | A list of the educational qualifications specified for a candidate to meet the requisition. |
| Experiences | A list of the work experiences specified for a candidate to meet the requisition. |
| Requirement-Groups | A list of additional groups of skill, education and experience requirements that candidates must meet in order to be qualified for this requisition. See the section Requirements Group, below, for more details. |
| Address | The zip code of the location specified in the requisition, along with a radius around that location within which candidates must live in order to be considered for this requisition. |

Freshness

In the example, freshness is the length of time since a candidate last interacted with the customer's career center, measured in days. For these purposes, an "interaction" means the candidate submitted a resume, created an account on the career site or logged into an existing account. If candidates are gathered through mechanisms other than a corporate career site—for example by spidering resumes from the web—then the date that those mechanism last gathered data about the candidate is used.

The requisition can contain a number of days in the Freshness field. When candidates are matched against the requisition, only candidates whose freshness value is less than the Freshness field of the requisition may be returned.

The Freshness field may be set to a special value (e.g., −1) to indicate that candidates with any freshness value can be matched.

Pool

The match engine can contain a mechanism to segment the set of candidates that are contained in the concept space into pools. Pools can be sets of non-unique candidates, in other words any candidate may appear in one or more pools.

The match engine can support two types of pool. The customer pool can segment candidates by customer. For example, in a system supporting more than one customer, respective customers who have installed the software system get their own pool of candidates. Candidates who apply to a job posted on a customer's career center can be placed into that customer's pool and may only be matched against jobs posted by that customer. There can be an exception to this rule if candidates independently apply to jobs at more than one customer. In this case they can appear in the customer pools of respective customers to whom they have applied.

The second type of pool is the functional pool. These can be sub-pools of the customer pools and they are specific to each customer. The number and specification of functional pools can be decided by the customer and business logic is written to ensure that candidates are placed into the correct pool.

The JRVO can contain a Pool field which specifies which functional pool(s) should be searched to find candidates who match the requisition.

Requirements Group

Several skill, role, experience or education requirements can be placed together into a group. When grouped in this way, the match engine can look for candidates who meet the requirements in the same job experience. For example, if the requirement called for candidates who had the role "Product Manager" and had worked in the "Entertainment" industry then it would match a candidate who had been a Product Manager at the Disney Corporation (i.e., a company in the entertainment industry), but it would not match a candidate who had been a Product Manager for Microsoft Corporation and in a different job had been a Software Engineer for Disney.

Specifying Requirements

Requirements for role, skill, experience or education can have detailed controls. These controls can specify the skill range, most recent flag, required flag and weight associated with that requirement.

The skill range can specify the range of concept values that will match the requirement. Concepts typically follow some sort of scoring system. For example, a value of 0-100 can be used where 0 means the candidate is an absolute novice in that concept, and 100 means they are an expert. The value range specifies the minimum and maximum scores that meet the requirement. For example a value range of 46-57 will match a candidate whose appropriate concept score is 52 but not one whose score is 63.

The most recent flag can specify whether the concept must be in the candidate's most recent job experience to match this particular requirement. For example, a requirement for the skill "Java" with the most recent flag set will not match a candidate who did not use Java in their most recent job.

The required flag can control whether a requirement is an absolute requirement or not. If this flag is set then only candidates who meet all the conditions of this requirement are returned. For example, if an education requirement of "Bachelor's degree in Computer Science" is required, then candidates with a Bachelor's degree in another subject will not match this requirement. If the required flag is not set, then candidates who do not meet the requirement can be included in the match results, but they will receive a lower score than those who do (see weighting discussion below).

The weighting can specify the relative score associated with a candidate meeting this requirement. Candidates who meet the requirement receive the weighting value as their score; candidates who do not meet the requirement receive a requirement score of zero. The overall match score is a combination of the scores of the individual requirements.

Exemplary Candidate Object

A candidate object (e.g., called "CandidateVO" or "CVO") can represent and describe candidates. The CVO can include a data structure that can carry a standardized description of a candidate. In the example, it is much simpler than the requisition because the conceptual representation of candidates maintained in the match engine is relatively simple. The task of storing detailed information about a candidate can be left to the Applicant Tracking Software (ATS) that is the client of the Match Service.

A set of CVOs can be returned from the match and clone methods of the Match Service API. It can also be the input to the clone method.

The CVO can store an identifier for the candidate and the candidate analytics scores for that candidate. Exemplary fields are shown in Table 14.

TABLE 14

Exemplary Data Fields for a Candidate

| Field Name | Description |
| --- | --- |
| CandidateID | A number that uniquely identifies the candidate. This can be used by the ATS to retrieve its own data associated with a candidate. It can also be used as the input to a call to the retrieve method of the Encoder Service API, which returns the full set of concept values associated with the candidate in the concept space. |
| Management-Experience | This flag is set when the candidate is determined to have experience managing people. |
| FrequentMoves | This flag is set if the candidate is determined to have moved frequently between employers in their recent job experience. |

Match Forecast Object

Match Forecast objects (e.g., called "ForecastvO") can be returned by the matchForecast method and can contain the number of candidates a JobRequisitionVO will match and the hint at what to change in the requisition to bring it into range. The objects can also store or generate various information as described in its exemplary methods in Table 15.

TABLE 15

Exemplary Methods for Match Forecast Object

| Field Name | Description |
| --- | --- |
| getNumberOfMatches( ) | Returns the number of candidates the job requisition will match |
| getHintDirection( ) | Returns the type of hint. This is one of:<br>ForecastVO.RELAX - the hint describes how to relax the requisition so that it will return more candidates<br>ForecastVO.CONSTRAIN - the hint describes how to constrain the requisition so that it will return fewer candidates<br>ForecastVO.NONE - there is no hint. This occurs either because the number of matches is already in the desired range or because no hint could be generated. |
| getConceptName( ) | Returns the name of the concept that should be altered to apply the hint. Where appropriate, the name will include a prefix to indicate the type of concept. The list of possible prefixes is found in a location (e.g., com.guru.candidate.TermNames). For example if the concept to be change is the role "software engineer" then get ConceptName will return guru__role__software engineer. |

TABLE 15-continued

Exemplary Methods for Match Forecast Object

| Field Name | Description |
|---|---|
| getAction( ) | Returns a constant defining what action should be taken with the named concept in order to apply the hint. This is one of:<br>CHANGE_RANGE - the hint specifies that the range of the concept should be changed. For RELAX hints, this means the concept's range should be set to be 0...100.<br>For CONSTRAIN hints the concept's range should be set to one standard deviation around the average score for the concept. The average and standard deviation scores can be retrieved by calling a method (e.g., com.guru.encoder.facade.EncoderService.getConceptStats)<br>CHANGE_PRIORITY - the hint specifies that the priority of the concept should be changed. For CONSTRAIN hints this means the concept's Required flag should be set to TRUE. For RELAX hints the concept's Required flag should be set to FALSE.<br>ADD_CONCEPT - this hint is only generated for CONSTRAIN hints. The named concept will not exist in the current job requisition. It should be added as a Required concept in the requisition.<br>DELETE_CONCEPT - this hint will only be generated for RELAX hints. The named concept should be removed from the current job requisition. This feature can be omitted or included for compatibility with systems implementing it |

Exemplary Design for Achieving Matching Functionality via API

Although any number of implementations are possible, one implementation of matching functionality uses classes defined in the Java® programming language. The API for one possible Javag language implementation is described for purposes of example only. The Java classes that make up the matching functionality can be accessed in a number of ways. The most common is by client applications (e.g., matching or search software) that call through the EJB Match Service facade.

Exemplary Methods

The EJB Match Service facade can support the methods shown in Tables 16-22, below.

TABLE 16

Exemplary clone Method public MatchesVO clone(CandidateVO pCandidate, Hashtable pParameters)

| | |
|---|---|
| Description | Packaged cloning operation. Finds candidates who are like the input candidate. Calling this has same affect as calling cloneToQuery to generate a Query that will match the candidate and then calling match using that Query to find the candidates. |
| Parameters | pCandidate - The source candidate to be cloned<br>pParameters - NONE |
| Returns | The set of matched candidates who are similar to the source candidate |

TABLE 17

Exemplary cloneToQuery Method public JobRequisitionVO cloneToQuery
(CandidateVO pCandidate, Hashtable pParameters)

TABLE 17-continued

Exemplary cloneToQuery Method

| | |
|---|---|
| Description | Generates a job requisition that will find candidates who are similar to the specified candidate. This method is useful for showing the user the job requisition that is generated. Otherwise the clone method can be used to directly return results. |
| Parameters | candidate - The source candidate to be cloned<br>pParameters - NONE |
| Returns | A job requisition that will find candidates who are similar to the source candidate |

TABLE 18

Exemplary resumeToQuery Method public JobRequisitionVO
resumeToQuery(String pResume, Hashtable pParameters)

| | |
|---|---|
| Description | Generates a job requisition that will find more candidates who are similar to the candidate parsed from the supplied resume. |
| Parameters | resume - The resume to parse<br>pParameters - NONE |
| Returns | A JobRequisitionVO that will match candidates who are similar to candidate |

TABLE 19

Exemplary matchForecast Method public ForecastVO
matchForecast(JobRequisitionVO pJobRequisition,
Hashtable pParameters)

| | |
|---|---|
| Description | Creates a match forecast for the specified job requisition. The forecast will contain the number of candidates that would be returned if the job requisition were passed into the match method. It will also check to see if the number of candidates is within the specified range. If it is not, a hint is included with the forecast. The hint suggests a change that could be made to the requisition. See the description of ForecastVO for more exemplary details of forecast hints. |
| Parameters | pJobRequisition - The job requisition to forecast<br>pParameters - The parameters to the call.<br>The following may be optionally included as parameters:<br>MIN_SCORE_SIZE: An Integer that defines the lower end of the optimization range<br>MAX_SCORE_SIZE: An Integer that defines the upper end of the optimization range<br>HINT_EXCLUSION_LIST: An array of String objects that contain the names of any concepts that should not have forecast hints generated about them<br>SUGGESTED_HINTS_LIST: An array of String objects that contain the calling software wants to suggest for generating forecasting hints. The match forecaster technologies will attempt to prefer any concepts in this list when creating forecasts.<br>FORECAST_METHOD_EXCLUSION_LIST: An array of String objects that contain the names of any of the forecasting methods (e.g., out of the three described herein) that should not be used to generate a forecast. The valid names are defined in MatchService. |
| Returns | A FORECASTVO object that describes the number of candidates that would be returned if the same job requisition were passed to the match method. The object also contains a hint that describes how the job requisition could be changed so that it is more likely to return a number of candidates that was within the range specified by the MIN_SCORE and MAX_SCORE_SIZE parameters). |

TABLE 20

Exemplary optimize Method

| | |
|---|---|
| Public JobRequisitionVO optimize(JobRequisitionVO pJobRequisition, Hashtable pParameters) | |
| Description | Optimizes a job requisition so that it returns the specified number of results. This may not always be possible, so the returned Job requisition is not guaranteed to return a number of results within the specified range. |
| Parameters | pJobRequisition - The requisition to optimize pParameters - Parameters to the call. The following may be optionally included: QUICK_MATCH: perform a quick match OPTIMIZE_TO_RANGE: optimize the query to return between MIN_SCORE_SIZE and MAX_SCORE_SIZE results. If you set this flag, you must also include: MIN_SCORE_SIZE: An Integer that defines the minimum number of candidates to be scored by the optimized Job Requisition MAX_SCORE_SIZE: An Integer that defines the maximum number of candidates to be scored by the optimized Job Requisition |
| Returns | A version of pJobRequisition with the requested optimizations performed. The pParameters values may be changed to reflect the actual number of results returned by the optimized requisition. |

TABLE 21

Exemplary createQuickMatch Method

| | |
|---|---|
| public JobRequisitionVO createQuickMatch(JobRequisitionVO pJobRequisition, Hashtable pParameters) | |
| Description | Creates a QuickMatch Job requisition so that it returns the specified number of results. This may not always be possible, so the returned Job requisition is not guaranteed to be valid. |
| Parameters | pJobRequisition pParameters - Parameters to the call. The following may be optionally included: MIN_SCORE_SIZE: An Integer that defines the minimum number of candidates to be scored by the optimized Job Requisition MAX_SCORE_SIZE: An Integer that defines the maximum number of candidates to be scored by the optimized Job Requisition |
| Returns | A version of pJobRequisition with the QuickMatch technology applied to it. |

TABLE 22

Exemplary predictResultsSize Method

| | |
|---|---|
| public int predictResultsSize(JobRequisitionVO pJobRequisition, Hashtable pParameters) | |
| Description | Predicts the number of results that the specified Job Requisition would match if it were passed to the match method. |
| Parameters | pJobRequisition - The job requisition to predict pParameters - The parameters to the call. |
| Returns | The number of candidates that match this job requisition |

Exemplary Implementation Descriptions

This section describes exemplary internal APIs of the match technology classes and some of the implementation strategies used. The internals are exemplary only. Many other approaches and techniques may be used to achieve similar functionality.

MatchEJB

Description of the major methods in the MatchService/MatchEJB classes follows. Each section describes the parameter values that are extracted and the underlying classes (if any) that are called to execute the function.

In an exemplary implementation, the Cloner object used by the methods is a static object of the MatchEJB class that can be lazily initialized by the methods that call cloner. The Cloner object caches several important data items, so it is static so that it maintains the cache across method calls.

Clone

In the example, the clone method simply wraps calls to cloneToQuery followed by match. It is a high-level convenience function to allow client software to avoid making two calls to the MatchService across a potentially heavyweight RPC protocol like SOAP.

CloneToQuery

The cloneToQuery method ensures that the static cloner object exists, then passes the specified candidate to the cloner and calls the cloneCandidate method.

ResumeToQuer

The resumeToQuery method performs essentially the same set of tasks as clone, except it uses the setResume method to pass the text resume to the cloner instead of a structured CandidateVO object.

Optimize

The optimize method checks its parameters to see what optimization methods it should apply to the job requisition. It supports QUICK_MATCH and OPTIMIZE_TO_RANGE optimizations.

If the QUICK_MATCH parameter is set, the createQuickMatch method is called.

If the OPTIMIZE_TO_RANGE parameter is set, MIN_SCORE_SIZE and MAX_SCORE_SIZE parameters are also passed to specify the range to optimize into; otherwise a MatchException is thrown. Once the range is established, it is passed down to the Cloner.optimizejobRequisition method which performs the actual optimization to range.

After optimization is complete, the MIN_SCORE_SIZE and MAX_SCORE_SIZE parameters are reset so that they are one less than and one greater than the number of candidates returned by the optimize reutilization. This is done because the optimizer does not guarantee that it produces a requisition that will return a number of candidates within the requested range. If the parameters are not reset, then the call to match will fail if optimize is being called by the MatchEJB.clone method.

CreateQuickMatch

The createQuickMatch method checks the MIN_SCORE_SIZE and MAX_SCORE_SIZE parameters. If they are not passed in, then default values (e.g., 25 and 100 respectively) are used. The Cloner class' createQuickMatch method is called to perform the actual operation.

MatchForecast

The matchforecast method extracts the specified parameter values from the pParameter hashtable passed in. It then calls MatchForecaster.generate to generate a new ForecastVO object that is returned to the caller.

PredictResultsSize

This method wraps the getMatchPopulation method of MatchScoreDAO, which returns the number of candidates who would be returned if the specified JobRequisitionVO object was sent to the match method.

Cloner

In the example, the cloner class is not directly accessible to client applications—they can only access it indirectly through the public MatchEJB methods. It contains the logic for cloning candidates and optimizing job requisitions. It also contains a static cache used by the optimizejobRequisition method.

Most of the work of the cloning operation is done by a set of specialized objects of the CandidateCloner class. These objects know how to clone a particular class of concepts about a candidate. For example, there are CandidateCloners for role, skill and education. Exemplary implementations are described in detail below.

Another important part of the cloning operation are the SuggestedTerm and SuggestedTermList classes. The SuggestedTermList is an alternative representation of the JobRequisitionVO that contains a flat list of the concepts (SuggestedTerm objects) rather than the structured set of attributes found in requisitions. The different types of concepts are distinguished using the standard concept name prefixes defined in the singleton TermNames class. For example the RoleVO object returned from JobRequisitionVO. getRoleReq( ) is converted to a SuggestedTerm object whose concept name is role_<RoleVO Name>.

This flat representation is useful for comparing amongst and selecting from all the concepts in a requisition.

SetCandidate

This method sets the candidate to be cloned from the supplied CandidateVO. It retrieves the Terms object from the CandidateVO—this contains the scored concepts for this candidate which are used by the cloning operation.

If the CandidateVO does not return a valid Terms object, then the setcandidate method attempts to retrieve it by calling the retrieve method of com.guru.encoder.facade.encoderService which takes a MemberID and retrieves the conceptualized Terms for that member. If this fails, or the CandidateVO does not have a valid MemberID, then the text of the candidate's resume is retrieved from the CandidateVO and that is sent through the conceptualizer to create a new Terms object for the candidate. This last operation can take a significant amount of time —measured in seconds or minutes, so is avoided (e.g., only used if no other mechanism returns a valid Terms object for the candidate).

CandidateVO objects passed to setCandidate ideally already have a valid Terms object. If they do not, a valid MemberID can be supplied in the CandidateVO to avoid the cost of conceptualizing the candidate.

SetResume

The setResume method is an alternative to setCandidate that takes a String containing the text of a candidate's resume. This string is passed through the full conceptualizer to turn it into the scored concepts in a Terms object. Because the conceptualizer takes a significant amount of time to execute, this method can be avoided (e.g., only be called if the only source of information available about a candidate is their resume). SetCandidate can be called instead.

CloneCandidate

The clonecandidate method is a high-level wrapper to the actual cloning operation. It performs the following operations:
  Calls the abstractCandidate method to generate a list of concepts from the source candidate. This assumes that the setCandidate or setResume method of Cloner has already been called.
  If abstractCandidate succeeds, the resulting abstracted concepts, along with the original Terms object are passed down to each of the cloner components.
  The createQuery method is called to actually create a job requisition that will clone the source candidate. This can perform the work of the cloning operation.
  If createQuery succeeds, the SuggestedTermsList object that is created by the createQuery method is turned into a JobRequisitionVO and returned to the caller.

AbstractCandidate

The abstractCandidate method takes the Terms object from the source candidate and converts it into a SuggestedTermList. This conversion allows the CandidateCloners to work on the data format they expect.

CreateQuery

The createQuery method controls the main cloning operation. It performs the following actions:
  Creates a new, empty SuggestedTermsList that will hold the final clone query.
  Calls the addConcepts method of each of the CandidateCloner objects—this gives each of the specialized cloners a chance to add concepts to the clone query.
  Call adjustPriorities to select which concepts will be required and which will not.
  Call ensureMinimumMusts to ensure that there are at least the specified number of Required concepts in the clone query.
  Call cullQuery to reduce the number of concepts in the clone query down to a specified number.
  Call optimizeQuery to change the query so that it returns between 10 and 100 results.

This results in a SuggestedTermList object that contains an optimized query that typically returns candidates who are similar to the source candidate.

AdjustPriorities

The adjust Priorities method sets the priority of each concept in the SuggestedTermsList according to its confidence value. The confidence value is generated along with the concepts by the CandidateCloners. The priority is set to one of IMPORTANT, SHOULD or NICE according to the confidence level.

EnsureMinimumMusts

The ensureMinimumMusts method makes sure that there are at least the specified number of concepts with a priority of MUST. The CandidateCloners can generate concepts that have an initial priority setting of MUST.

If there are too few MUST concepts, then the IMPORTANT concept with the highest confidence value is promoted to a MUST.

CullQuery

The cullQuery method reduces the number of concepts in the SuggestedTermsList by applying a series of specialized TermReductionAlgorithm objects. These have different mechanisms for removing concepts from the list.

CreateQuickMatch

The createQuickMatch method can apply a set of heuristic rules to a job requisition to prepare it for quick matching.

These rules are designed to improve the quality of the matches returned by the original requisition.

OptimizeJobRequisition

The optimizeJobRequisition method is a front-end for the optimizeQuery method that does the work of optimization. OptimizeJobRequisition creates a SuggestedTermsList from the JobRequisitionVO and passes it to optimizeQuery.

OptimizeQuery

The optimizeQuery method is a general function that makes changes to a SuggestedTermsList so that the number of candidates it returns falls within a specified range. This method is called in a number of places, for example directly from the MatchEJB.optimize method and through the cloner.createQuickMatch method.

The optimization works by iteratively generating a match forecast for the current version of the SuggestedTermsList and then if the forecast is out of range, applying the hint and repeating.

Because the hints are not guaranteed to bring the query into range, or even close to it, this iterative process could take a long time to complete or even loop infinitely. Even when it terminates, each cycle through the forecast-apply hint process is potentially expensive, so typically the number of times iterated is limited or controlled. Limiting and controlling can be achieved through the following mechanisms:

- Iteration count—the iterations can be ended if more than a set number of iterations (e.g., 6) has taken place
- Prevent repeat forecasts—one of the ways to fall into an infinite loop is when the forecaster hints at a relaxation hint, followed by the opposite constraining hint. In this scenario the optimizer oscillates between the two forecasts forever. To prevent this, a list of previous forecasts is maintained by the MatchForecaster class, called the ExcludedActions list. Each forecast is added to the list and the MatchForecaster ensures that forecasts on the list are not generated. This avoids the risk of oscillation between forecasts.

Because of the iteration count, the resulting query may not return results within range. If still out of range, the best previous query can be used. On loops through the iterations, the query that is closest to the range can be stored.

CandidateCloners

The candidate cloners are specialized classes that pick concepts from the abstracted SuggestedTermsList and add them to the clone query.

RoleCloner

The RoleCloner adds one most recent role to the clone query. It does this by:
1. Finding the most recent groups for this candidate—these are the one or more groups that have a guru_most_recent_1 concept in them. There can be more than one such group for a candidate.
2. Find all the role concepts that are in a most recent group. The names of role concepts are prefixed by an identifier (e.g., role).
3. Add the highest scoring of the role concepts to the clone query at MUST priority.

EducationCloner

The EducationCloner adds zero or more education concepts to the clone query. The field of study of a candidate's education experiences can be ignored, and just the degree level (bachelor's, master's, PhD etc.) can be cloned.

The technique for deciding which education concept to clone includes:
1. Retrieve all the degree concepts from group zero. The degree concepts have a special prefix (e.g., education_degree). Group zero is a list of all the concepts the candidate has, regardless of the work experience in which is appeared.
2. Find the degree concept with the highest score. This represents the highest educational level the candidate has achieved, so for a candidate who has a bachelor's and a master's, the master's will be chosen.
3. If the highest education achieved is at least a bachelor's degree, add the education to the clone query at MUST priority.
4. If the highest education achieved is less than a bachelor's, then add the education to the clone query with a priority that is calculated as follows:
   4.1. Take the base education priority—currently set at IMPORTANT.
   4.2. If the candidate has two or more educations, increase the priority to MUST.

SkillCloner

The SkillCloner adds zero or more skills concepts to the clone query. A skill concept is one that has no name prefix. The technique for deciding which skill concepts to add is:
1. Calculate the confidence score of the skill using the SkillScorer class (see below).
2. Scale the confidence by the importance level, which is a configurable setting of the SkillCloner class.
3. Normalize the confidence into the range 0 . . . 100
4. If the confidence exceeds a threshold value set in the SkillCloner class, add the skill concept to the clone query at MUST priority.

CompanyCloner

The CompanyCloner adds zero or more company concepts to the clone query. A company concept has the prefix guru_company. The algorithm for deciding which company concepts are added is:
1. Add all the company concepts in one of the most recent groups to the clone query at priority IMPORTANT.
2. Find the company concept that appears the most number of times in the concept list. If this concept has not already been added to the clone query in step 1, add it at priority IMPORTANT.

IndustryCloner

The IndustryCloner adds zero or more industry concepts to the clone query. An industry concept has a special prefix (e.g., industry). The algorithm for deciding which industry concepts are added is the same as the algorithm for adding company concepts.

MatchForecaster

The exemplary MatchForecaster class is responsible for generating ForecastVO objects that describe the number of candidates that will match a JobRequisitionVO and what can be done to alter the requisition to return more or fewer results.

SetExcludedActions

The setExcludedActions method is used to set a list of ForecastVO objects that the match forecaster is not allowed to generate. This is used by the Cloner.optimizeQuery method to prevent infinite loops and oscillations.

SetExcludedConcepts

The setExcludedConcepts method is used to set a list of String objects that contain the names of concepts which cannot be returned as part of a ForecastVO generated by this match forecaster.

This is useful, for example, if a user interface does not allow the user to change some concepts that are added to the JobRequisitionVO. In this case it is desirable to stop the forecaster from generating hints involving those concepts as the user has no way to carry out the hints. In this case, just add the names of the "hidden" concepts to an ArrayList and pass it to setExcludedConcepts.

SetExcludedMethods

The setExcludedMethods method allows prevention of the forecaster from using certain MatchForecastMechanisms to generate forecasts. The list of current MatchForecastMechanisms is shown below.

An example of the need for this facility is a user interface that doesn't allow the user to change the priority of a concept. This user interface would want to exclude the ChangePriorityMechanism since the user has no way of executing hints generated by that mechanism.

SetSuggestedConcepts

The setSuggestedConcepts allows the caller to suggest particular concepts for forecasting. The MatchForecaster is free to ignore this list. The list can be ignored and have no effect, but can be used in other implementations.

Generate

The generate method actually creates a ForecastVO for the specified JobRequisitionVO. The method first calculates the number of candidates the requisition will match by calling the MatchScoreDAO.getMatchPopulation method. If this number is within the specified range, a ForecastVO is created and returned with its numberOfMatches field filled out and a hint direction of NONE.

If the number of matches is below the bottom end of the specified range, generateRelaxationHint is called and the resulting ForecastVO is returned. If the number of matches is above the top end of the specified range, generateConstrainingHint is called and the resulting ForecastVO is returned.

GenerateRelaxationHint

The generateRelaxationHint performs the following steps to generate a hint that will return more results:

1. Check to see if the DynamicRangeAdjustmentMechanism is allowed (i.e. not on the list of excluded methods). If it is, call the generateRelaxingHint method of the dynamic range adjustment object. If that returns a non-null ForecastVO object, return it.
2. Check to see if the ChangePriorityMechanismis allowed. If it is, call the generateRelaxingHint method of the change priority object. If that returns a non-null ForecastVO object, return it.
3. Return an empty forecast.

GenerateConstrainingHint

The generateConstrainingHint performs the following steps to generate a hint that will return fewer results:

1. Check to see if the DynamicRangeAdjustmentMechanism is allowed (i.e. not on the list of excluded methods). If it is, call the generateConstrainingHint method of the dynamic range adjustment object. If that returns a non-null ForecastVO object, return it.
2. Check to see if the ChangePriorityMechanismis allowed. If it is, call the generateConstrainingHint method of the change priority object. If that returns a non-null ForecastVO object, return it.
3. Check to see if the RoleBasedMechanism is allowed. If it is, call the generateConstrainingHint method of the role based object. If that returns a non-null ForecastVO object, return it.
4. Return an empty forecast.

Note that the RoleBasedMechanism is only called in the generateConstrainingHint case because in the example, it cannot generate a relaxation hint.

MatchForecastMechanisms

These specialized class form the core of the match forecasting techniques. Each one can generate certain types of relaxing and/or constraining hints.

DynamicRangeAdjustmentMechanism

To generate a constraining hint, the DynamicRangeAdjustmentMechanism performs the following steps:

1. Check the primary role of the requisition. If this role is not excluded (i.e. is not on the excluded concepts list and constraining its range is not on the excluded actions list) and it is a Required concept and its range is currently set at 0 . . . 100, then create a ForecastVO that suggests constraining the range of the primary role.
2. If 1, above, does not result in a ForecastVO, rank the skills of the requisition from highest scoring to lowest scoring. Working down the list, find the first skill that meets the same criteria and create a ForecastVO that suggests constraining the range of that skill.

To generate a relaxation hint, this class performs the following steps:

1. Check the primary role of the requisition. If this role is not excluded and it is a Required concept and its range is currently set to be smaller than 0 . . . 100, then create a FoorecastVO that suggests relaxing the range of the primary role.
2. If 1, above, does not result in a ForecastVO, rank the skills of the requisition from highest scoring to lowest scoring. Working down the list, find the first skill that meets the same criteria and create a ForecastVO that suggests constraining the range of that skill.

ChangePriorityMechanism

To generate a constraining hint, the ChangePriorityMechanism performs the following steps:

1. Retrieve the skills from the requisition
2. For each skill that is not excluded and not Required, record the number of candidates that has that skill, by calling the EncoderService. getConceptStats method.
3. Find the skill that is not Required and whose number of candidates is the nearest to 75% of the highest number of candidates found in step 2. Create a ForecastVO that suggests constraining the priority of that skill.

To generate a relaxation hint, this class performs the following steps:

1. Retrieve the skills from the requisition.
2. Find the Required skill that is not excluded and has the lowest number of candidates associated with it. Create a ForecastVO that suggests relaxing the priority of that skill.

RoleBasedMechanism

To generate a constraining hint, the RoleBasedMechanism performs the following steps:

1. Get the primary role for the requisition.
2. Find the skills associated with that role. This is done by calling the getRoleSkills method of a class (e.g., com.guru.alexandria.facade.OntologyService).
3. Find the highest ranking skill that is not excluded and is not currently in the skills list of the requisition. Create a ForecastVO that suggests adding this skill to the requisition.

In the example, the RoleBasedMechanism cannot generate a relaxation hint and will throw an exception if its generateRelaxingHint method is called.

Skill Scorer

The SkillScorer class contains a set of utility functions that score and rank skill concepts. It can be used throughout the match technology classes to provide skill scoring services.

SelectBestSkills

The selectBestSkills method finds the highest scoring skill in a SuggestedTermsList. It calls rankSkills and returns the first (highest scoring) entry on the ranked list.

RankSkills

The rankSkills method calculates the scores of each of the skills in the specified SuggestedTermrsList by calling calculateScore on each of them. It then sorts the list into descending order (highest scoring skills first) and returns it.

CalculateScore

The calculatescore method calculates a score for a single SuggestedTerm object. Because this is a relatively costly operation, scores are cached by concept name.

The algorithm for calculating a concept score is:
1. Start with a score (e.g., of 0)
2. If the concept has a value greater than 0 and is a skill concept (i.e. does not have a specific prefix such as role, etc.), apply the following rules:
3. Add to the score (e.g., by 15).
4. If this is a most recent concept, add to score (e.g., by 35)
5. If this is an ontology term, add to score (e.g., by 50)
6. If the concept's value is in the upper or lower quartile of the range of concept scores, add to score (e.g., by 10)
7. If more than a threshold (e.g., 300) number of candidates have this concept, add to score (e.g., by 5)
8. If fewer than a threshold (e.g., 75) number of candidates have this concept, remove from score (e.g., by 15)
9. If fewer than a threshold (e.g., 40) number of candidates have this concept, remove from score (e.g., by 30)
10. If fewer than a threshold (e.g., 10) number of candidates have this concept, remove from score (e.g., by 45)

Exemplary User Interface Presentation of Match Results

FIG. 30 shows a screen shot of an exemplary graphical user interface 3000 for presenting a list of candidates matching match criteria (e.g., from a job requisition). In the example, the 30 candidates closest to the criteria are considered as matching the criteria. The user interface can be presented by software in any number of ways (e.g., via HTML in a browser).

The candidates are listed by name and type. In FIG. 30, fictitious names are used. If desired, any of the listed candidates can be selected (e.g., via a checkbox) and added to a list of prospects for further action. The candidates can be associated with a color (e.g., via a background surrounding the candidate's name), and a color key can visually depict which colors indicate those candidates who are excellent matches. An overview of a candidate can be displayed when a user selection of the candidate (e.g., by clicking on the candidate's name) is received.

Figure 31:
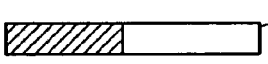
FIG. 31 shows a screen shot of an exemplary user interface for presenting an overview of a candidate.

For example, FIG. 31 shows a screenshot of an exemplary graphical user interface 3100 depicting an overview of a candidate (in this case John Smith). In the example, the applicant's name and other information is displayed. In addition, the workstyle match indicator 3140 and thermometer 3145 indicate how well the candidate matches the job workstyle based on a questionnaire (e.g., such as that described in Example 34). Management experience (e.g., the analytic described in Example 31) is also indicated by the indicator 3160. Further, whether the candidate changes jobs frequently (e.g., as described in Example 36) can be indicated by the indicator 3180. Additional, less, or different information can be presented.

Integration into Applicant Tracking Software System

Any of the technologies described herein can be integrated into applicant tracking software system. Such software can be used to schedule interviews, indicate interviewer's impressions, and otherwise orchestrate the business process of hiring employees.

Exemplary Knowledge-Based Human Resources Search

The technologies described herein can be used for a knowledge-based human resources search. One or more ontology extractors and ontology-independent heuristic extractors along with appropriate concept scorers can serve as a human resources-specific conceptualizer to conceptualize job candidate data. A search of the conceptualized data is a useful tool for finding those candidates matching specified criteria.

Exemplary Desired Job Candidate Criteria

Matching can be done by matching desired job candidate criteria against candidates. For example, a job requisition can be converted to or start out as a list of desired criteria, which can take the form of a point in the n-dimensional concept space. If desired, the job requisition can be conceptualized by a conceptualizer to generate the related concepts and concept scores.

Exemplary Job Candidates

Although several of the examples describe a "job candidate," such persons need not be job candidates at the time their data is collected. Or, the person may be a job candidate for a different job than that for which they are ultimately chosen.

Job candidate information can come from a variety of sources. For example, an agency can collect information for a number of candidates and provide a placement service for a hiring entity. Or, the hiring entity may collect the information itself. Job candidates can come from outside an organization, from within the organization (e.g., already be employed), or both.

Exemplary Computer-Readable Media

In any of the examples described herein, computer-readable media can take any of a variety of forms for storing electronic (e.g., digital) data (e.g., RAM, ROM, magnetic disk, CD-ROM, DVD-ROM, and the like).

The method 200 of FIG. 2, and any of the other methods shown in any of the examples described herein, can be performed entirely by software via computer-readable instructions stored in one or more computer-readable media. Fully automatic (e.g., no human intervention) or semi-automatic (e.g., some human intervention) can be supported.

Exemplary Implementation of Systems

In any of the examples described herein, the systems described can be implemented on a computer system. Such systems can include specialized hardware, or general-purpose computer systems (e.g., having one or more central processing units, such as a microprocessor) programmed via software to implement the system. For example, a combination of programs or software modules can be integrated into a stand alone system, or a network of computer systems can be used.

ALTERNATIVES

It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-implemented method for finding a plurality of job candidates suitable for a position, the job candidates resembling a single particular employee who previously performed well in the position, the method comprising:

via at least one ontology-based extractor and at least one ontology-independent extractor, conceptualizing job candidate data for a plurality of job candidates to generate conceptualized job candidate data, wherein the conceptualized job candidate data comprises, for each job candidate, a set of concept scores defining a respective point in an n-dimensional concept space, the concept scores including concept scores for at least one job title, and at least one job skill for the job candidate, whereby the job candidates are represented by job candidate points in the n-dimensional concept space;

generating desired job candidate criteria via extraction of concepts from job candidate data for the single particular employee who previously performed well in the position, wherein the job candidate data for the single particular employee who previously performed well in the position comprises a resume of the single particular employee who previously performed well in the position;

receiving the desired job candidate criteria, wherein the desired job candidate criteria comprises a desired job candidate criteria point in the n-dimensional concept space;

matching, by a computer, the desired job candidate criteria generated from the single particular employee who previously performed well in the position to the plurality of job candidates, wherein the matching comprises finding m job candidate points closest to the desired job candidate criteria point in the n-dimensional concept space; and in a graphical user interface, indicating job candidates associated with the m job candidate points as job candidates matching the desired job candidate criteria, whereby job candidates suitable for the position resembling the single particular employee who previously performed well in the position are indicated.

2. The method of claim 1 wherein the job candidate data for the job candidate comprises assessment results of the job candidate.

3. The method of claim 1 wherein the extraction of concepts is performed based on detecting a synonym for a concept in the job candidate data for the single particular employee who previously performed well in the position.

4. The method of claim 1 wherein the concept scores are based at least in part on a level of experience for at least one associated concept.

5. The method of claim 1 wherein the concept scores are increased based at least in part on reputation of an organization at which an associated concept was applied according to the job candidate data.

6. The method of claim 1 wherein the job candidate data for the job candidate comprises a resume of the job candidate.

7. A computer-implemented method of finding a job candidate suitable to fill a position via finding a job candidate for the position, the job candidate resembling a single particular employee who previously performed well in the position, the method comprising:

via at least one ontology-based extractor and at least one ontology-independent extractor, conceptualizing job candidate data for a plurality of job candidates to generate conceptualized job candidate data, wherein the conceptualized job candidate data comprises, for each job candidate, a set of concept scores defining a respective point in an n-dimensional concept space, the concept scores including concept scores for at least one job title, and at least one job skill for the job candidate, whereby the job candidates are represented by job candidate points in the n-dimensional concept space;

generating desired job candidate characteristics via extraction of concepts from job candidate data for the single particular employee who previously performed well in the position, wherein the job candidate data comprises a resume of the single particular employee who previously performed well in the position;

matching the desired job candidate characteristics to the plurality of job candidates for the position via an n-dimensional concept space, wherein the generating and the matching steps are performed by a computer system; and providing results indicating a plurality of job candidates for the position matching the desired job candidate characteristics extracted from the job candidate data for the single particular employee who previously performed well in the position.

8. The method of claim 7 wherein the plurality of job candidates for the position are represented by a plurality of job candidate representations in the n-dimensional concept space;

the desired job candidate characteristics are represented by a point in the n-dimensional concept space; and the matching is performed via a distance function to find the m job candidate representations closest to the point in the n-dimensional concept space.

9. At least one computer-readable storage medium having stored thereon computer executable instructions, which instructions when executed by a computer system cause to be performed a method of finding a plurality of job candidates suitable for a position, the job candidates resembling a single particular employee who previously performed well in the position, the method comprising:

via at least one ontology-based extractor and at least one ontology-independent extractor, conceptualizing job candidate data for a plurality of job candidates to generate conceptualized job candidate data, wherein the conceptualized job candidate data comprises, for each job candidate, a set of concept scores defining a respective point in an n-dimensional concept space, the concept scores including concept scores for at least one job title, and at least one job skill for the job candidate, whereby the job candidates are represented by job candidate points in the n-dimensional concept space;

generating desired job candidate criteria via extraction of concepts from job candidate data for the single particular employee who previously performed well in the position, wherein the job candidate data for the single particular employee who previously performed well in the position comprises a resume of the single particular employee who previously performed well in the position;

receiving the desired job candidate criteria, wherein the desired job candidate criteria comprises a desired job candidate criteria point in the n-dimensional concept space;

finding m job candidate points closest to the job candidate criteria point in the n-dimensional concept space; and in a graphical user interface, indicating job candidates associated with the m job candidate points as job candidates matching the desired job candidate criteria, whereby job candidates suitable for the position resembling the single particular employee who previously performed well in the position are indicated.

10. The at least one computer-readable storage medium of claim 9, wherein the job candidate data for the job candidate comprises a resume of the job candidate.

11. The at least one computer-readable storage medium of claim 9, wherein the job candidate data for the job candidate comprises assessment results of the job candidate.

12. The at least one computer-readable storage medium of claim 9, wherein the extraction of concepts is performed based on detecting a synonym for a concept in the job candidate data for the single particular employee who previously performed well in the position.

13. The at least one computer-readable storage medium of claim 9, wherein the concept scores are based at least in part on a level of experience for at least one associated concept.

14. The at least one computer-readable storage medium of claim 9, wherein the concept scores are increased based at least in part on reputation of an organization at which an associated concept was applied according to the job candidate data.

15. A system for finding a plurality of job candidates suitable for a position, the job candidates resembling a single particular employee who previously performed well in the position, the system comprising:

memory for storing computer executable instructions; and at least one processor operable in conjunction with the instructions stored in the memory for finding the plurality of job candidates suitable for the position resembling the single particular employee who previously performed well in the position by performing the following:

via at least one ontology-based extractor and at least one ontology-independent extractor, conceptualizing job candidate data for a plurality of job candidates to generate conceptualized job candidate data, wherein the conceptualized job candidate data comprises, for each job candidate, a set of concept scores defining a respective point in an n-dimensional concept space, the concept scores including concept scores for at least one job title, and at least one job skill for the job candidate, whereby the job candidates are represented by job candidate points in the n-dimensional concept space;

generating desired job candidate criteria via extraction of concepts from job candidate data for the single particular employee who previously performed well in the position, wherein the job candidate data for the single particular employee who previously performed well in the position comprises a resume of the single particular employee who previously performed well in the position;

receiving the desired job candidate criteria, wherein the desired job candidate criteria comprises a desired job candidate criteria point in the n-dimensional concept space;

finding m job candidate points closest to the job candidate criteria point in the n-dimensional concept space; and in a graphical user interface, indicating job candidates associated with the m job candidate points as job candidates matching the desired job candidate criteria, whereby job candidates suitable for the position resembling the single particular employee who previously performed well in the position are indicated.

16. The system of claim 15 wherein the job candidate data for the job candidate comprises a resume of the job candidate.

17. The system of claim 15 wherein the job candidate data for the candidate comprises assessment results of the job candidate.

18. The system of claim 15 wherein the extraction of concepts is performed based on detecting a synonym for a concept in the job candidate data for the single particular employee who previously performed well in the position.

19. The system of claim 15 wherein the concept scores are based at least in part on a level of experience for at least one associated concept.

20. The system of claim 15 wherein the concept scores are increased based at least in part on reputation of an organization at which an associated concept was applied according to the job candidate data.

21. A computer-implemented method of finding job candidate suitable to fill a position via finding job candidates for the position who resemble a single particular employee having desired characteristics and who previously performed well in the position, the method comprising:

via at least one ontology-based extractor and at least one ontology-independent extractor, conceptualizing job candidate data for a plurality of job candidates to generate conceptualized job candidate data, wherein the conceptualized job candidate data comprises, for each job candidate, a set of concept scores defining a respective point in an n-dimensional concept space, the concept scores including concept scores for at least one job title, and at least one job skill for the lob candidate, whereby the lob candidates are represented by job candidate points in the n-dimensional concept space;

generating desired job candidate characteristics via extraction of concepts from job candidate data for the single particular employee having characteristics and who previously performed well in the position, wherein the job candidate data comprises a resume of the single particular employee having desired characteristics and who previously performed well in the position, wherein generating desired job candidate characteristics comprises submitting the job candidate data to plurality of cloners configured to select concepts, wherein the cloners comprise a role cloner, a skill cloner, a company cloner, an industry cloner, and an education cloner;

matching by a computer the desired job candidate characteristics extracted from the job candidate data for the single particular employee to the plurality of job candidates for the position via an n-dimensional concept space, wherein the generating and the matching are performed by a computer system; and providing results indicating a plurality of job candidates for the position matching the desired job candidate characteristics extracted from the job candidate data for the single particular employee having desired characteristics and who previously performed well in the position.

22. One or more computer-readable storage media comprising computer-executable instructions when executed by a computer causing the computer to perform a computer-implemented method of finding a job candidate suitable to fill a position via finding a job candidate for the position who resembles a single particular employee having desired characteristics and who previously performed well in the position, the method comprising:

generating desired job candidate characteristics via extraction of concepts from job candidate data for the single particular employee having characteristics and who previously performed well in the position, wherein the job candidate data comprises a resume of the single particular employee having desired characteristics and who previously performed well in the position, wherein generating desired job candidate characteristics comprises submitting the job candidate data to plurality of cloners configured to select concepts, wherein the cloners comprise a role cloner, a skill cloner, a company cloner, an industry cloner, and an education cloner;

matching the desired job candidate characteristics extracted from the job candidate data for the single particular employee to a set of a plurality of job candidates for the position via an n-dimensional concept space, wherein the generating and the matching are performed by a computer system; and providing results indicating a plurality of job candidates for the position matching the desired job candidate characteristics extracted from the job candidate data for the single particular employee having desired characteristics and who previously performed well in the position.

* * * * *

UNITED STATES PATENT AND TRADEMARK OFFICE
CERTIFICATE OF CORRECTION

PATENT NO. : 7,555,441 B2
APPLICATION NO. : 10/684272
DATED : June 30, 2009
INVENTOR(S) : Crow et al.

It is certified that error appears in the above-identified patent and that said Letters Patent is hereby corrected as shown below:

On the Cover
    In Other Publications, Page 2, Column 1, line 31, "Febraru" should read --February--
    In Other Publications, Page 2, Column 2, line 53, "ten of fewer" should read --ten or fewer--

Column 4, line 56, "the" should read --if the--
Column 4, line 57, "were" should read --that were--
Column 6, line 57, "data 120 of FIG. 1" should read --data 122 of FIG. 1--
Column 7, lines 4-5, "data 120 of FIG. 1" should read --data 122 of FIG. 1--
Column 7, line 17, "data 120 of FIG. 1" should read --data 122 of FIG. 1--
Column 7, line 45, "concepts)" should read --concepts).--
Column 8, line 49, "experience" should read --experienced--
Column 8, line 66, "$Cand_{10}$.(i.e.," should read --$Cand_{10}$ (i.e.,--
Column 10, line 14, "1.0, which" should read --1.0, with--
Column 12, line 5, "noting" should read --voting--
Column 12, line 19, "inter-realted." should read --inter-related.--
Column 14, line 2, "Role-Voice Engineer." should read --"Role_Voice Engineer."--
Column 14, line 47, "Telecom Test Engineer"" should read --"Telecom Test Engineer"--
Column 14, line 59, "Example 23" should read --the next section--
Column 15, line 2, "Example 22" should read --the previous section--
Column 16, line 50, "Example 25" should read --the previous section--
Column 16, line 62, "languages," should read --languages,"--
Column 17, line 35, "time" should read --times--
Column 19, line 4, "Extractor Skills" should read --Extractor: Skills--
Column 19, line 50, "1)" should read --1).--
Column 19, line 57, "phrases" should read --phrases.--
Column 21, line 21, "Support:" should read --Support"--
Column 21, line 36, "reduced one" should read --reduced to one--
Column 22 lines 9-10, "Manager Business, Development" should read --Manager, Business Development--
Column 22, line 25, ""oversaw," should read --"oversaw,"--
Column 23, line 15, "a held" should read --held a--

Signed and Sealed this

Second Day of November, 2010

David J. Kappos
*Director of the United States Patent and Trademark Office*

CERTIFICATE OF CORRECTION (continued)
U.S. Pat. No. 7,555,441 B2

Column 23, lines 26-27, "a set resumes" should read --a set of resumes--
Column 23, line 45, "5 year" should read --5 years--
Column 23, line 49, "1 years" should read --1 year--
Column 24, line 5, "expect" should read --expected--
Column 24, line 51, "2335" should read --2535--
Column 27, line 23, "implemented" should read --implement--
Column 27, line 64, "matchforecast." should read --matchForecast.--
Column 28, line 49, "mechanism" should read --mechanisms--
Column 30, line 38, ""ForecastvO")" should read --"ForecastVO")--
Column 30, line 64, "change" should read --changed--
Column 31, line 37, "Javag" should read --Java®--
Column 31, line 53, "affect" should read --effect--
Column 32, line 53, "that contain the calling software wants" should read --that contain what the calling software wants--
Column 34, line 28, "ResumeToQuer" should read --ResumeToQuery--
Column 34, line 56, "CreateOuickMatch" should read --CreateQuickMatch--
Column 34, line 64, "matchforecast" should read --matchForecast--
Column 35, line 14, "job" should read --Job--
Column 35, line 31, "Requsition" should read --Requisition--
Column 35, line 42, "candidate" should read --Candidate--
Column 36, line 67, "ajob" should read --a job--
Column 37, line 46, "candidate cloners" should read --CandidateCloners--
Column 38, lines 6-7, "in which is appeared." should read --in which it appears.--
Column 39, line 42, "Constrining" should read --Constraining--
Column 39, line 53, "Mechanismis" should read --Mechanism is--
Column 39, line 54, "Ifit" should read --If it--
Column 40, line 1, "Mechanismis" should read --Mechanism is--
Column 40, line 15, "class" should read --classes--
Column 40, line 38, "FoorecastVO" should read --ForecastVO--
Column 41, line 12, "Skill Scorer" should read --SkillScorer--
Column 41, line 24, "Termrs" should read --Terms--
Column 41, line 28, "score" should read --Score--
Column 41, line 52, "ajob" should read --a job--
Column 42, line 8, "Example 34" should read --"Exemplary Integrated Assessment Analysis"--
Column 42, line 9, "Example 31" should read --"Exemplary Ontology-independent Heurisitic Extractor"--
Column 42, line 11, "Example 36" should read --"Exemplary Analytic: Frequent Job Moves"--

Column 46, line 40, "finding job" should read --finding a job--
Column 46, line 53, "lob" should read --job--
Column 46, line 54, "lob" should read --job--